US011259324B2

(12) United States Patent
Abouelseoud et al.

(10) Patent No.: US 11,259,324 B2
(45) Date of Patent: Feb. 22, 2022

(54) MU-MIMO PRE-PACKET ARRIVAL CHANNEL CONTENTION

(71) Applicant: SONY GROUP CORPORATION, Tokyo (JP)

(72) Inventors: Mohamed Abouelseoud, San Francisco, CA (US); Kazuyuki Sakoda, Campbell, CA (US); Liangxiao Xin, San Jose, CA (US)

(73) Assignee: SONY GROUP CORPORATION, Tokyo (JP)

( * ) Notice: Subject to any disclaimer, the term of this patent is extended or adjusted under 35 U.S.C. 154(b) by 12 days.

(21) Appl. No.: 16/710,217

(22) Filed: Dec. 11, 2019

(65) Prior Publication Data
US 2021/0007137 A1 Jan. 7, 2021

Related U.S. Application Data

(60) Provisional application No. 62/870,149, filed on Jul. 3, 2019.

(51) Int. Cl.
*H04W 74/08* (2009.01)
*H04W 74/02* (2009.01)
*H04L 1/00* (2006.01)
*H04B 7/0452* (2017.01)
*H04W 84/12* (2009.01)

(52) U.S. Cl.
CPC ...... *H04W 74/0808* (2013.01); *H04B 7/0452* (2013.01); *H04L 1/0008* (2013.01); *H04W 74/02* (2013.01); *H04W 84/12* (2013.01)

(58) Field of Classification Search
CPC . H04W 74/0808; H04W 74/02; H04W 84/12; H04W 72/042; H04B 7/0452; H04L 1/0008; H04L 5/006
See application file for complete search history.

(56) References Cited

U.S. PATENT DOCUMENTS

2018/0263044 A1* 9/2018 Zhou .................. H04L 5/006
2018/0270854 A1* 9/2018 Lee .................. H04W 72/042
(Continued)

FOREIGN PATENT DOCUMENTS

KR          101289944 B1    1/2008

OTHER PUBLICATIONS

Wei, Yi-Hung, et al. "RT-WiFi: Real-Time High-Speed Communication Protocol for Wireless Cyber-Physical Control Applications", 2013, 2013 IEEE 34th Real-Time Systems Symposium, pp. 143, 145. (Year: 2013).*

(Continued)

*Primary Examiner* — Huy D Vu
*Assistant Examiner* — Robert Ma
(74) *Attorney, Agent, or Firm* — O'Banion & Ritchey LLP; John P. O'Banion

(57) ABSTRACT

Systems, apparatus and methods for wireless local area network (WLAN) communication which support real-time application (RTA) packets. The access point (AP) schedules multiple-user (MU) multiple-input-multiple-output (MIMO) transmissions for uplink (UL) or downlink (DL) for RTA packets by allocating resources to packet transmissions before RTA packet arrival. The AP contends for channel access before the expected time of arrival of the RTA packet in the DL or UL direction. The operations reduce RTA packet latency on the WLAN.

30 Claims, 42 Drawing Sheets

(56) References Cited

U.S. PATENT DOCUMENTS

| | | |
|---|---|---|
| 2019/0029037 A1 | 1/2019 | Wang |
| 2019/0191462 A1* | 6/2019 | Noh |
| 2020/0137770 A1* | 4/2020 | Chitrakar .............. H04L 5/0007 |
| 2020/0344838 A1* | 10/2020 | Wu ....................... H04W 76/28 |
| 2021/0051728 A1* | 2/2021 | Viger ................. H04W 72/121 |

OTHER PUBLICATIONS

Morcel, Raghid et al., "Proactive Channel Allocation for Multimedia Applications over CSMA/CA-Based CRNs", Conference Paper, IEEE 2016 3rd International Conference on Advances in Computational Tools for Engineering Applications (ACTEA), Jul. 13-15, 2016, pp. 178-183.

Hamed, Ezzeldin et al., "Real-time Distributed MIMO Systems", SIGCOMM '16: Proceedings of the 2016 ACM SIGCOMM Conference, Aug. 22-26, 2016, Florianopolis, Brazil, pp. 412-425, https://dl.acm.org/doi/10.1145/2934872.2934905.

Laselva, Daniela et al., "Call : H2020-I CT-2016-2, Project reference: 760809, Project Name: E2E-aware Optimizations and advancements for Network Edge of 5G New Radio (ONE5G), Deliverable D3.2 Recommended Multi-Service Performance Optimization Solutions for Improved E2E Performance", May 31, 2019, 150 pages, XP055713455, Retrieved from the Internet: URL:https://one5g.eu/wp-content/uploads/2019/07/0NE5G-D3.2.pdf [retrieved on Jul. 9, 2020].

* cited by examiner

**FIG. 1
(Prior Art)**

HE-SU: | L-STF (8μs) | L-LTF (8μs) | L-SIG (4μs) | RL-SIG (4μs) | HE-SIG-A (8μs) | HE-STF (4μs) | HE-LTFs | Data | PE |

**FIG. 2
(Prior Art)**

HE-MU: | L-STF (8μs) | L-LTF (8μs) | L-SIG (4μs) | RL-SIG (4μs) | HE-SIG-A (8μs) | HE-SIG-B (16μs) | HE-STF (4μs) | HE-LTFs | Data | PE |

**FIG. 3
(Prior Art)**

HE-TB: | L-STF (8μs) | L-LTF (8μs) | L-SIG (4μs) | RL-SIG (4μs) | HE-SIG-A (8μs) | HE-STF (8μs) | HE-LTFs | Data | PE |

Trigger frame

| Frame Control | Duration | RA | TA | Common Info | User Info | ... | User Info | FCS |

**FIG. 4
(Prior Art)**

User Info field

| AID12 | RU Allocation | Coding Type | MCS | DCM | SS Allocation | Target RSSI | Reserved |

**FIG. 5
(Prior Art)**

Common Info field

| Trigger Type | Length | Cascading Indication | CS Required | BW | GI And LTF Type | MU MIMO LTF Mode | Number of HE-LTF Symbols | STBC |
| LDPC Extra Symbol Segment | AP TX Power | Packet Extension | Spatial Reuse | Doppler | GI And LTF Type | HE-SIG-A Reserved | Reserved |

**FIG. 6
(Prior Art)**

| BA frame | Frame Control | Duration | RA | TA | BA control | BA info | FCS |
**FIG. 7
(Prior Art)**
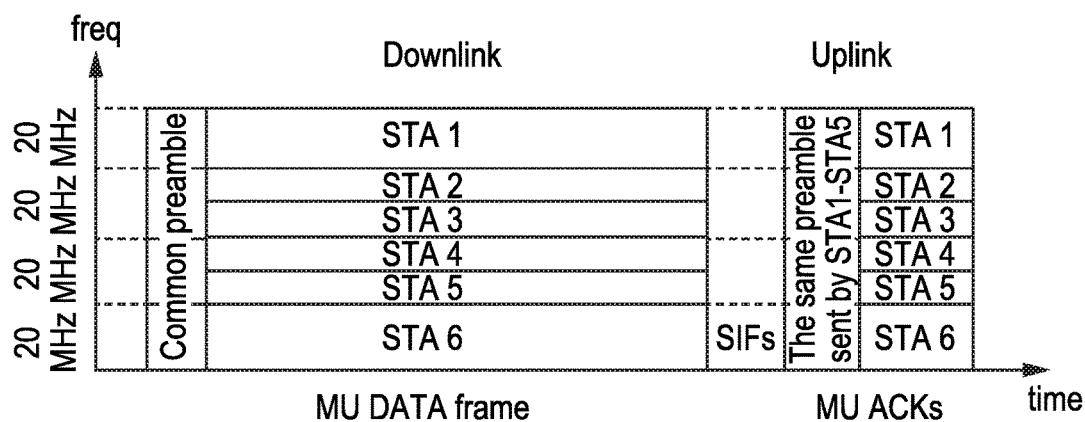
**FIG. 8
(Prior Art)**
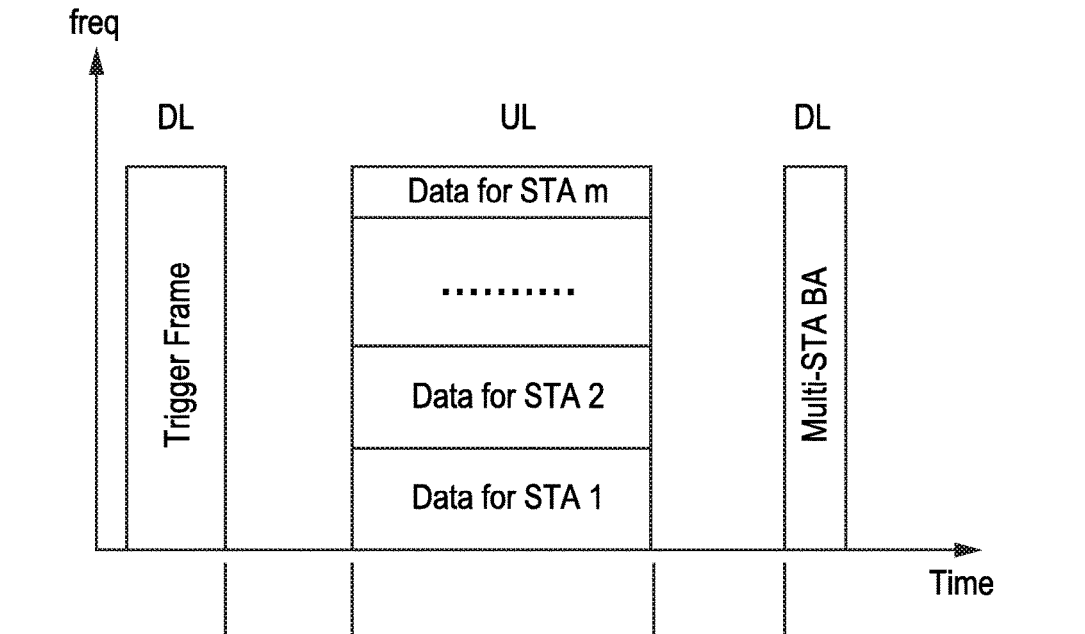
**FIG. 9
(Prior Art)**

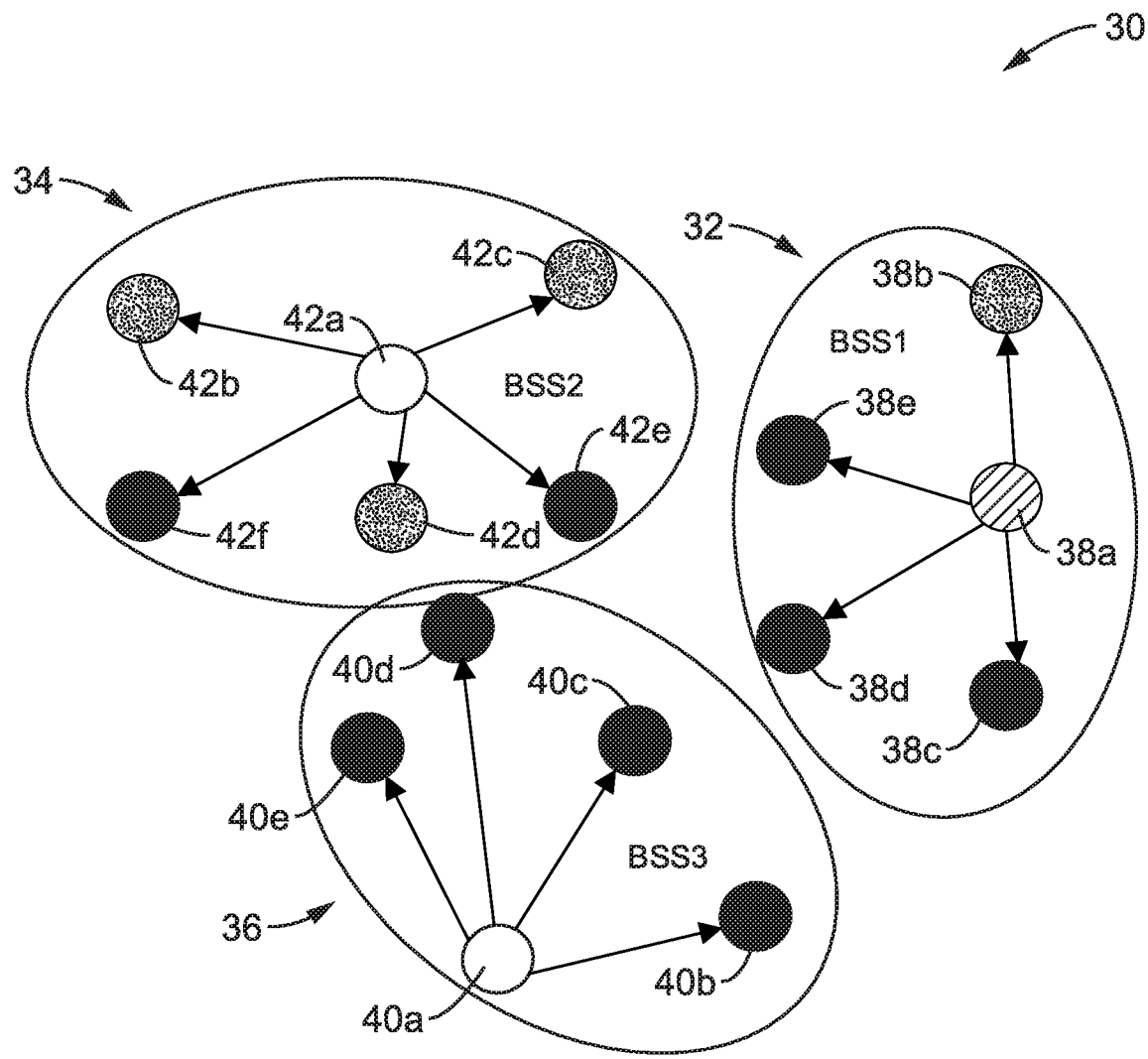
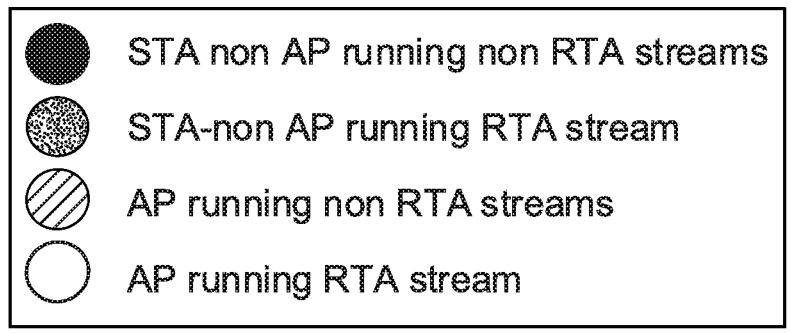
FIG. 18

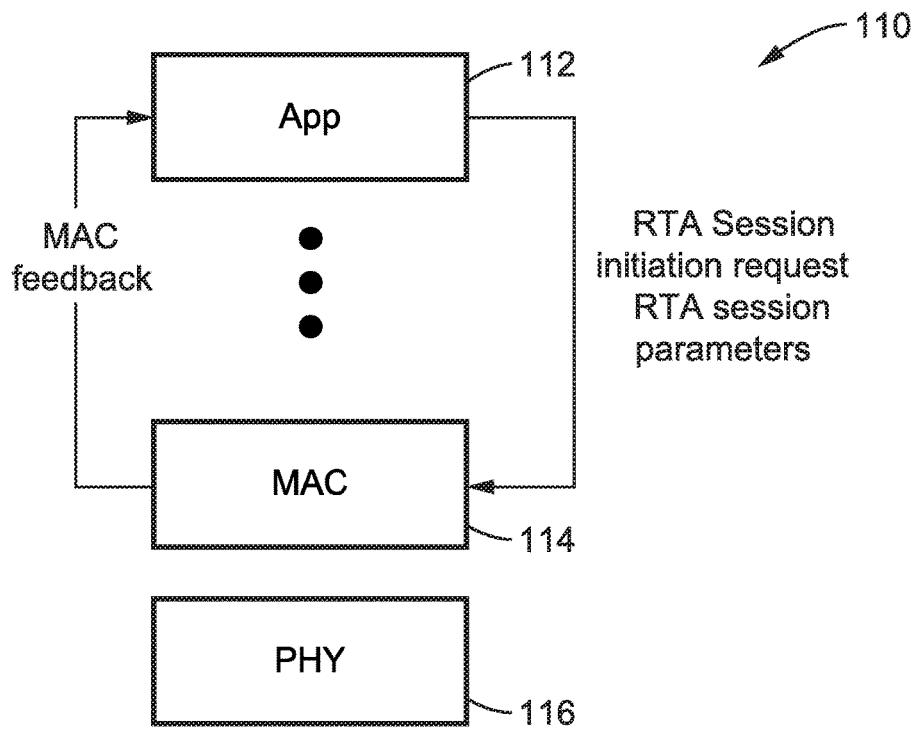

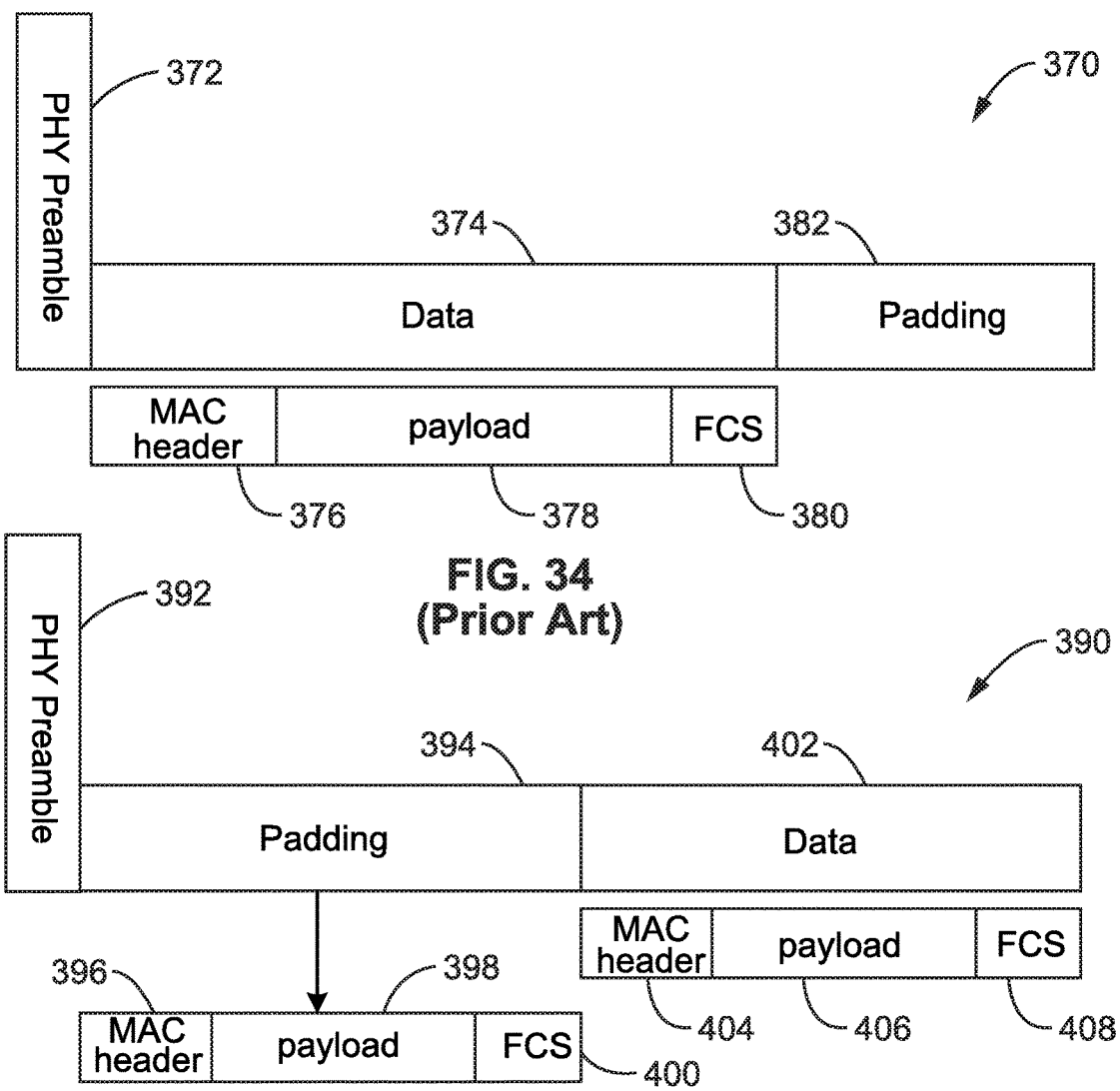
FIG. 34 (Prior Art)
FIG. 35
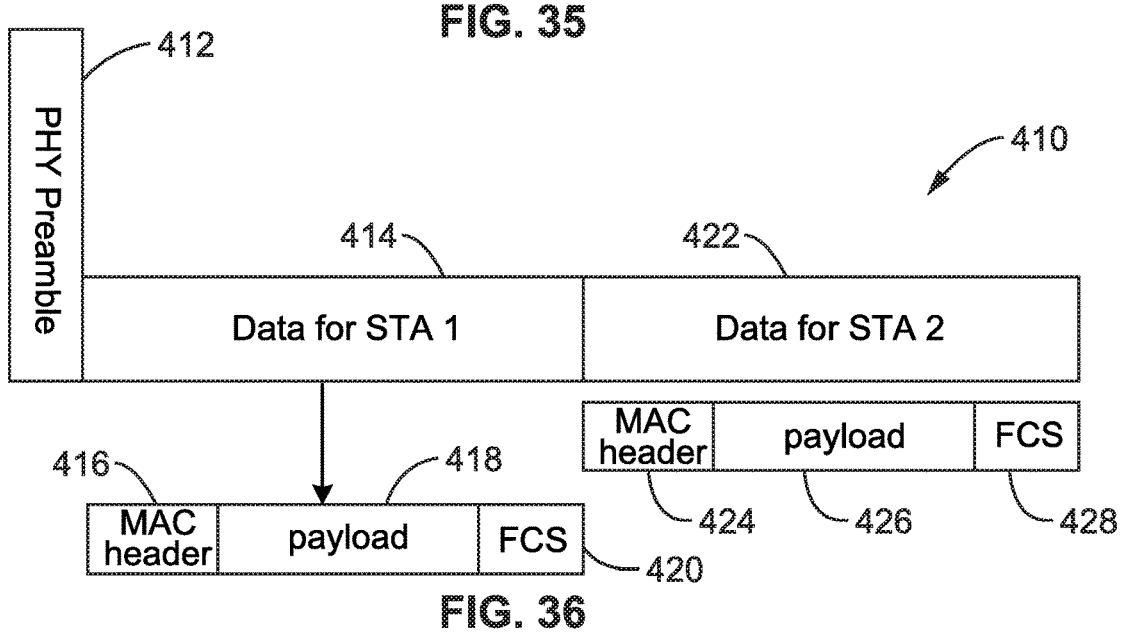
FIG. 36

MU-MIMO PRE-PACKET ARRIVAL CHANNEL CONTENTION

CROSS-REFERENCE TO RELATED APPLICATIONS

This application claims priority to, and the benefit of, U.S. provisional patent application Ser. No. 62/870,149 filed on Jul. 3, 2019, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless communication stations, and more particularly to wireless local area network (WLAN) stations communicating a combination of real time and non-real time traffic.

2. Background Discussion

An increasing portion of electronic devices making their way to the market have access to the internet through a Wi-Fi network. These Wi-Fi networks are growing every day to allow more throughput and possibility to connect more users to each network. However, in high density environments, or in situations where interference exists, the latency and reliability is not guaranteed; thus Wi-Fi networks are generally considered a best effort communication.

Real time gaming, remote monitoring and control, as well as other delay sensitive applications are a fast-developing category where minimized packet delay and traffic reliability are of great value. A packet to be communicated can readily lose its value when delayed. In other applications an acceptable level of user experience can only be attained if the end-to-end delay is unnoticeable to the end user. In view of these issues parameters such as worst-case latency are very important to study and address in the system design; because any spike of delay might ruin performance and/or create spurious results.

Current wireless technologies using CSMA/CA focus on high throughput performance of the network, but they do not engender low latency operations. Thus, a technology gap has occurred because a large number of applications, such as real time applications (RTA), which require low latency. The RTA traffic requires low latency due to its high timeliness requirement on packet delivery, as the RTA data is valid only when it is delivered within a certain period.

Accordingly, a need exists for a wireless communication apparatus and method which reduce packet latencies. The present disclosure fulfills that need and provides additional benefits over previous technologies.

BRIEF SUMMARY

Reducing packet latency for Real Time Applications (RTA) can be arrived at by allowing a station (STA) to access the channel faster with less channel contention time. Due to the current random channel access scenario, a STA needs to sense and contend for channel access before transmitting each packet, which can be a source of packet delay. Other sources of delay include the operation of power saving modes, queuing delays, and transmission delays which add to end-to-end packet transmission delay.

The present disclosure provides changes to the MAC and PHY layers of the current 802.11 protocols to allow bounding the worst-case latency for RTA and improving connection reliability.

An Access Point (AP) scheduling Multiple-User (MU)-Multiple-Input-Multiple-Output (MIMO) transmission for UpLink (UL) or DownLink (DL) for Real-Time Application (RTA) packets allocates resources (RU) to the packet transmission before the RTA packet arrival and can even gain access to the channel before expected RTA packet arrival.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 1 is a data field diagram for a HE-SU PPDU frame.
FIG. 2 is a data field diagram for a HE-MU PPDU frame.
FIG. 3 is a data field diagram for a HE-TB PPDU frame.
FIG. 4 is a data field diagram for a trigger frame.
FIG. 5 is a data field diagram for a user information field of a trigger frame.
FIG. 6 is a data field diagram for a common information field of a trigger frame.
FIG. 7 is a data field diagram for a block ACK (BA) frame.
FIG. 8 is a frequency use diagram for Downlink (DL) OFDMA MIMO transmissions performed for an IEEE 802.11ax WLAN.
FIG. 9 is a frequency use diagram for Uplink (UL) OFDMA MIMO transmissions performed for an IEEE 802.11ax WLAN.
FIG. 10 is a flow diagram of retransmission under CSMA/CA.
FIG. 11 is a data field diagram of a data frame format for a regular WLAN system.
FIG. 12 is a data field diagram of an Acknowledgement (ACK) frame format for a regular WLAN system.

FIG. 18 is a network topology diagram showing a topological example addressed according to at least one embodiment of the present disclosure.

FIG. 21 is a block diagram of primitive parameter communication utilized according to at least one embodiment of the present disclosure.

FIG. 22 is a data field diagram of a New Session request having channel access parameters according to at least one embodiment of the present disclosure.

FIG. 23 is a data field diagram of primitive parameters for a response to the New Session request according to at least one embodiment of the present disclosure.

FIG. 34 is a scheduling diagram of using padding according to the current 802.11ax standard.

FIG. 35 is a scheduling diagram of a case in which the AP is sending padding before the RTA packet transmission as performed according to at least one embodiment of the present disclosure.

FIG. 36 is a scheduling diagram of a case in which the AP is sending another packet to another STA before the RTA packet as performed according to at least one embodiment of the present disclosure.

DETAILED DESCRIPTION

1. Discussion of 802.11 WLAN Systems

Figure 10:
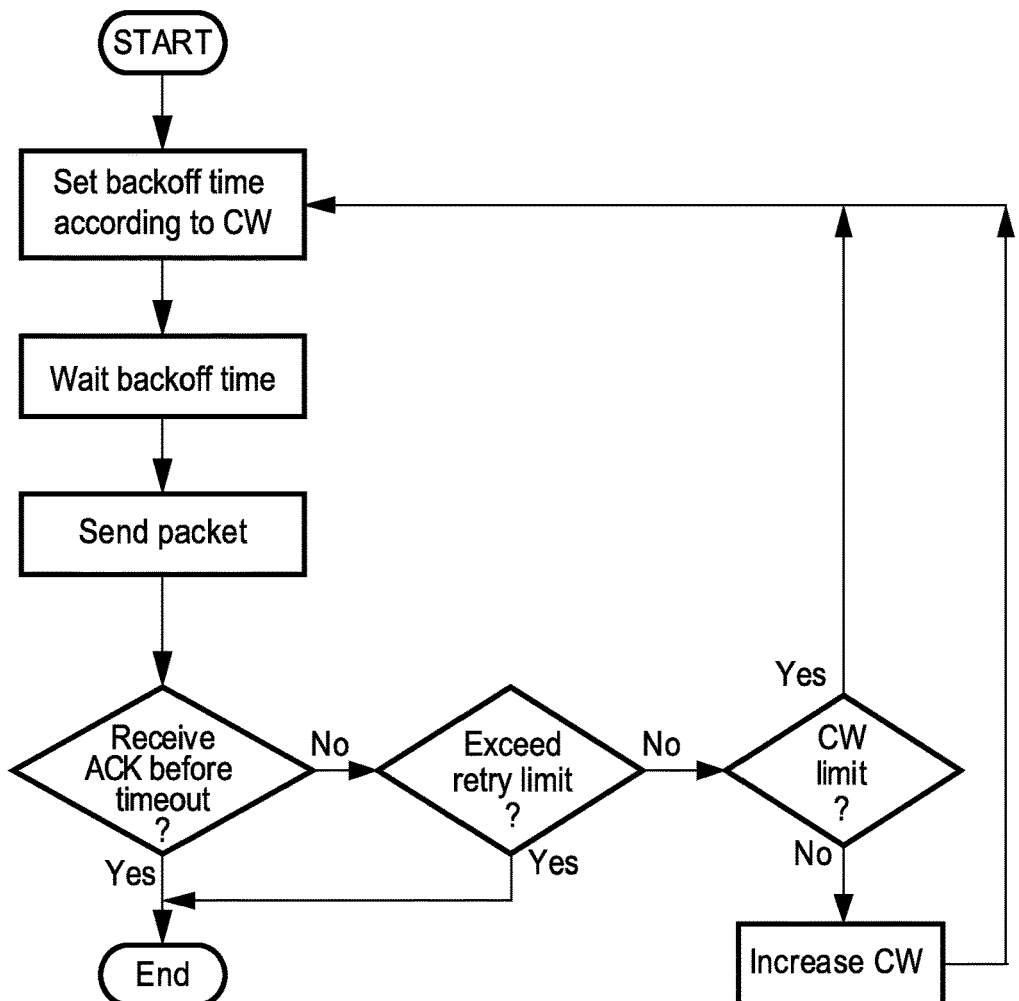

Numerous 802.11 amendments have been proposed to improve Wireless Local Area network (WLAN) performance, specifically proposals focusing on the 2.4 GHz and 5 GHz bands. A large portion of these previous amendments are directed to improving the maximum data rate to be received from the originally proposed 2 Mbits/sec to possibly up to 9.6 GHz with the 802.11ax amendment. Many techniques have been utilized to increase the data rate in the physical layer through, for example, increasing channel bandwidth from 20 MHz to up to 160 MHz, using new modulations and coding schemes and the introduction of Multiple-Input Multiple-Output (MIMO) and Multi-User (MU) transmission. Other Medium Access Control (MAC) layer improvements have been introduced to reduce the overhead of transmission and hence increase data throughput. It will be noted that the MAC layer is one of the seven layers defined in the Open Systems Interconnection (OSI) communications model. This reduced overhead can be achieved for example by reducing the interframe spacing, aggregating and segmenting packets, improving Quality of Service (QoS) handling in Wi-Fi networks and applying power consumption protocols to alternate between an awake state and a doze (sleep) state for stations to save power.

1.1 802.11ax-PPDU Formats

FIG. 1 illustrates an HE single user (SU) PPDU format in IEEE 802.11ax as used for single user transmission in IEEE 802.11ax. It will be noted that PPDU stands for Physical layer convergence procedure Protocol Data Unit. A PPDU frame contains a PSDU plus a PHY header as well as a preamble. The high-efficiency (HE)-Single-User (SU) PPDU frame contains the following fields: (a) L-STF as a non-HT short training field; (b) L-LTF as a non-HT long training field; (c) L-SIG as a non-HT SIGNAL field; (d) RL-SIG as a repeated non-HT SIGNAL field; (e) HE-SIG-A as a HE SIGNAL A field; (f) HE-STF as an HE short training field; (g) HE-LTF as an HE long training field; (h) Data as being the data field carrying the PSDUs; and (i) PE as a packet extension field.

FIG. 2 illustrates an HE multi-user (MU) PPDU format in IEEE 802.11ax used for downlink multi-user transmission. Compared with the single user PPDU format as shown in FIG. 1, this adds the HE-SIG-B field into its format which provides a separate resource block allocation information to each user.

FIG. 3 illustrates an HE Trigger-based (TB) PPDU format used for uplink multi-user transmission. The fields in the HE TB PPDU format are identical to those in the HE single user PPDU format of FIG. 1, except that the HE-STF field is 8 µs.

FIG. 4 illustrates the content of a trigger frame format in IEEE 802.11ax. A frame control field indicates the type of the frame. A duration field contains NAV information used for CSMA/CA channel access. An RA field contains the address of the recipient of the frame. A TA field contains the address of the STA that transmitted the frame.

FIG. 5 illustrates a user Info field including the information for each STA. The common info field and the user info field provide the separate resource block allocation information to each user. The fields are depicted with AID12, RU Allocation, Coding Type, MCS, DCM, SS Allocation, Target RSSI and Reserved.

FIG. 6 illustrates a common info field, which includes the information for all allocated STAs, and depicts Trigger Type, Length, Cascading Indication, CS Required, BW, GI and LTF Type, MU MIMO LTF Mode, Number of HE-LTF Symbols, STBC, LDPC Extra Symbol Segment, AP TX Power, Packet Extension, Spatial Reuse, Doppler, GI and LTF Type, HE-SIG-A Reserved, and Reserved.

FIG. 7 illustrates the contents of a block ACK (BA) frame format in regular WLAN systems. A frame control field indicates the type of frame. A duration field contains NAV information used for CSMA/CA channel access. An RA field contains the address of the recipient of the frame. A TA field contains addresses of the STA that transmits the frame. A BA control field indicates the policy of the block ACK. A BA info field contains the feedback of the transmission. And an FCS field is a Frame Check Sequence.

1.2. WLAN Features Affecting Delay

1.2.1. Channel Access and Delay Tolerance

It should be appreciated that both contention-based and contention free accesses are allowed in WLAN devices. The contention-based access requires the channel to sense the channel and content every time the channel is busy in order to gain access to the channel. This introduces extra transmission delays but provides for collision avoidance. Contention free channel access allows the AP to gain access to the channel without contention. This is allowed in the Hybrid Controlled Channel Access (HCCA) where channel access coordination is accomplished by using a shorter inter-frame spacing equal to PIFs (PIF is defined as PCF Inter-Frame Spacing) compared to the DIFS (Distributed Inter-Frame Spacing) used by other STAs.

Although contention free access appears as a viable solution to avoid contention delay, it is not widely deployed, and most Wi-Fi devices are using contention-based access. Thus, for a STA to access the channel it must sense the channel and find that it is not busy. A channel is considered busy according to any of the following. (a) The channel is considered busy when the STA detects a preamble of a frame, with the channel being considered busy for the length of the detected frame. (b) The channel is considered busy when the STA detects energy levels at more than 20 dB of the minimum sensitivity. (c) The channel is considered busy when the STA detects the channel is virtually busy by reading the Network Allocation Vector (NAV) of a detected frame.

The 802.11ax standard introduced two NAVs to avoid collision that might occur by falsely resetting the NAV timer. One NAV is for the BSS STAs and the other NAV is for the non-BSS STAs. The STA maintains and keeps these two NAVs separately.

802.11ax uses Carrier Sense Multiple Access type Collision Avoidance (CSMA/CA) for channel access as in all legacy 802.11 WLAN devices. For an AP to send a trigger frame for UpLink (UL) MIMO transmission it still needs to contend for channel access. To enable the AP to obtain (win) channel access over any STA in its BSS, 802.11ax introduced a second set of Enhanced Distributed Channel Access (EDCA) for 802.11ax devices only. This form of channel access allows legacy non-802.11ax devices to access the channel freely with EDCA and increase the chance of the AP to gain access of the channel to schedule UL or DownLink (DL) OFDMA MIMO data transmission. It will be noted that OFDMA stands for Orthogonal Frequency Division Multiple Access, and it a multi-user version of OFDM.

1.2.2. Power Saving and Delay Tolerance

Power saving processes can also affect latency since stations may at times be shutting off their radio to save power. The AP buffers data for each STA in its Basic Service Set (BSS) and waits for the STA to wake up to receive it. The AP might need to contend for the channel when the STA is known to be awake and send the STA its packets. The STA might also wake up, contend for the channel and contact the AP to check if there are packets for itself. Another option might allow the AP and the STA to schedule times for the AP and the STA to exchange data. All these options add extra delays for a packet to be sent and introduce a trade-off between power saving and delay tolerance.

2.2.3. Multi-user Transmission and Reception 802.11 WLAN devices allow the use of a MIMO antenna for transmission and reception as well as OFDMA channel access. IEEE 802.11ax supports the multi-user transmission in both uplink and downlink. This MIMO support allows multi-stream transmission to one or more users through up to eight streams for example in SU-MIMO DL in 802.11ac or through multi-user transmission to more than one user through MU-MIMO DL transmission as defined in 802.11ac. This allows the AP to assign one or more streams to STAs in its Basic Service Set (BSS).

With the use of wide channels for data transmission, up to 160 MHz, the channel is expected to be interference frequency selective where some frequencies experience different interference levels than others. This affects the expected achievable rate and degrades performance. To solve this problem 802.11ax introduced OFDMA where adjacent subcarriers are grouped into resource units (RUs). These RUs can be assigned to different receivers to maximize the transmission rate. This scheduling can result in maximizing the Signal of Interest Noise Ratio (SINR) for each receiver and therefore allows higher Modulation and coding scheme (MCS) and therefore increases the achieved throughput. It will be noted that SINR is defined as the power of a certain signal of interest divided by the sum of the interference power from all other interfering signals and background noise.

OFDMA allows a number of users to utilize the same time resources at the same time and split the frequency domain among them, toward improving resource use and reducing latency since additional users can be scheduled at the same time. OFDMA also allows STAs with small amounts of data to communicate and to occupy narrow RUs, thus making the scheduling very efficient and allowing improved distribution of resources among applications that need short accesses to the channel. These aspects can aid in reducing channel access time and overhead of frame headers and preambles.

OFDMA can be made more efficient when it is combined with MIMO transmission. An RU can be utilized to send multiple spatial streams to a STA depending on the MIMO capacities of the STAs. Also, one RU can be assigned to more than one STA to share where each can have one or more spatial streams depending on the MIMO capacities of the STAs. Packing more STAs in the same resource can help with improving latency for the STAs and APs.

FIG. 8 shows an example of DL OFDMA MIMO transmission. The AP is sending a PHY preamble to all STAs to specify the frequency/RUs mapping and RU assignments for STAs.

FIG. 9 shows an example of UL OFDMA MIMO transmission. The AP is sending a trigger frame to all STAs containing a frequency/RUs mapping and RU assignments for STAs. In at least one embodiment the UL MIMO transmission is synchronized to the reception of that frame where STAs starts transmission of a SIF after the reception of the DL trigger frame.

1.2.4. Retransmission

FIG. 10 depicts transmission and retransmission in IEEE 802.11 CSMA/CA to allow STAs to have access to the channel for packet transmission and retransmission. In a CSMA/CA system the process is performed before each transmission and retransmission, wherein the STA has to sense the channel and set a backoff time to contend for channel access. The backoff time is decided by a uniform random variable between zero and the size of the contention window (CW). After the STA waits for the backoff time and senses that the channel is idle, it sends a packet. Retransmission of the packet is required if the STA does not receive an ACK before timeout. Otherwise, the transmission is considered to have succeeded.

When retransmission is required, the STA checks the number of retransmissions of the packet, and if the number of retransmissions exceeds the retry limit, then the packet is dropped and no retransmission is scheduled. Otherwise, one or more retransmissions are scheduled. If retransmission is scheduled, then another backoff time is needed to contend for channel access for this retransmission. If the size of contention window does not reach the upper contention window limit (CW limit), then the STA increases CW and execution returns to the top of the flow diagram so the STA sets another backoff time depending on the new size of the contention window (CW). The STA waits the backoff time for retransmission and so on.

Figure 11:
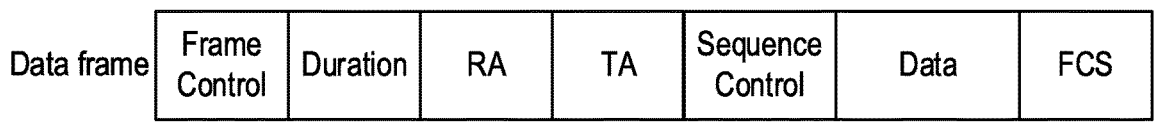

FIG. 11 depicts a data frame format in regular WLAN system. A Frame Control field indicates the type of the frame. A Duration field contains NAV information used for CSMA/CA channel access. An RA field contains the address of the recipient of the frame. A TA field contains the address of the STA that transmits the frame. A Sequence control field contains the fragment number and the sequence number of packet. There is also a Data and FCS field.

Figure 12:
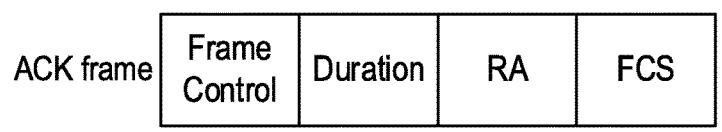

FIG. 12 depicts an ACK frame format in regular WLAN system. A Frame Control field indicates the type of the frame. A Duration field contains NAV information used for CSMA/CA channel access. An RA field contains the address of the recipient of the frame.

Figure 13:
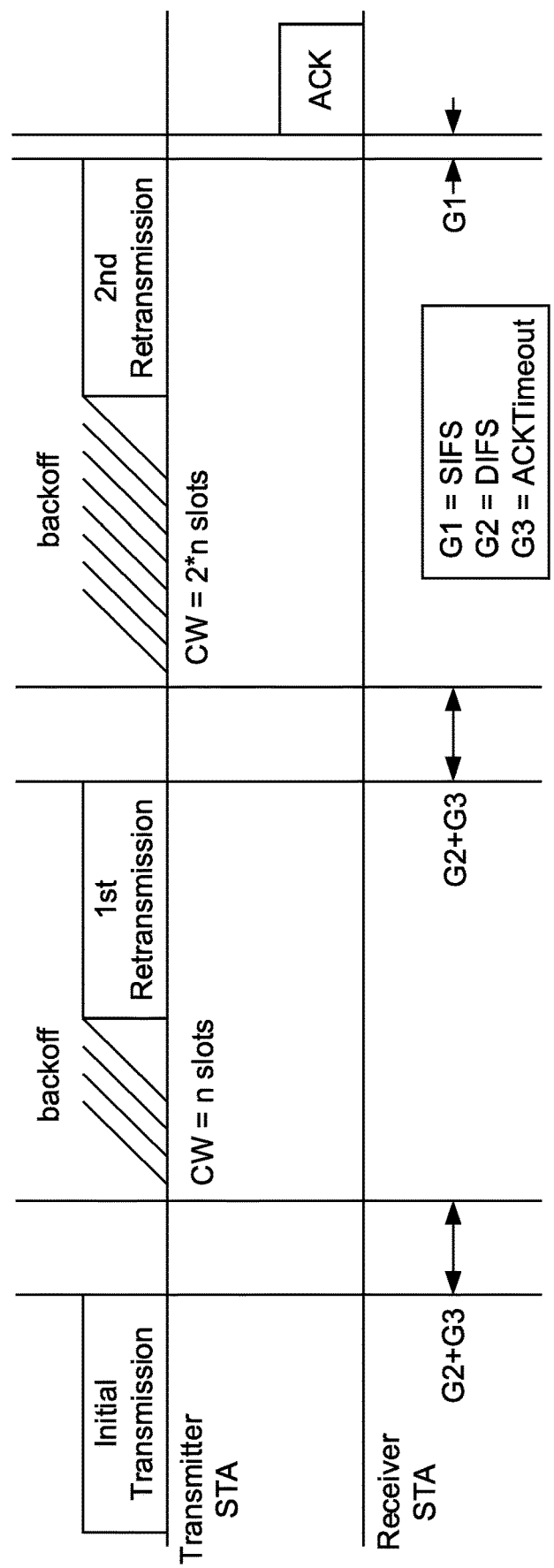
FIG. 13 is a communication sequence diagram for retransmissions in CSMA/CA using a double sized contention window.

FIG. 13 illustrates the scenario of retransmissions in CSMA/CA, in which the backoff time is increased for retransmissions. The data frame and the ACK frame use the formats as shown in FIG. 11 and FIG. 12, respectively. After the transmitter transmits the initial transmission of a packet, it does not receive the ACK before timeout. Then, it sets another backoff time, whereby the size of the contention window is n slots. After waiting for the backoff time, the transmitter STA retransmits the packet for the first time. However, this retransmission also fails in this example. The transmitter STA needs to retransmit the packet and sets backoff time to again contend for channel access. This time, the size of the contention window is doubled, which is 2*n slots, due to the retransmission. The expected backoff time is also doubled by the contention window size. The second retransmission succeeds since it receives an ACK before timeout.

Figure 14:
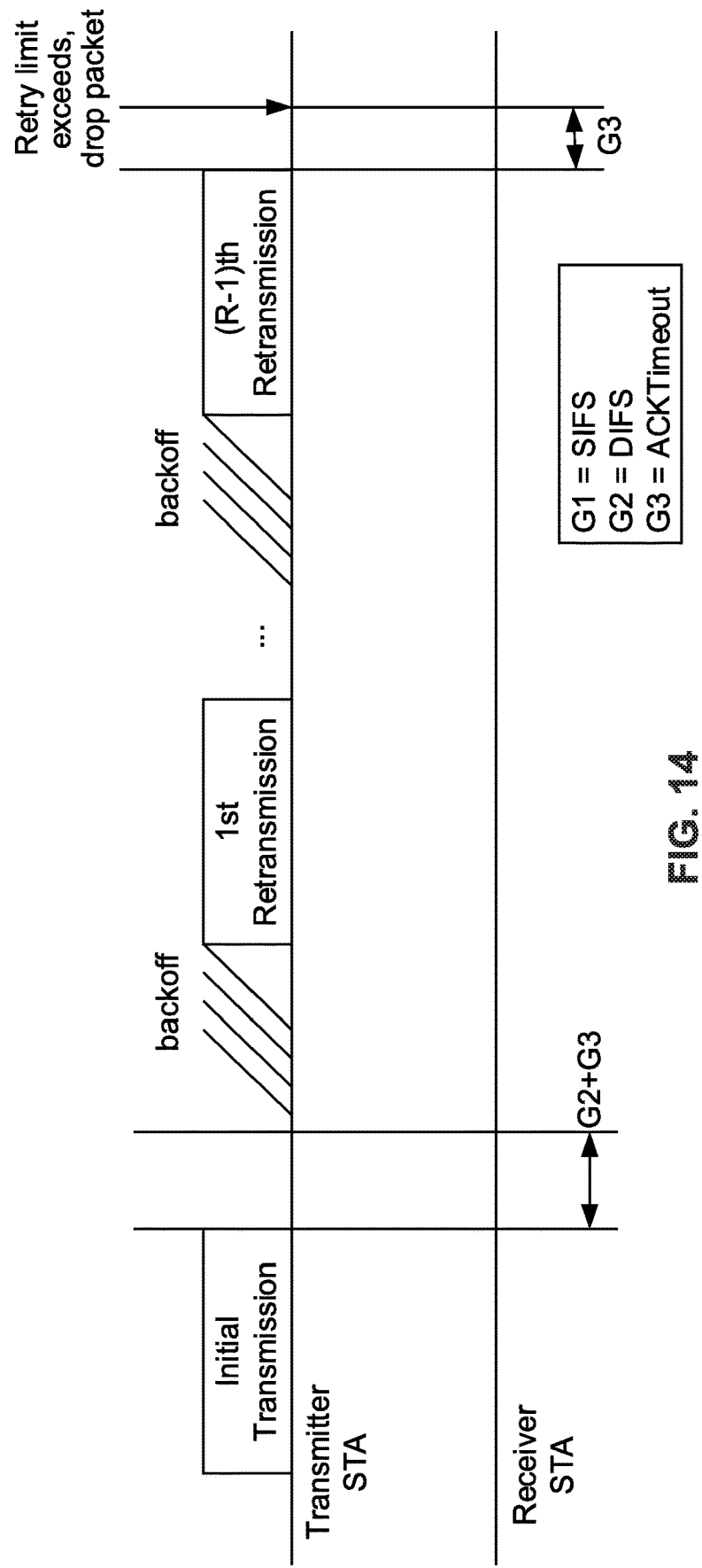
FIG. 14 is a communication sequence diagram for retransmissions in CSMA/CA in which a packet is dropped in response to retry limit.

FIG. 14 illustrates one example that the packet is dropped after the number of retransmissions exceeds the retry limit. The data packet frame and the ACK frame uses the formats as shown in FIG. 11 and FIG. 12, respectively. As shown in the figure, after the initial transmission of a packet fails, the transmitter STA retransmits that packet multiple times. However, none of the retransmissions succeed. After retransmitting N times, the number of retransmission exceeds the retry limit. The transmitter STA stops retransmitting that packet and that packet is dropped.

Figure 15:
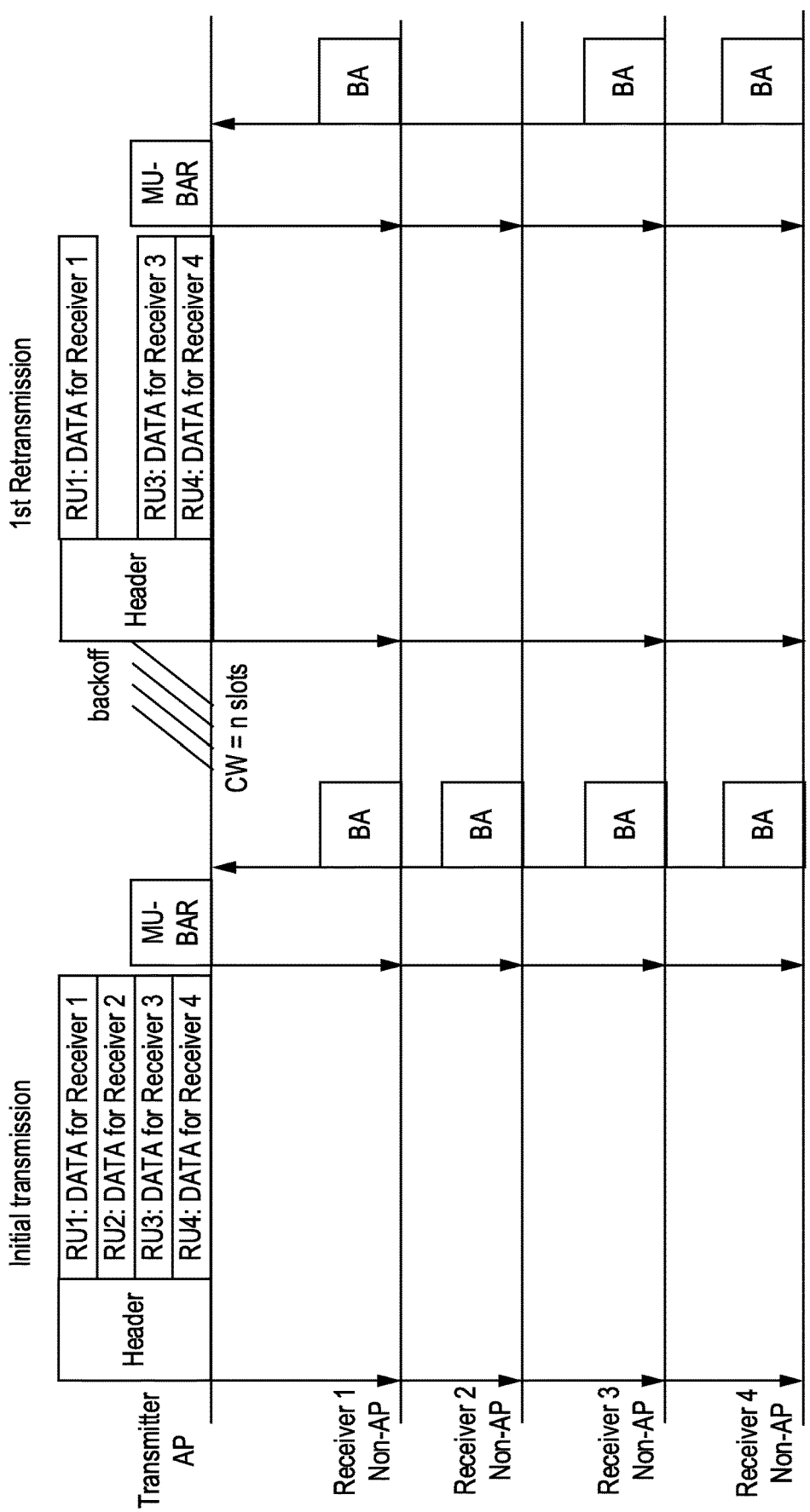
FIG. 15 is a communication sequence diagram for retransmissions in CSMA/CA in the downlink of an OFDMA system.

FIG. 15 illustrates a CSMA/CA retransmission scheme in the downlink of OFDMA systems, as an example of downlink multi-user (DL MU) transmission using OFDMA. The transmitter AP transmits data to its receivers 1, 2, 3 and 4 using the HE MU PPDU format. After finishing the initial transmission, the AP sends a multi-user Block ACK request (MU-BAR) to all the receivers. The receivers then send block ACK (BA) back to the AP. According to the content in the BAs, the AP decides whether to retransmit the packets to receivers 1, 3, and 4. It contends for the channel and waits the backoff time. The first retransmission occurs after the AP gains channel access.

Figure 16:
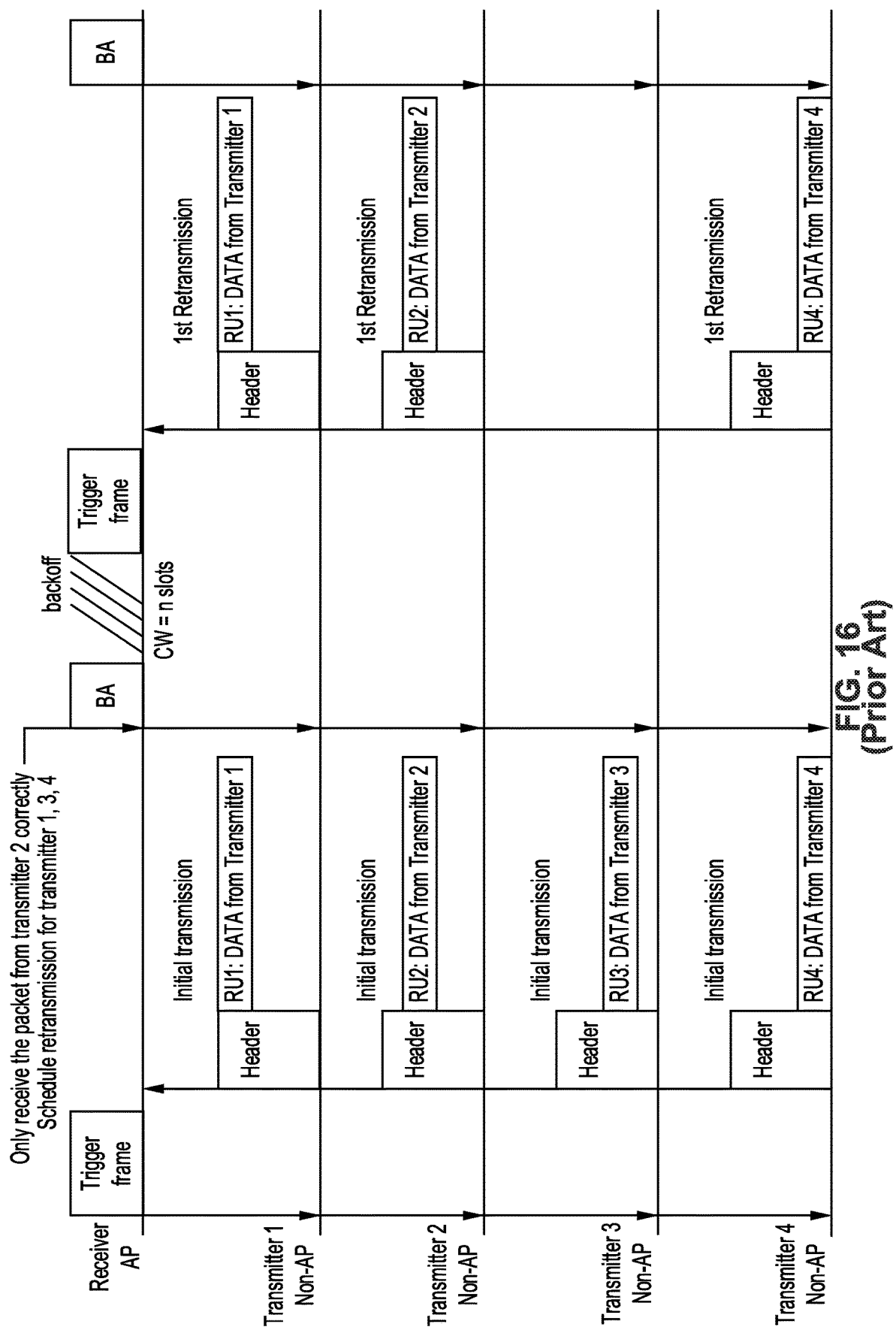
FIG. 16 is a communication sequence diagram for retransmissions in CSMA/CA in the uplink of an OFDMA system.

FIG. 16 illustrates a CSMA/CA retransmission scheme in the uplink of OFDMA systems, showing an example of uplink multi-user transmission using OFDMA. The AP first sends a trigger frame to all the transmitters 1, 2, 3, and 4. The transmitters receive the trigger frame and start the initial transmission using the resource block allocated by the trigger frame. The multi-user transmission packet uses the HE-TB PPDU format. The AP receives the packet from the transmitters and sends a BA frame to report the correctness of the transmission. Here it is exemplified that only the packet carrying the data from transmitter 2 is received correctly. The retransmission needs to be scheduled for transmitters 1, 3, and 4. The AP contends for the channel and waits the backoff time to gain the channel access. Then, the retransmission proceeds in the same manner as the initial transmission.

1.2.5. UL OFDMA Random Access 802.11ax introduced UL OFDMA random access for UL transmission when the AP does not know which STA has data to transmit or when unassociated STAs want to transmit data. The trigger frame can allocate some RUs for random UL channel access. When the AP assigns specific RUs for uplink random access the STAs use OFDMA back-off procedures to decide whether they will access the random access channel or not. This is done by selecting a back-off random value and comparing it to the number of RUs assigned for random access. If the current back-off random value is less than the number of RUs, the STA randomly accesses one of the RUs assigned for random access. The random access method is expected to provide increased efficiency for short packet transmissions.

1.2.6. PHY Parameters Affecting Delay 1.2.6.1. Bandwidth 802.11 allows for channelization or various bandwidths. The channel assigned for one STA transmission or reception can be 20 MHz, 40 MHz, 80 MHz or 160 MHz. Increasing the bandwidth should generally help to increase data throughput and logically free the channel for other user transmission to allow users to complete their transmission in less time; because users may more often obtain a transmission opportunity when the channel is not occupied. However, other effects might result in more delay where the additional bandwidth utilized increases channel noise which negatively impacts the received signal. Also this higher bandwidth increases the possibility of interference with any user employing a part of the locked channel. The channel in this case can be interference frequency selective. This can result in errors in both reception and retransmission. As previously discussed packet retransmission in a WLAN can induce significant delays.

1.2.6.2. Modulation 802.11ac allows constellations of up to 256 QAM and 802.11ax allows up to 1024-QAM. Although this can help increase the data throughput to up to multiple gigabits. The signal would be very sensitive to noise and interference. If the signal to interference and noise ratio is not sufficiently high, this results in decoding errors and will require retransmission of the received signal. This can be a source of delay that worsens the delay of the signal.

Also to increase the number of tones, 802.11ax increases the OFDM symbol length to 12.8 μs and allowed multiple guard intervals (GIs) to select among them (0.8 μs, 1.6 μs, 3.2 μs) depending on the channel condition. This resulted in decreasing the overhead and increasing the efficiency of the transmission.

802.11ax allowed the duplication of data on the subcarrier through the use of the optional Dual Carrier Modulation (DCM) feature. This feature increased the reliability of the transmission and decreased the PER, however it reduced throughput by half due to the doubling up of resource use.

1.2.6.3. Frame Length

New features added to 802.11 required additional information to be pushed to the preamble and the frame header. This in return resulted in increasing the overhead and reducing the efficiency of resource utilization. In order to reduce the overhead at such high rates, the maximum length of the frame was increased in 802.11ac to 4692480 bits. For short packets the long frame is not suitable and the overhead will be very high.

2. Problem Statement

A WLAN STA running an application that is delay sensitive usually suffers when operating over WLAN services, and as such often provides poor user experiences or even the inability to rely on WLAN services for those applications. The current wireless protocol defined in 802.11 standard is designed to provide a best effort type of service. The average delay for packet transmission among WLAN devices is usually suitable, however the worst-case delay is often not acceptable for applications that are delay sensitive.

One of the main sources of delay in packet transmission is due to the delay associated with channel access. WLAN devices need to sense the channel before they access the channel. If the channel is found busy, the WLAN device needs to contend for channel access. This is done by using the CSMA/CA protocol that organizes channel access and avoids collision when there are multiple devices trying to access the channel at the same time. However, delay sensitive applications suffer from the delay associated with channel contention. MU-MIMO transmission of UL or DL, despite being designed to be spectrally efficient, can still delay the transmission of the packet due to the overhead of scheduling and channel access.

3. Contribution of the Present Disclosure

In the present disclosure a pre-packet arrival contention procedure is proposed for MU-MIMO UL and DL transmission. The STA running an application informs the MAC layer of the WLAN device of the expected time of arrival of the real time application packet. The MAC layer having received information on the expected time of arrival of the real time application packet determines it will contend for channel access before the packet arrival and schedule the UL or DL transmission even before RTA packet arrival, toward helping reduce transmission delay once the packet is received because the channel is already reserved for packet transmission.

4. Station Hardware Configuration

Figure 17:
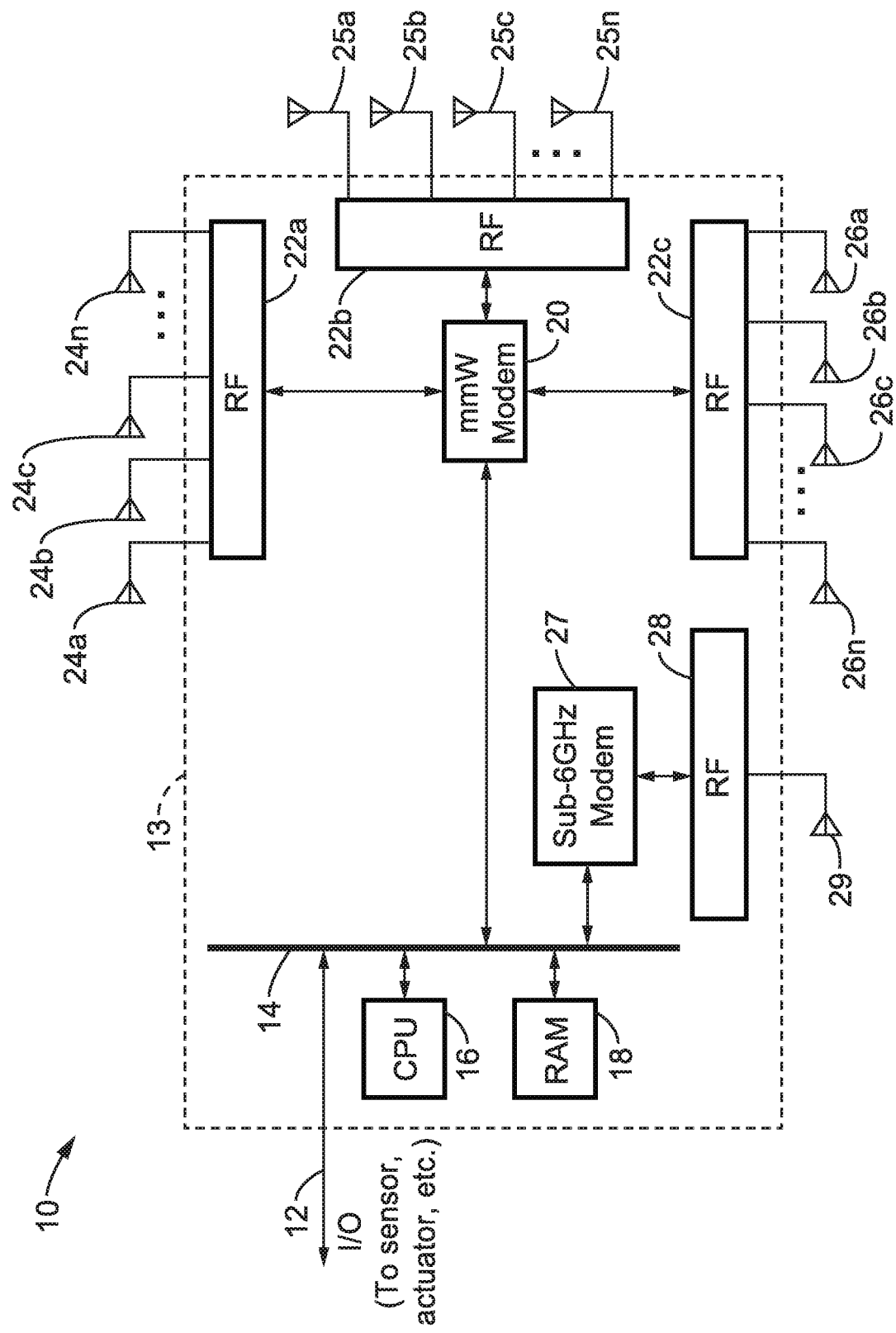
FIG. 17 is a block diagram of station (STA) hardware according to at least one embodiment of the present disclosure.

FIG. 17 illustrates an example embodiment 10 of STA hardware configuration showing I/O path 12 into hardware block 13, having a computer processor (CPU) 16 and memory (RAM) 18 coupled to a bus 14, which is coupled to I/O path 12 giving the STA external I/O, such as to sensors, actuators and so forth. Instructions from memory 18 are executed on processor 16 to execute a program which implements the communication protocols, which are executed to allow the STA to perform the functions of a "new STA", or one of the STAs already in the network. It should also be appreciated that the programming is configured to operate in different modes (source, intermediate, destination, access point (AP), non-access point, RTA station, and so forth); depending on what role, or combination of roles, it is performing in the current communication context.

The STA may be configured with a single modem and single radio-frequency (RF) circuitry, or it may be configured with multiple modems and multiple RF circuits as depicted by way of example and not limitation in the figure. In this example, the host machine is shown configured with a millimeter-wave (mmW) modem 20 coupled to radio-frequency (RF) circuitry 22a, 22b, 22c to a plurality of antennas 24a-24n, 25a-25n, 26a-26n to transmit and receive frames with neighboring STAs. In addition, the host machine is also seen with a sub-6 GHz modem 27 coupled to radio-frequency (RF) circuitry 28 to antenna(s) 29.

Thus, this host machine is shown configured with two modems (multi-band) and their associated RF circuitry for providing communication on two different bands. By way of example and not limitation the intended directional communication band is implemented with a mmW band modem and its associated RF circuitries for transmitting and receiving data in the mmW band. The other band, generally referred to as a discovery band, comprises a sub-6 GHz modem and its associated RF circuitry for transmitting and receiving data in the sub-6 GHz band.

Although three RF circuits are shown in this example for the mmW band, embodiments of the present disclosure can be configured with modem 20 coupled to any arbitrary number of RF circuits. In general, using a larger number of RF circuits will result in broader coverage of the antenna beam direction. It should be appreciated that the number of RF circuits and number of antennas being utilized is determined by hardware constraints of a specific device. Some of the RF circuitry and antennas may be disabled when the STA determines it is unnecessary to communicate with neighbor STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

It is seen therefore, that the host machine accommodates a modem which transmits/receives data frames with neighboring STAs. The modem is connected to at least one RF module to generate and receive physical signals. The RF module(s) include a frequency converter, array antenna controller, and other circuitry as necessary. The RF module(s) are connected to multiple antennas which are controlled to perform beamforming for transmission and reception. In this way, the STA can transmit signals using multiple sets of beam patterns.

5. Topology Under Study

FIG. 18 illustrates an example topology 30 for the sake of the following discussion. The topology depicts multiple BSSs 32, 34, 36. BSS1 32 is considered to have an Access Point (AP) 38a running non-RTA streams, and an STA 38b running RTA streams, and three STAs 38c, 38d and 38e running non-RTA streams. For the sake of simplicity of illustration, it will be noted that aside from the AP itself, none of the other STAs are considered to be APs. Similarly in BSS2 34 there is an AP 42a running RTA streams, three STAs 42b, 42c and 42d running RTA streams, and STAs 42e and 42f running non-RTA streams. In BSS3 36 there is seen an AP 40a running RTA streams and STAs 40b, 40c, 40d, and 40e running non-RTA streams. The BSSs are sharing the same channel where some of the devices are running RTAs and need to guarantee quick channel access to transmit their data.

Figure 19:
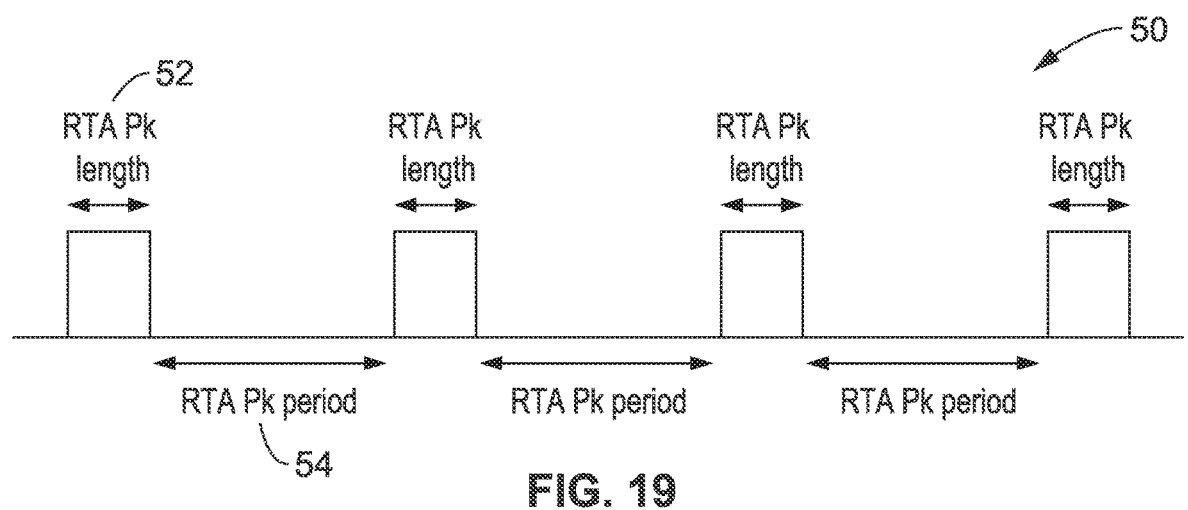
FIG. 19 is a communication sequence diagram of a station running a real-time application (RTA) according to at least one embodiment of the present disclosure.

FIG. 19 illustrates an example 50 of STAs running real-time applications (RTAs) which are generating a limited amount of data 52 (one or more packets of limited length) every period of time 54. As seen in the figure, RTA packets are arriving to the MAC layer of the STA running RTA at an expected time and are preferably to be transmitted in real time so that the real-time application continues to be responsive in real-time. Once an RTA packet is received, the next time for an RTA packet to arrive is known before hand, such as by the real-time application informing the MAC layer of RTA session parameters. Each BSS contains one AP and multiple STAs, each of which can run an RTA session. Each RTA session is expected to have a packet generated with limited length with specific periodicity.

As was shown in FIG. 18, stations from multiple BSSs could compete to gain channel access for the RTA sessions and other non-RTA sessions. Each BSS is exemplified with some STAs that run RTAs, and since an RTA has a lower tolerance to delay it should more readily have access to the channel once the packet is ready for transmission. An AP can favor its RTA packets and provide them increased (higher) priority than other STAs in its BSS which request the channel by rejecting the RTS from other STAs in its BSS. An AP still needs to be able to compete with other STAs from other BSSs in the surrounding area. The STAs and the APs may be equipped with MIMO antennas.

6. Channel Access Delay

The packet can experience numerous types of delays after it is generated at the application layer of the transmitter, until the time it is delivered to the application layer at the receiver. One of these delays is the channel access delay, which represents the delay associated with gaining channel access when the channel is free and not in use. The following attempts to identify the source of this delay.

Any STA using a WLAN is required to listen before it talks, while STAs using CSMA/CA sense the channel before accessing it and avoid collision. Any station before accessing the channel should sense the channel, if the channel is free, the STA can access the channel. If the channel is occupied, the STA should wait until the channel is unoccupied toward minimizing the probability of collision with other STAs trying to access the channel. The channel is considered free or busy through detecting energy on the channel or by receiving a packet header. Due to sharing the medium with many STAs where some are trying to access the channel at the same time, collision avoidance mechanisms are utilized to prevent two channels from accessing the channel at the same time resulting in the collision of both transmitted packet streams.

Figure 20:
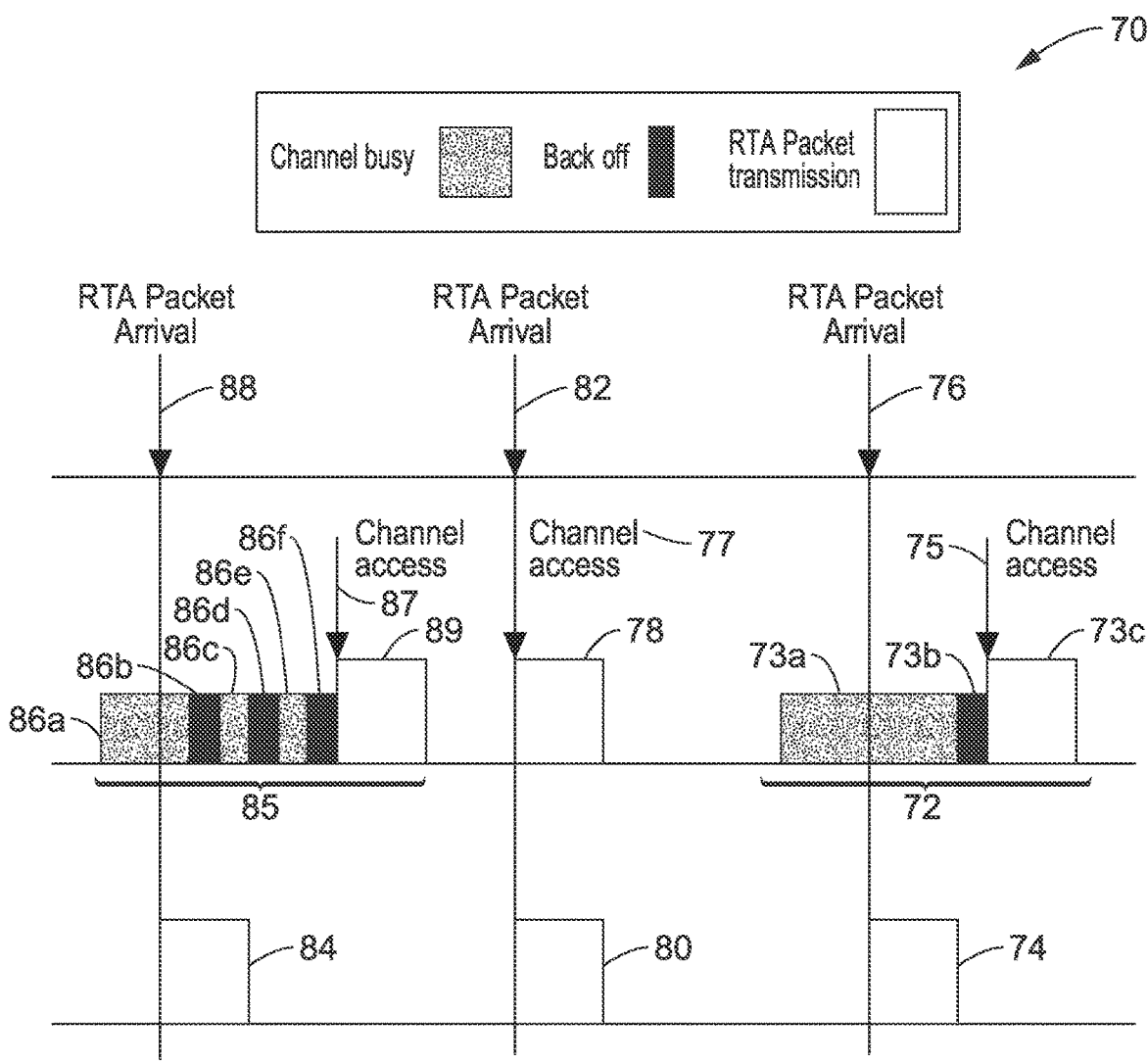
FIG. 20 is a communication sequence diagram showing different channel access scenarios addressed according to at least one embodiment of the present disclosure.

FIG. 20 illustrates some example channel access scenarios 70. In a first instance seen on the right side of the figure, a packet 74 arrives at time 76 during the busy portion 73a of channel activity 72. The STA contends for the channel and performs a random back-off (random back-off timer) 73b, and then accesses 75 the channel to send packet 73c if the channel is not busy.

Moving to the scenario in the middle of the figure, if an RTA packet 80 arrives at time 82 when the channel is not busy (free), then the STA gains immediate access 77 of the channel and starts transmitting the RTA packet 78 right away.

Moving to the scenario on the left side of the figure, it should be appreciated that after RTA packet arrival the STA may be unable to access the channel even when the channel is free again. For instance upon packet 84 arrival at time 88 that the channel activity 85 is seen showing a busy channel 86a upon packet arrival, so the STA waits until the channel is unoccupied and sets its back-off timer 86b, however, during this time some other channel might gain access to the channel before its back-off timer expires. Thus, after the back-off interval the channel is found to be still busy 86c, which can occur multiple times, with additional back-off intervals 86d, and busy periods 86e, before a back-off interval 86f after which the channel access 87 is gained for packet 89 transmission. The time interval from the RTA packet arrival to the channel access time represents channel access delay and is considered one of the largest sources of delay for WLAN packet transmission.

7. Pre-packet Arrival Channel Contention

7.1. RTA Stream Setup

The MAC layer should be aware of the packets of the RTA that need to be treated differently. The MAC layer is expected to run special processes (e.g., algorithms) to access the channel and give priority to transmit the RTA packets at the exact time they are supposed to be transmitted. The Application layer upon starting a real time application should inform the MAC layer of the initiation of the RTA session. The application layer upon starting a real time application should inform the MAC layer of the RTA session parameters. The parameters that are used for channel access includes: (a) maximum RTA packet length; (b) maximum number of packets to be received for each channel access; (c) RTA packet channel access periodicity; (d) expected time the RTA packet is to be generated and sent to the MAC; and (e) maximum delay tolerance.

FIG. 21 illustrates an example embodiment 110 in which primitive parameters from the application layer or any other higher layer 112 are sent to the MAC layer 114 above PHY layer 116.

FIG. 22 illustrates an example embodiment 130 of a New Session request having channel access parameters, including at least the following. (a) A New Session Request is a field indicating that the Application layer is initiating a new RTA session if set to a first state. If the new session request field not set to this first state, the following parameter represents an update to the previously initiated RTA session. It should be appreciated with this and other fields described in the document that either positive or negative logic may be utilized for single bit True/False fields, and any desired form of representation may be used for multi-bit fields without departing from the teachings of the present disclosure. The MAC layer should initiate an RTA session upon receiving a new session request and accepting it. The details of initiating the RTA session are discussed in the following sections.

(b) A Session ID field is utilized by the application layer to indicate a session ID in referring to the initiated RTA session. The MAC layer associates the following parameters to the session ID. Any further communication between the higher layer and MAC layer regarding this RTA session should include this session ID. This includes updating, deleting or modifying the RTA session.

(c) A Maximum RTA Packet Length field represents the maximum size of each packet delivered to the MAC layer in bits or with respect to time. The MAC layer uses this information to estimate the time needed for each channel access for the RTA.

(d) A Number of Packets to be Received field for each channel access refers to the maximum number of packets to be delivered to the MAC layer for each RTA channel access. The MAC layer uses this information to estimate the time needed for each channel access for the RTA. It should be appreciated that the previous two variables can be combined into one variable if the higher layer sends the time required in each channel access instead of the number of packets and packet size.

(e) A Packet Periodicity field represents the time the MAC layer should expect the next RTA packets to arrive after one expected time for the RTA packet. This is the periodicity of the channel access for the RTA packets. The MAC layer uses this information to estimate the time where RTA packets will be arriving from the higher layer.

(f) Maximum Delay Tolerance is a field representing the maximum delay tolerated by the packet received from the high layers. In response to the value of this field the MAC layer might drop the packet and not keep trying to deliver it after the maximum delay tolerance is expired.

(g) Session Life Time is a field representing how long (duration) that the RTA session is active. This can be represented as a time relative to the start of the RTA packet generation time, or can be represented in terms of a number of periodic cycles of RTA packet transmission. The MAC layer is expecting the RTA packet arrival for the period of time defined by the session life time.

FIG. 23 illustrates an example embodiment 150 of primitive parameters of the response to the New Session request that the MAC layer can send to higher layers in response to the RTA stream initiation and received parameters, which are described below.

(a) A Response field indicates if the requirements received are achieved as is. If set to a first state (e.g., one) then the application layer need not change its parameters. If set to a second state (e.g., zero), the application layer should either accept the suggested parameters or resend a new set of parameters.

(b) Session ID field indicates which RTA session this response and parameter refers to. The application layer uses this information to match the session ID with all other RTA running sessions.

(c) Maximum RTA Packet Length field represents the suggested maximum size of each packet delivered to the MAC layer in bits or time in case the response was zero. The MAC layer uses this information to estimate the time needed for each channel access for the RTA.

(d) Maximum number of packets to be received for each channel access is a field representing the suggested maximum number of packets to be delivered to the MAC layer for each RTA channel access in case the response number of packets is indicates as zero. The MAC layer uses this information to estimate the time needed for each channel access for the RTA. It should be noted that the above two fields can be combined into one variable if the higher layer sends the time required in each channel access instead of the number of packet and packet size.

(e) A Packets Periodicity field represents the suggested time the MAC layer can expect the next RTA packets to arrive after one expected time for the RTA packet in case the response field in the message was set to zero. This is the periodicity of the channel access for the RTA packets. The MAC layer uses this information to estimate the time where RTA packets will be arriving from the higher layer.

(f) A Maximum Delay Tolerance field represents the suggested maximum delay tolerated by the packet received from the high layers in case the response field in the message was set to zero. When the response is zero this indicates that the MAC layer is suggesting a new parameter to the APP layer and is not accepting the parameter requested by the APP layer. The MAC layer might drop the packets and not keep trying to deliver it after the maximum delay tolerance is expired.

(g) A Session Lifetime field represents how long the RTA session is active, and can be specified in time relative to the start of the RTA packet generation time, or it can be specified in terms of the number of periodic cycles of RTA packet transmission. The MAC layer is expecting the RTA packet arrival for the period of time defined by session life time.

7.2. Contention and Channel Statistics

To allow the STA to prepare for RTA packet transmission at the appropriate time, the STA needs to collect statistics about how busy the channel is. If the channel is completely free, the STA can access the channel without contention. If the channel is occupied, the STA is configured to wait for the channel to be free and run a back-off timer to access the channel. Once the timer expires the STA can access the channel. To make certain that the RTA packet is delivered on time the channel should be reserved, or about to be reserved, at the time when the packet arrives. The STA needs to know the statistics of the channel to make the right decision about when to try and access the channel.

Channel statistics can comprise one or more of the following. (a) Information on a number of STAs which are accessing the channel, and this can be further divided into: (a)(i) number of STAs around accessing the channel from the same BSSID where the STA is part of; (a)(ii) number of STAs around accessing the channel and belongs to a different BSSID than the one the STA is part of; and (a)(iii) number of STAs around accessing the channel and it can't be detected which BSSID it is part of. It will be noted that the STA can utilize the detected PHY headers and possibly MAC header to estimate the statistics. (b) Percentage of time the channel is occupied by other STAs, which can be furtherly divided into: (b)(i) percentage of time the channel is occupied by STAs of the same BSSID; (b)(ii) percentage of time the channel is occupied by STAs of different BSSID; and (b)(iii) percentage of time the channel is occupied by STAs where the BSSID is not identified. It should be noted that the STA can utilize the detected PHY headers and possibly MAC header to estimate these statistics. (c) Channel delay access time represents the average time for accessing the channel once a packet is ready to be transmitted. (d) Back-off timer interruption statistics represent the statistics for the number of times the back-off timer is interrupted.

It will be noted that the STA does not have to be awake at all times to collect these statistics, for example the STA can wake up (periodically or in response to state/inputs) and calculate these statistics every period of time. The STA can also be in a mode to only collect the statistics while it is trying to access the channel which allows the STA to conserve energy and thus it does not need to wake up solely for the purpose of collecting statistics.

7.3. Early Contention Window Period

Once the STA establishes an RTA session it starts running a timer for the next RTA packet arrival. According to the present disclosure, the STA can contend for channel access even before RTA packet arrival. This is to avoid someone gaining access to the channel immediately prior to packet arrival. If the channel is busy during the period of time before packet arrival by the early contention window period, the STA should start contention. If the channel is free during that time, the STA continues to monitor the status of the channel. The size of the early contention window period should be related to the collected statistics, where the statistics are showing that the channel is more highly occupied (e.g., more STAs, more time the channel is occupied, higher channel access delay or higher back-off timer interruption ratio). The early contention window period length can be manually set to a fixed value or can be dynamically adjusted according to channel statistics.

Figure 24:
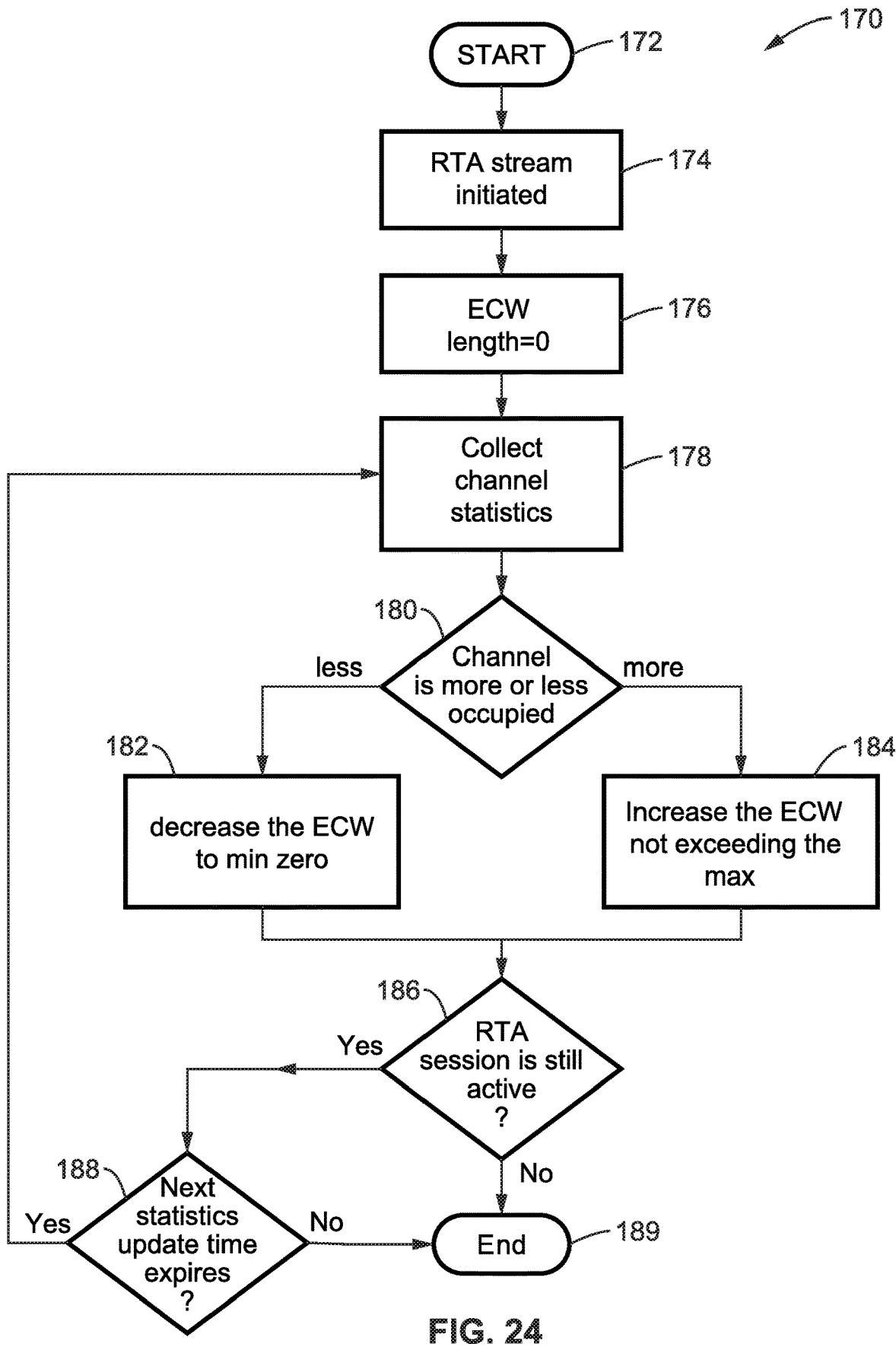
FIG. 24 is a flow diagram of dynamic adjustment of the early contention window period according to at least one embodiment of the present disclosure.

FIG. 24 illustrates an example embodiment 170 representing dynamic adjustment of the early contention window period. Once the routine begins 172 an RTA session is initiated 174, and the early Contention Window (ECW) period is set to zero or an initial value 176. Over a period of time the statistics of the channel are updated, depicted in this flow chart as a loop, and the more the channel is congested the more the ECW period is increased in value. Once the channel is less congested, the value of the ECW period decreases.

In particular, channel statistics are collected 178, then a check made 180 if the channel is more or less occupied. This determination depends on a threshold level, above which the channel is considered "more" occupied, and below which it is considered "less" occupied. If found to be less occupied, then execution reaches block 182 and the ECW period value is decreased toward a minimum value (e.g., zero). Alternatively, if found to be more occupied, then execution reaches block 184 and the ECW period value is increased toward a maximum value. In either case, a check is then made 186 if the RTA session is still active. If it is still active, then timer expiration is awaited 188 with a return to block 178; otherwise execution ends 189.

It will be noted that for the sake of simplicity of illustration this and other flow diagrams depict the flow simply in a time-linear manner. However, it will be appreciated that the steps being executed can be performed in a multitasking or multikernel environment, where steps in the flowchart are being performed in its task and/or thread while other actions are being performed for other tasks and/or threads.

7.4. Early Channel Access Window

The STA running RTA may occupy the channel before the RTA packet estimated arrival time to guarantee that no other stations will occupy the channel at that time. The period of time before the estimated arrival of the RTA packet that the STA is allowed to occupy the channel is the early channel access window (ECAW). During this time if the STA decides to gain access to the channel, the STA starts transmitting packets to the intended STA, or any other STA, on condition that by the estimated RTA packet arrival time the STA will be ready to transmit the RTA packets. If the STA does not have any packet to transmit during the ECAW and it needs to occupy the channel, the STA transmits a null or dummy packet for the sake of occupying the channel and not allowing anyone else to use the channel. ECAW is expected to be a small period of time and should not result in over occupying the channel with unnecessary transmissions.

7.5. RTA Pre-packet Arrival Channel Contention STA

An AP can commence early contention of the channel once it has an active RTA session at any time. A STA associated with the AP must obtain information about the AP RTA packet session to adjust its sleep and wake cycles toward avoiding missing a packet or delaying a packet due to STA RF is off or not ready to receive packets. The AP sends the STA a frame to inform the STA about the RTA stream initiation and the parameters associated to it. The STA acknowledges reception of the RTA stream initiation frame and adjusts its sleep and wake schedule accordingly.

At any point in time while the RTA session is active, the AP STA can send a request to update the ECW and the ECAW parameters. In at least one embodiment the AP is configured to inform the STA each time the pre-contention parameters are updated and the STA acknowledges the reception of the parameters update frame.

Figure 25:
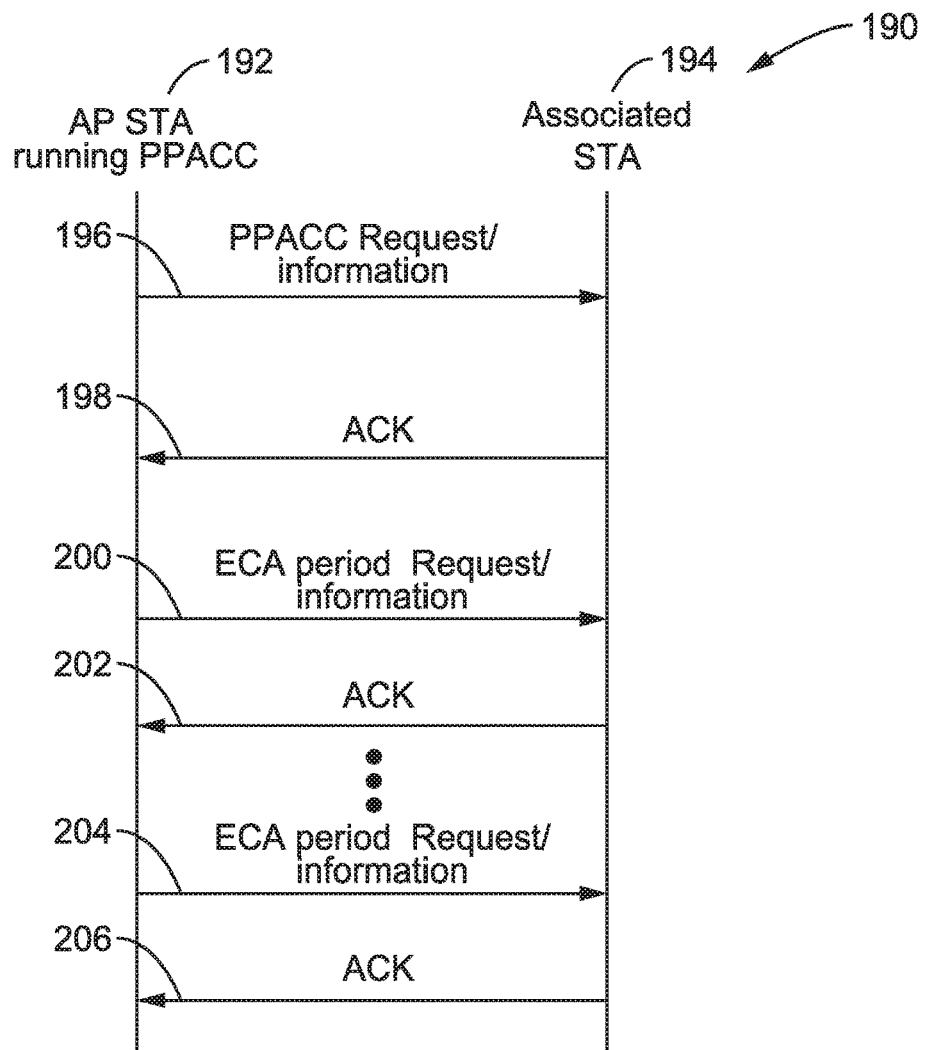
FIG. 25 is a communication sequence diagram exemplifying an exchange between an AP station and an associated non-AP station according to at least one embodiment of the present disclosure.

FIG. 25 illustrates an example embodiment 190 of an AP STA 192 sending 196 a PPACC Request or information frame to the STA 194 it is associated with. The AP is informing the STA about its intention to start an RTA stream. The STA responds 198 to this request with an acknowledgement (ACK) frame. After the acknowledgement of the reception of the PPACC request/information frame the AP can update the RTA session parameters at any time by sending 200 ECA period request/information. The STA should acknowledge (ACK) 202 the reception of the frame and update its parameters associated with that RTA session. Multiple ECA 204 followed by ACK 206 may take place in the session.

8. MU-MIMO Early Channel Contention

Similar to a SISO or SU-MIMO transmission where one user is accessing the channel, when MU-MIMO/OFDMA is used to access the channel the STA needs to listen before transmitting to make certain that the channel is unoccupied before the transmission.

Figure 26:
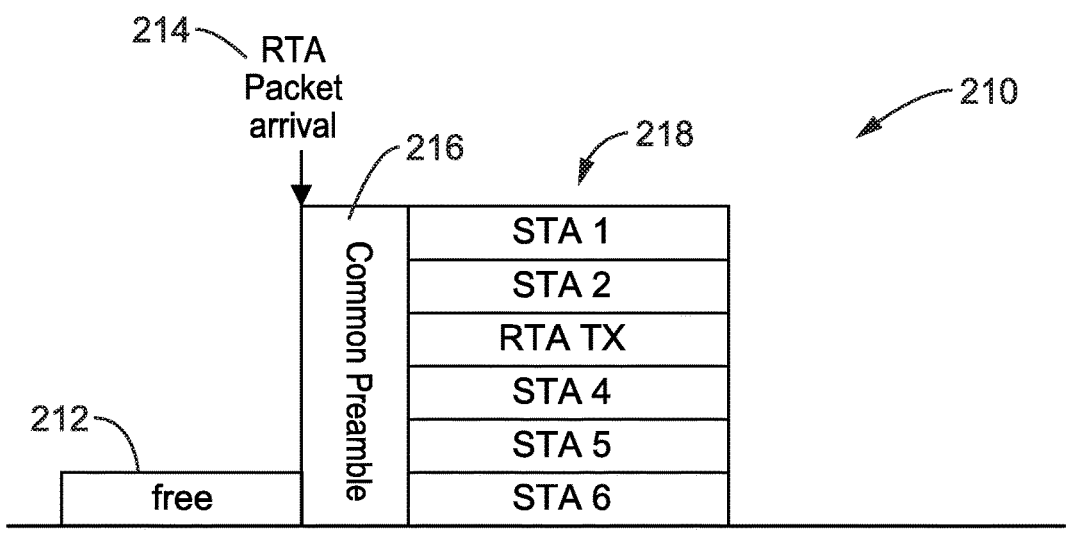
FIG. 26 is an RU transmission diagram exemplifying an AP scheduling MU-MIMO DL packets transmission to multiple STAs according to at least one embodiment of the present disclosure.

FIG. 26 illustrates an example 210 in which the channel is free 212 so upon RTA packet arrival 214 transmission begins OFDMA frame transmission. The AP transmits a common preamble 216 followed by packets transmissions 218 in the assigned resource units (RUs). The AP transmit the RTA packets in one of the assigned RUs to the STA that is expected to receive the RTA packets.

Figure 27:
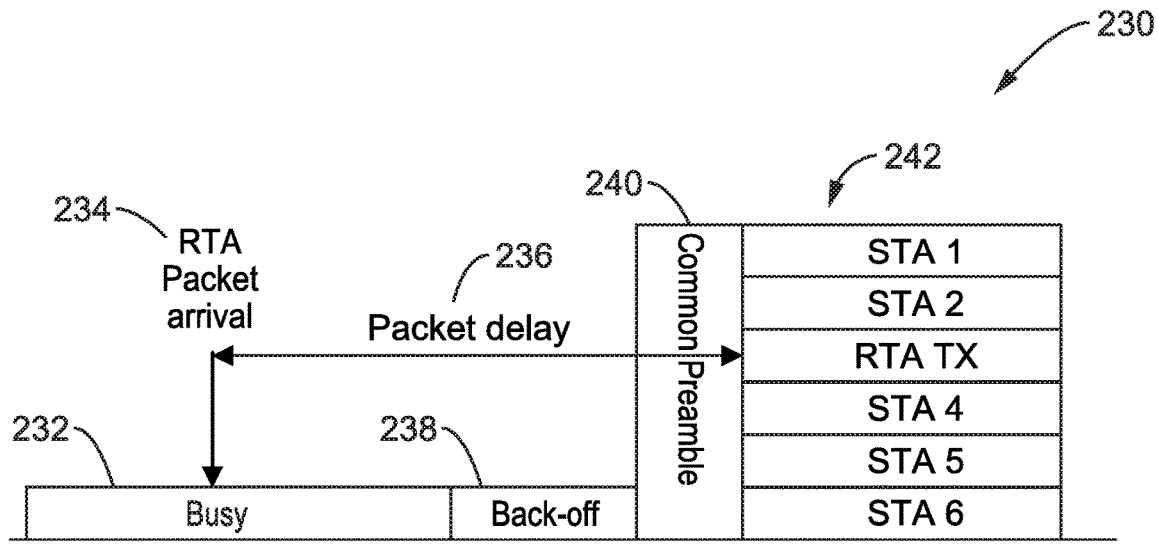
FIG. 27 is an RU transmission diagram exemplifying the case when the AP finds the channel busy through virtual or physical sensing, and must contend for channel access according to at least one embodiment of the present disclosure.

FIG. 27 illustrates an example 230 of the case when the channel is occupied (busy) 232, and the STA commences a contention process in order to gain channel access, with this contention process introducing packet delay. The figure depicts RTA packet arrival 234 from the application, so upon the channel being unoccupied contention begins with a back-off interval 238, and assuming here that access is gained after back-off transmission begin on the channel with a common preamble 240 to all STAs participating in the MU-MIMO/OFDMA transmission. This Common preamble has information about the STAs participating and the allocation of the RUs 242 for each of these STAs, which here are exemplified as STA 1, STA 2, RTA TX, STA 4, STA 5, STA 6.

An AP applying MU-MIMO for DL or allowing UL MU-MIMO can apply the same previously described algorithm when using OFDMA or MU-MIMO transmission. The STA can use the ECWP and the ECCA to gain access of the channel. The STA can be scheduled to transmit its RTA packets even before the data is buffered.

For MU-MIMO/OFDMA transmission whether its DL or UL transmission, the AP is responsible of coordinating the MU-MIMO or OFDMA transmission. The AP in both cases is responsible for gaining access of the channel and coordinating the transmission.

8.1. DL Transmission

If the AP is sending RTA packets to a STA and has obtained information on the expected time of arrival of the RTA packet, then the AP can wait for packet arrival and then sense the channel to determine if the channel is busy or not. If the channel is not occupied, the AP can schedule MU-MIMO DL packet transmissions to multiple STAs including the RTA STA as was shown in FIG. 27 where the RTA TX is assigned to some free RU.

The RTA packet in the busy channel scenario experiences delay due to the channel contention time. It should be appreciated that this time can be more than what is shown in the figure if the AP did not gain access to the channel due to other STAs trying to access the channel too and one of their back-off timers expires before the AP. In any case, the AP according to the present disclosure has knowledge of the time when the channel is needed and can "pre-book" resources (reserve the channel early) and guarantee channel time for the RTA packet.

8.1.1. Early Channel Access

The AP according to the present disclosure has obtained an expected RTA packet arrival time and attempts to reserve the channel before packet arrival. The AP sets a countdown timer to the expected arrival time of the new RTA packet. Every time the AP receives an RTA packet it sets the RTA packet timer and starts counting down to the arrival of the new RTA packet. The AP starts monitoring the channel to see if it is busy or not before the new RTA packet arrival time when the countdown timer reaches a value equal to countdown_channel_monitor_time. If the channel is not busy, the AP keeps monitoring the channel until the counter reaches a value equal to countdown_early_channel_access_time when the AP gains access to the channel. If the channel becomes busy at any time when the AP is monitoring the channel, the AP starts contending for channel access and gains access to the channel. The AP can decide to gain access to the channel before RTA packet arrival without monitoring the channel before the RTA packet arrival if it has transmissions for other STAs and is willing to pre-book the resources (reserve the channel early) for the RTA before the RTA packet arrival.

8.1.2. Padding Transmission Until RTA Packet Arrival

The AP according to the present disclosure has obtained information on expected RTA packet arrival time and is able to prepare before the packet arrival time. The AP may have other data to be sent to STAs in the same BSS that can be sent using MU-MIMO to the RTA STA and other STAs as well. The AP can gain access to the channel at or before RTA packet arrival, if the AP gained access to the channel before the expected arrival time of the AP, it still assigns an RU to the RTA STA DL transmission and starts the MU-MIMO transmission.

Figure 28:
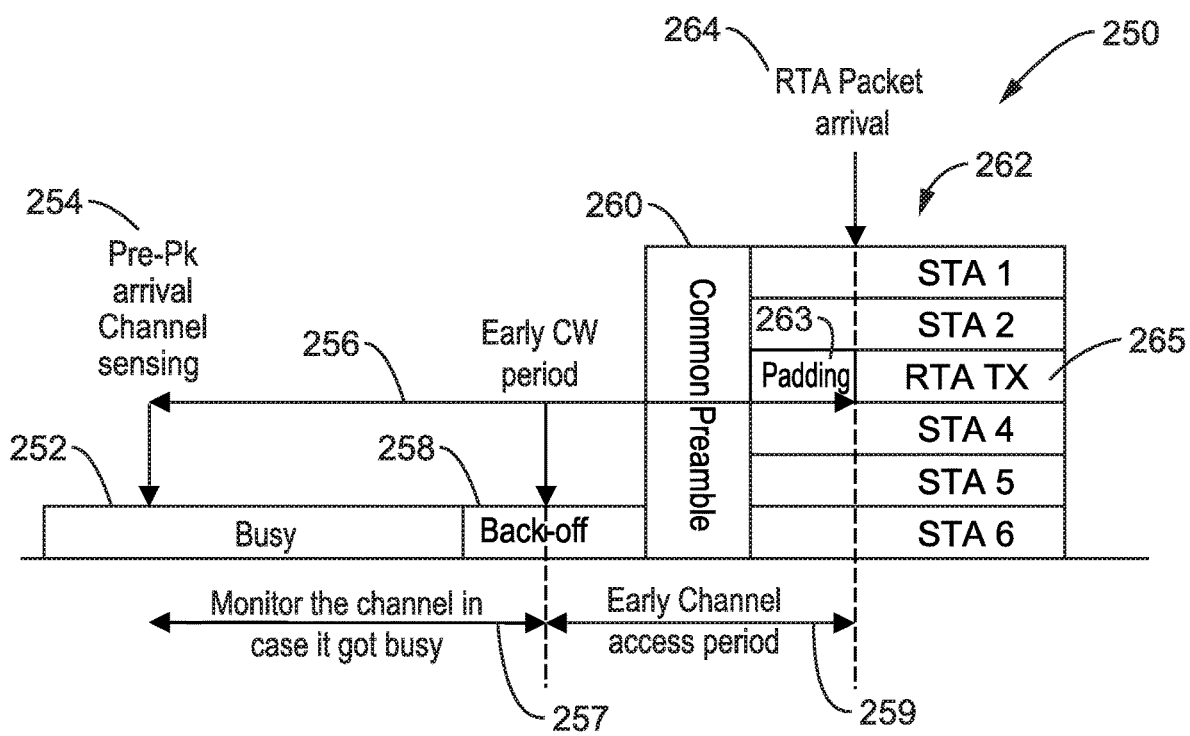
FIG. 28 is an RU transmission diagram exemplifying a case in which a MU-MIMO transmission has already started prior to RTA packet arrival in the MAC buffer performed according to at least one embodiment of the present disclosure.

FIG. 28 illustrates an example embodiment 250 of a case in which a MU-MIMO transmission has already started prior to RTA packet arrival 264 in the MAC buffer, and thus it is not yet available for transmission. The channel is seen as busy 252 through pre-packet arrival channel sensing 254, with the AP monitoring 257 the channel. Channel busy continues into part of the early CW period 256, with the AP waiting for the channel to be unoccupied. When found unoccupied the AP starts a back-off 258 since it has other data to send, and is also performing an early channel access 259 for the RTA data which has not been received yet. AP gains channel access to the channel and starts MU-MIMO DL transmission, first with a common preamble 260. The AP starts sending MU-MIMO DL packets 262 transmission to multiple STAs, including the RTA STA even though the RTA packet has not arrived yet, where the RTA TX is assigned to some free RU. The AP is seen here generating padding 263 prior to RTA packet arrival 264, after which the RTA is transmitted 265. Thus, the AP starts the transmission of the DL MU-MIMO and puts padding at the beginning of the RTA TX packet as shown in the figure. Once the RTA packet arrives to the MAC queue, the padding data is suspended and the RTA packet data is added to the transmission.

Figure 29:
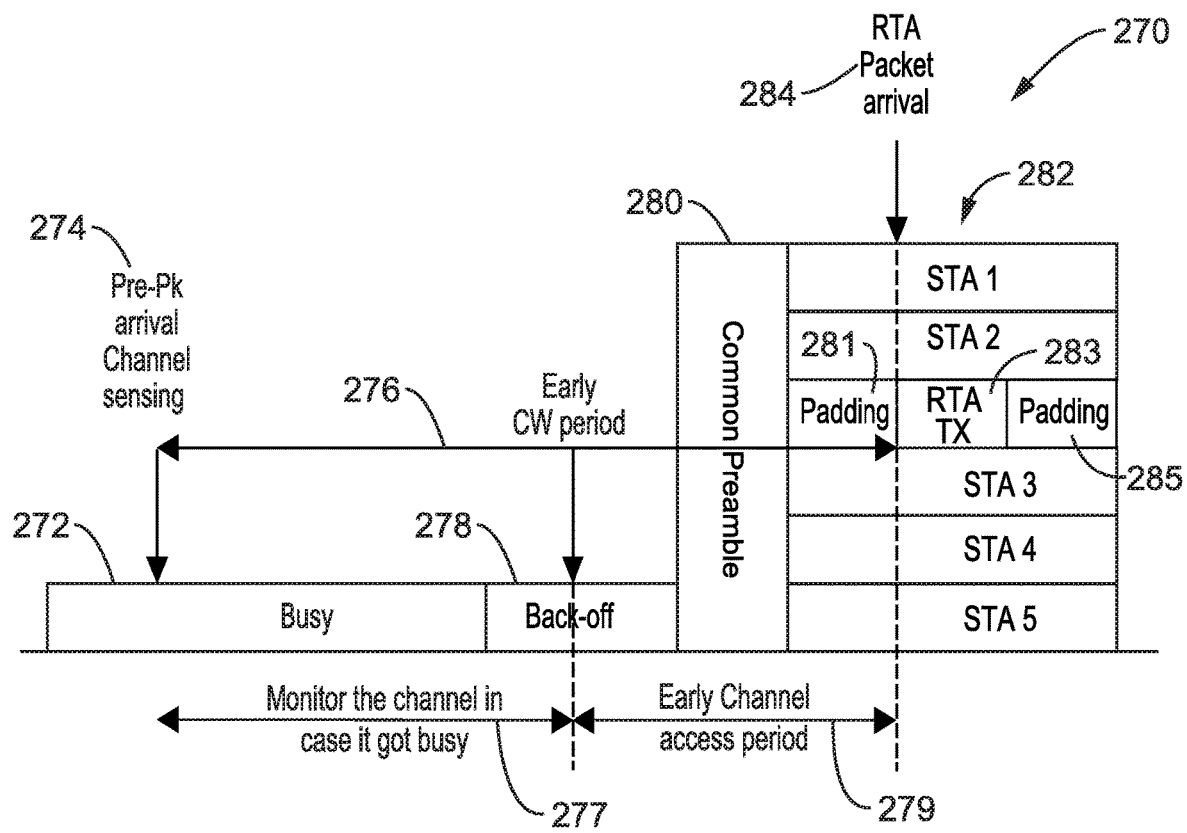
FIG. 29 is an RU transmission diagram exemplifying a case in which RTA packet data transmission is started after and finishes before the end of the DL MU-MIMO transmission performed according to at least one embodiment of the present disclosure.

FIG. 29 illustrates an example embodiment 270 of a case in which RTA packet data transmission is started after and finishes before the end of the DL MU-MIMO transmission, the AP adds padding after the RTA packet data to synchronize the end of transmission of data on the RU assigned to the RTA STA with the end of transmission of the RUs assigned to other STAs.

The channel is seen as busy 272 through pre-packet arrival channel sensing 274, with the AP monitoring 277 the channel. Channel busy continues into part of the early CW period 276, with the AP waiting for the channel to be unoccupied. When found unoccupied, the AP starts a back-off 278 since it has other data to send, and is also performing an early channel access 279 for the RTA data which has not been received yet. AP gains channel access and starts MU-MIMO DL transmission, first with a common preamble 280, followed by data 282. The AP starts sending MU-MIMO DL packets 282 transmission to multiple STAs, including the RTA STA even though the RTA packet has not arrived yet, where the RTA TX is assigned to some free RU. The AP is seen here generating padding 281 prior to RTA packet arrival 284, after which the RTA is transmitted 283, and since the short RTA TX is completed, then it is followed by additional padding 285.

Figure 30:
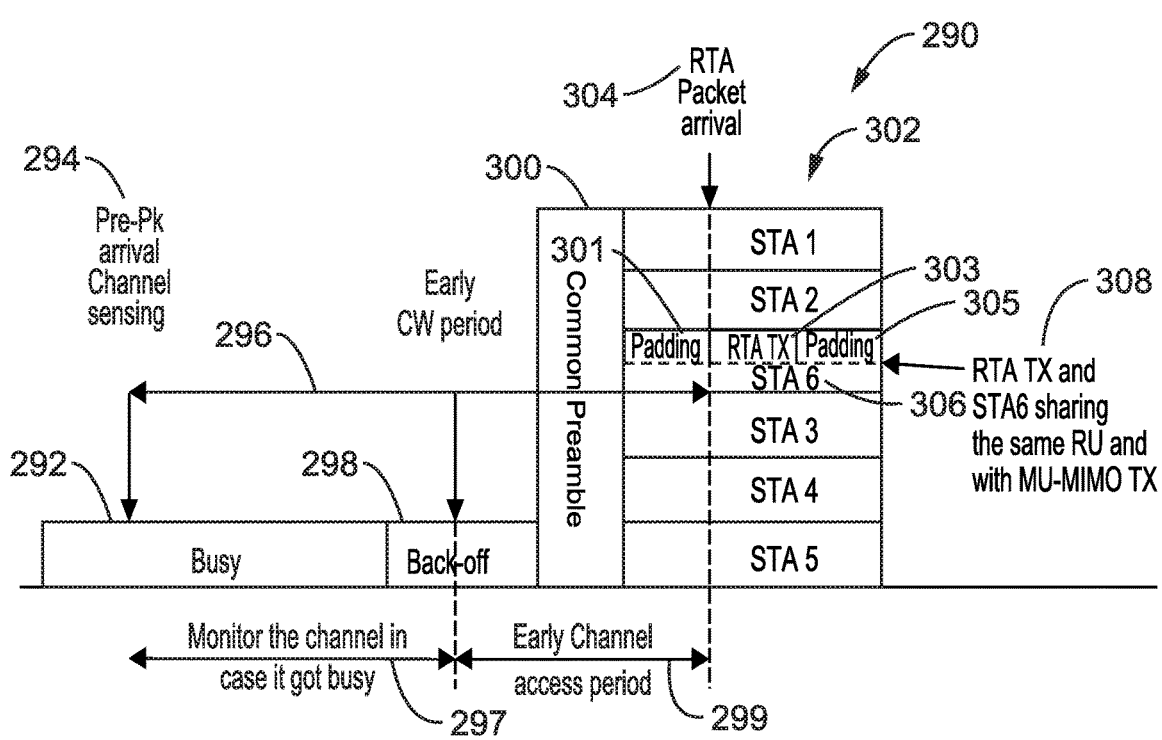
FIG. 30 is an RU transmission diagram exemplifying a case in which the AP schedules more than one STA to access the RU during the time assigned for the RTA transmission as performed according to at least one embodiment of the present disclosure.

FIG. 30 illustrates an example embodiment 290 of a case in which the AP operating according to the present disclosure schedules more than one STA to access the RU during the time assigned for the RTA transmission spatial sharing and MU-MIMO transmission technique. In this example, the channel is seen busy 292 through pre-packet arrival channel sensing 294, with the AP monitoring 297 the channel. Channel busy continues into part of the early CW period 296, with the AP waiting for the channel to be unoccupied. When found unoccupied, the AP starts a back-off 298 since it has other data to send, and is also performing an early channel access 299 for the RTA data which has not been received yet. AP gains channel access and starts MU-MIMO DL transmission, first with a common preamble 300, followed by data 302. The AP starts sending MU-MIMO DL packets 302 transmission to multiple STAs, including the RTA STA even though the RTA packet has not arrived yet, where the RTA TX is assigned to some free RU. The AP is seen here generating padding 301 prior to RTA packet arrival 304, after which the RTA is transmitted 303 and completes before the MU-MIMO DL transmission, so additional padding 305 is also sent. It will be seen in this example that RTA TX 303 is being shared 308 with STA 6 306.

8.1.3. Scheduling Consecutive Transmissions on Same RU

In this example the AP operating according to the present disclosure has information on expected RTA packet arrival time and is able to prepare for that transmission before packet arrival. In this specific example, the AP might have other data to be sent to STAs in the same BSS that can be sent using MU-MIMO to the RTA STA and other STAs as well. The AP can gain access to the channel at or before RTA packet arrival, if the AP gained access to the channel before the expected arrival time of the AP still assign an RU to the RTA STA DL transmission and start the MU-MIMO transmission.

Figure 31:
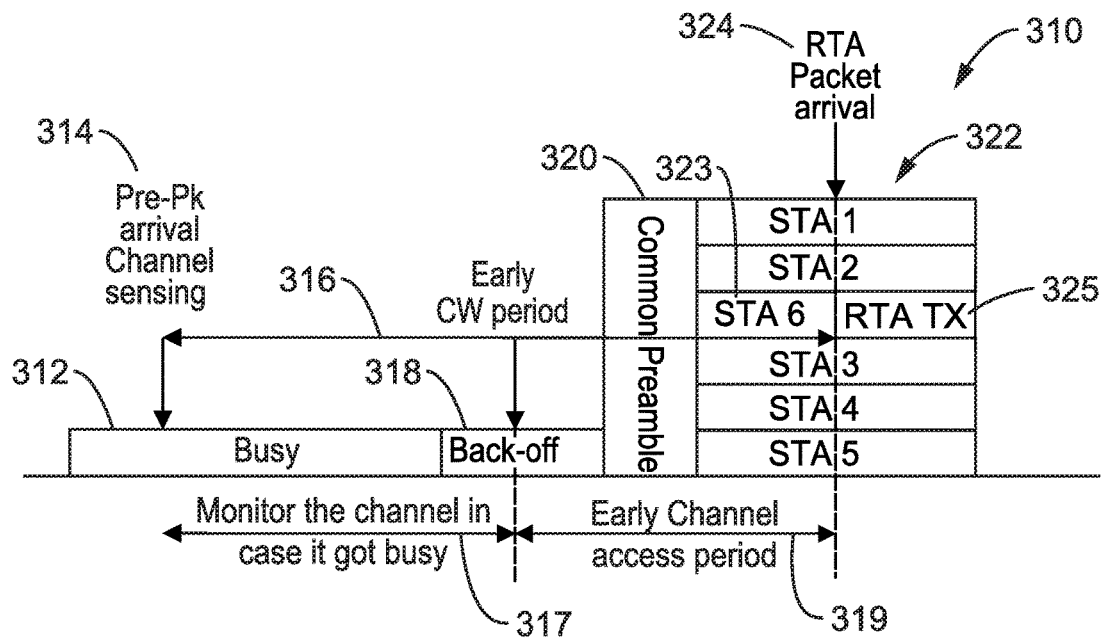
FIG. 31 is an RU transmission diagram exemplifying of an RU assigned to the RTA STA being shared with other STAs that are receiving RTA packets or receiving regular non-RTA packets as performed according to at least one embodiment of the present disclosure.

FIG. 31 illustrates an example embodiment 310 of an RU assigned to the RTA STA being shared with other STAs that are receiving RTA packets or receiving regular non-RTA packets. The sharing is a time based sharing that is performed by scheduling one STA transmission after the other. The STAs timeshare the RU as the time of the RU is divided between the two STAs.

The channel is seen busy 312 through pre-packet arrival channel sensing 314, with the AP monitoring 317 the channel. Channel busy continues into part of the early CW period 316, with the AP waiting for the channel to be unoccupied. When found unoccupied, the AP starts a backoff 318 since it has other data to send, and is also performing an early channel access 319 for the RTA data which has not been received yet. AP gains channel access and starts MU-MIMO DL transmission, first with a common preamble 320, followed by data 322. The AP starts sending MU-MIMO DL packets 322 transmission to multiple STAs, one being STA 6 323, then upon RTA packet arrival 324 the RTA data is transmitted 325. It is thus, seen that the RU was shared between the non-RTA and RTA traffic.

Figure 32:
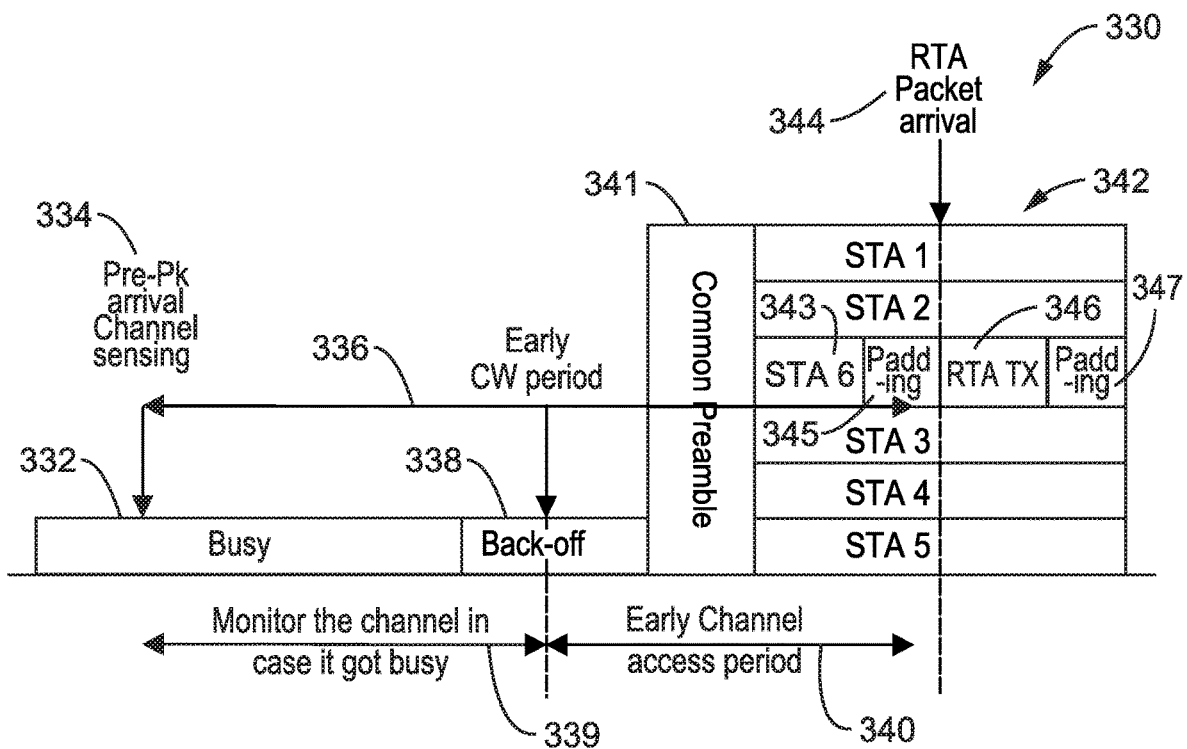
FIG. 32 is an RU transmission diagram exemplifying a case in which an AP utilizes padding before and/or after the RTA packet according to at least one embodiment of the present disclosure.

FIG. 32 illustrates an example embodiment 330 of a case in which an AP operating according to the present disclosure utilizes padding before and/or after the RTA packet to enable bits being sent and transmitted all the time in the MU-MIMO packet toward reducing the Peak-to-Average Power Ratio (PAPR) in the time assigned to RTA packet transmission. It will be appreciated that PAPR is the relation between the maximum power of a sample in a given packet transmission divided by the average power of that transmission. The padding is utilized before RTA packet transmission if the time assigned to the RTA packet transmission has been reached, but the packet is not yet available. The padding is utilized after the RTA packet is transmitted if the RTA packet data transmission is finished before the end of the MU-MIMO packet transmission.

More specifically the figure depicts a busy channel 332 through pre-packet arrival channel sensing 334, with the AP monitoring 339 the channel. Channel busy continues into part of the early CW period 336, with the AP waiting for the channel to be unoccupied. When found unoccupied, the AP starts a back-off 338 since it has other data to send, and is also performing an early channel access 340 for the RTA data which has not been received yet. AP gains channel access and starts MU-MIMO DL transmission, first with a common preamble 341, followed by data 342. The AP starts sending MU-MIMO DL packets 322 transmission to multiple STAs, one being STA 6 343. If the STA 6 transmission completes before RTA packet arrival 344, then padding 345 is generated. Upon RTA packet arrival 344 the RTA data is transmitted 346. If the RTA TX 346 completes before the end of the OFDMA frame, then padding 347 is generated. Thus, in this figure it is seen that the RU was shared between the non-RTA and RTA traffic.

Figure 33:
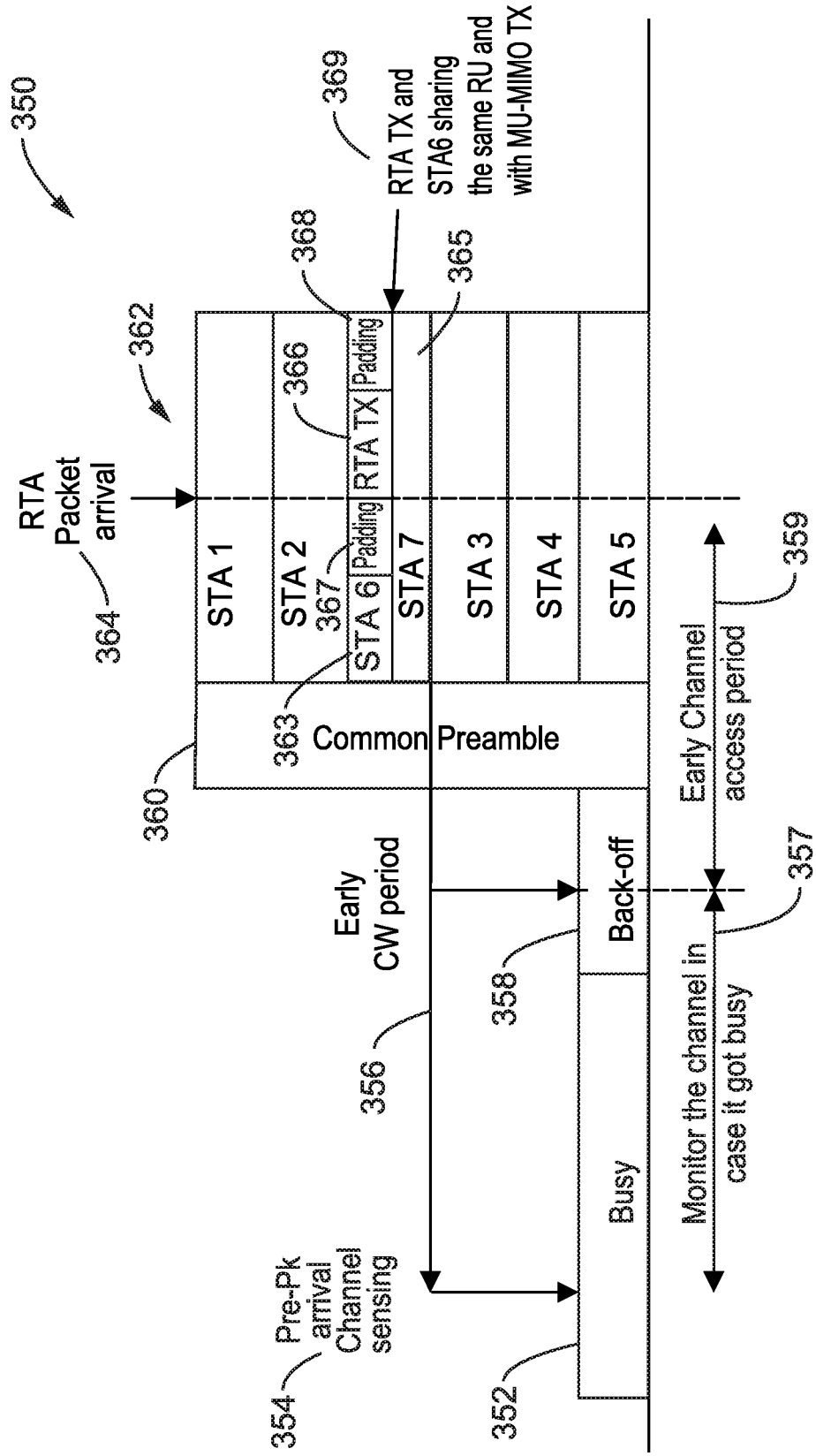
FIG. 33 is an RU transmission diagram exemplifying a case in which an AP schedules more than one STA to access the RU during the time assigned for the RTA transmission as performed according to at least one embodiment of the present disclosure.

FIG. 33 illustrates an example embodiment 350 of a case in which an AP operating according to the present disclosure to schedule more than one STA to access the RU during the time assigned for the RTA transmission or the other scheduling for that RU through spatial sharing and MU-MIMO transmission techniques as shown in the figure.

Specifically the figure depicts a busy channel 352 through pre-packet arrival channel sensing 354, with the AP monitoring 357 the channel. Channel busy continues into part of the early CW period 356, with the AP waiting for the channel to be unoccupied. When found unoccupied, the AP starts a back-off 358 since it has other data to send, and is also performing an early channel access 359 for the RTA data which has not been received yet. AP gains channel access and starts MU-MIMO DL transmission, first with a common preamble 360, followed by data 362. The AP starts sending MU-MIMO DL packets 362 transmission to multiple STAs, one being STA 6 363 which is sharing the RU with STA 7 365. If STA 6 transmission completes prior to RTA packet arrival 364, as seen in the figure, then padding is generated 367. Upon RTA packet arrival 364 the RTA data is transmitted 366, and if the RTA TX completes before the end of the OFDMA frame, then padding 368 is generated. Thus, in this figure it is seen that the RU was shared between STAs and between non-RTA and RTA traffic.

8.1.4. STA Receiving DL MU-MIMO RTA

According to the present disclosure the STA receiving the scheduled DL-MU-MIMO RTA knows when to expect the RTA packet even before the expected time of its arrival. So in following the disclosed protocol the STA expecting the RTA packet will not be asleep before the expected time of arrival of the RTA packet. In particular, the STA expecting the RTA packet wakes up a time period set by countdown_channel_monitor_time before the expected time of arrival of the RTA packet in case the AP is allowed to transmit before the early channel access period time or countdown_early_channel_access_time before the expected time of arrival of the RTA packet in case the AP is not allowed to access the channel before the early channel access period. The STA and the AP exchange these parameter when the RTA early contention procedure is initiated and the STA is informed about the time it is required to be awake. The STA receiving the DL MU-MIMO packet can determine the start of its data transmission by checking the preamble.

9.1.5. Allowing Delayed and Cascaded Scheduling over Same RU

Currently in 802.11ax it is not allowed to delay the transmission of the packet data after transmitting the preamble. The MAC header and the payload are to follow the preamble directly. Currently in 802.11ax it is not allowed to schedule more than one STA to more than one RU in the time domain (no time sharing) in one MU-MIMO DL packet. An RU can be shared in space domain by transmitting multiple space streams to multiple STAs using MU-MIMO however, it is not allowed to schedule one STA after the other in the same MU-MIMO packet.

FIG. 34 illustrates an example embodiment 370 of padding as utilized in 802.11 standards at the time of the present disclosure, including 802.11n, 802.11ac, and 802.11ax standards in which it is allowed to have padding bits at the end of the MU-MIMO packet in the RUs to make sure all RU transmissions are finishing at the same time. In the figure the PHY preamble 372 is transmitted followed by data 374, which comprises a MAC header 376, payload 378 and FCS 380. The data field 374 being followed by padding 382.

In order to allow delayed and/or cascaded scheduling according to the present disclosure, the STA receiving the preamble is made aware that the data intended for the STA might follow the preamble directly or be delayed. The delay can be due to the transmissions of other STAs or some null data/padding that is being sent until the RTA packet is actually ready for transmission. By way of example and not limitation, the delayed and/or cascaded information can be explicitly added to the preamble or otherwise enable the STA to obtain information on the start of the RTA packet after the preamble.

8.1.6. Preamble Format

In order to allow delayed data transmission for the RTA STA after the DL MU-MIMO packet transmission is started, both RTA STA and the AP should be expecting that the data could be delayed. The AP informs the RTA STA that it should receive an RTA packet on a specific RU without determining when the packet will be delivered throughout the frame. The RTA STA then monitors that RU and parses the received data.

8.1.6.1. AP Sending Padding Before RTA Packet Transmission

FIG. 35 illustrates an example embodiment 390 of a case in which the AP is sending padding before the RTA packet transmission. The AP informs the STA in the preamble in the user field of the transmission scheduled for the RTA STA at specific RU. In the figure a PHY preamble 392 is sent followed by received data which the RTA STA parses at the specified RU. The AP sends the padding 394 as a dummy packet, the MAC header 396 is showing that the packet is not intended to the RTA STA, and has a dummy payload 398 and FCS 400. The RTA STA parses the received data at the scheduled RU and find the dummy packet with destination address not intended for it. The RTA STA finds out when is the end of the dummy packet by reading the duration field of the dummy packet. The RTA STA checks back for another packet (MAC header, payload and FCS) after the end of the dummy packet. Data 402 is seen being received comprising MAC header 404, payload 406 and FCS 408. The RTA STA reads the MAC header 404 of the new packet. If the MAC header shows the destination as the RTA STA, the RTA STA decodes the received packet until the end of the packet as specified in the duration field in the MAC header of the RTA packet.

8.1.6.2. AP Sending Another Pkt to Another STA Before RTA Pkt

FIG. 36 illustrates an example embodiment 410 of a case in which the AP is sending another packet to another STA before the RTA packet. In the figure is seen PHY preamble 412 followed by data 414 for STA 1, comprising MAC header 416 payload 418 and FCS 420, followed by data 422 for STA 2 comprising MAC header 424, payload 426 and FCS 428.

The AP inform both STAs (STA 1 and STA 2 (RTA STA)) about the scheduling of DL MU-MIMO on a specific RU. Both STAs are informed that they are scheduled to receive data on the same RU. STA 1 is not running an RTA session so it is expecting to receive its data right after the preamble. STA 2 parses the data after the preamble and decodes the MAC header and the payload sent to it. STA 1 considers the rest of the packet to be padding and does not decode it. STA 2 is an RTA STA running RTA session. STA 2 receives the packet and parses the received data at the specified RU. The RTA STA parses the received data at the scheduled RU and finds a packet with destination address not intended for it.

The RTA STA determines when is the end of the packet by reading the duration field of the dummy packet. The RTA STA checks back for another packet (MAC header, payload and FCS) after the end of the STA 1 packet and reads the MAC header of the new packet. If the MAC header shows the destination as the RTA STA, the RTA STA decodes the received packet until the end of the packet as specified in the duration field in the MAC header of the RTA packet.

8.1.6.3. PHY Preamble

Figures 37, 38:
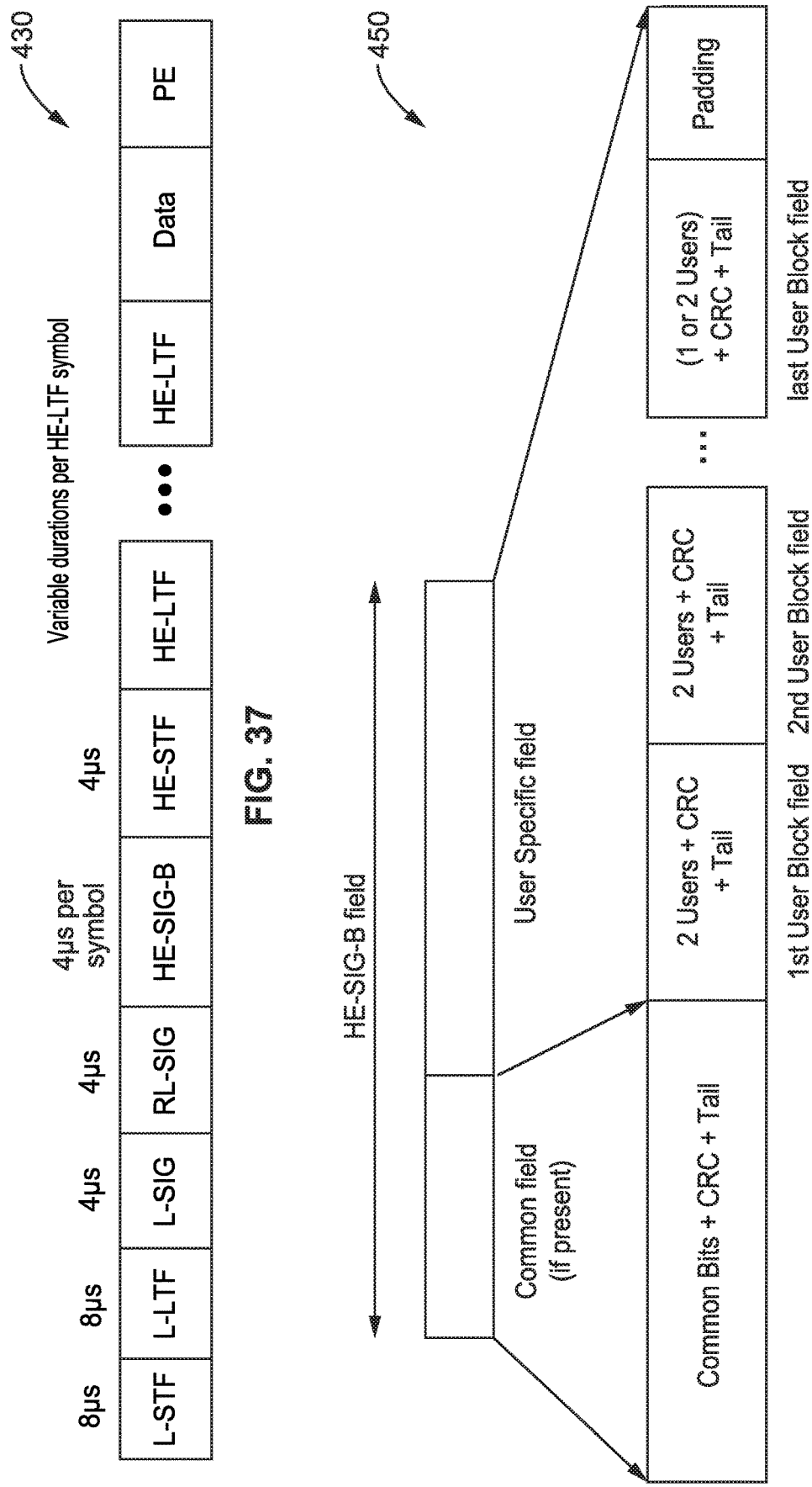
FIG. 37 is a data field diagram of a high efficiency (HE) multi-user (MU) PPDU frame format according to at least one embodiment of the present disclosure.
FIG. 38 is a data field diagram of a HE-SIG-B field as contained in the high efficiency (HE) multi-user (MU) PPDU frame of FIG. 37 according to at least one embodiment of the present disclosure.

FIG. 37 illustrates an example embodiment 430 of a high efficiency (HE) multi-user (MU) PPDU, as was utilized in 802.11ax. HE-SIG-A in case of MU-MIMO transmission contains fields that indicate the type of transmission (UL/DL), MCS and if DCM is used for the HE-SIG-B field, BSS color, spatial reuse status for the PPDU, bandwidth, number of MU-MIMO users or HE-SIG-B symbols, common field in SIG-B existence, Guard interval and LTF size, Doppler effect, TXOP scaled value, number of LTE symbols and mid-amble periodicity (to combat time-varying channel conditions), STBC, LDPC and padding extra parameters as well as the CRC and tail of the convolutional decoder.

FIG. 38 illustrates an example embodiment 450 of HE-SIG-B field, as was utilized in 802.11ax shown in the PPDU frame of FIG. 37. HE-SIG-B provides the OFDMA and DL MU-MIMO resource allocation assignment. The common field indicates the RU assignment in the data portion in the frequency domain, the RUs allocated for MU-MIMO and the number of MU-MIMO users. The common field contains the RU allocation subfields which show the tones (sub-carriers) to RU assignments and if there are RUs greater than or equal to a threshold value (e.g., 106), then it indicates the number of MU-MIMO multiplexing users.

The user specific field contains user block fields which determine user assignments and allocations. The user block field contains the STA ID, number of space-time streams assigned to it, if transmit beamforming is used, MCS and DCM used, and the type of coding.

When an AP decides on specific RU allocations, it sets the number of MU-MIMO users or HE-SIG-B symbols on HE-SIG-A field to what can be translated to the length of HE-SIG-B field. This should determine how many User Block fields are to be expected.

In case an RU is assigned, and the RTA STA of the RU is delayed in receiving its data, the HE-SIG-A and HE-SIG-B are assigned the same way as if it the RTA STA is receiving the packet without delay. However, the dummy packet and addressed with to a fake STA ID is added at the beginning of the transmission.

In case an RU is assigned such that the RTA STA follows the packet of another STA then the following is performed: (a) the HE-SIG-A Number of HE-SIG-B symbols or MU-MIMO Users field is set such that it adds one user to the original number of user to allow the HE-SIG-B to carry the second user field information; (b) the HE-SIG-B common field is assigned the same way as if there is no cascaded transmission in any RU; (c) the HE-SIG-B user field for the RTA STA is added at the last user block field in addition to the one already assigned; and (d) the common field RU allocation still indicates the total number of users as if the RTA STA and the other STA are one user.

8.1.6.4. RTA User Field

Figure 39:
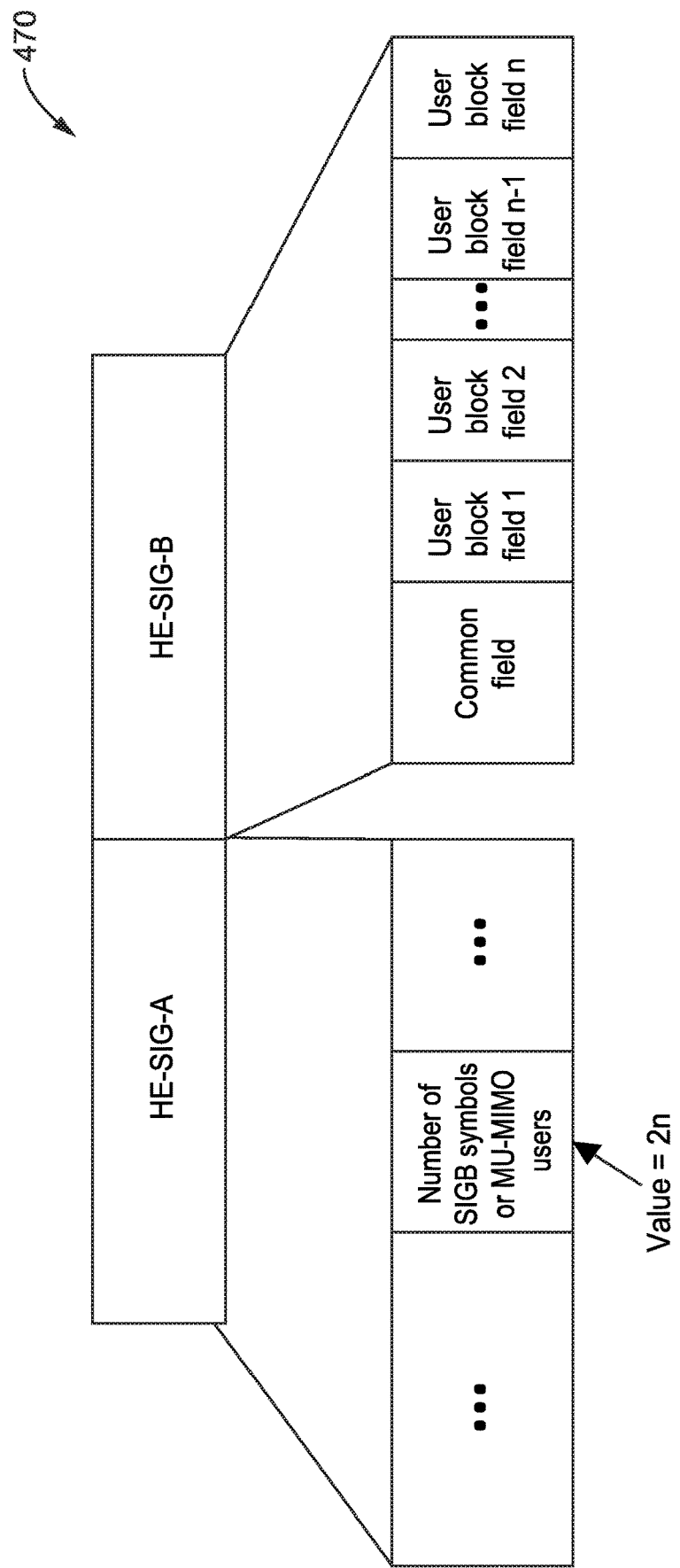
FIG. 39 and FIG. 40 are RTA user field diagrams shown before and after assigning the RTA STA to cascade another STA transmission performed according to at least one embodiment of the present disclosure.
Figure 40:
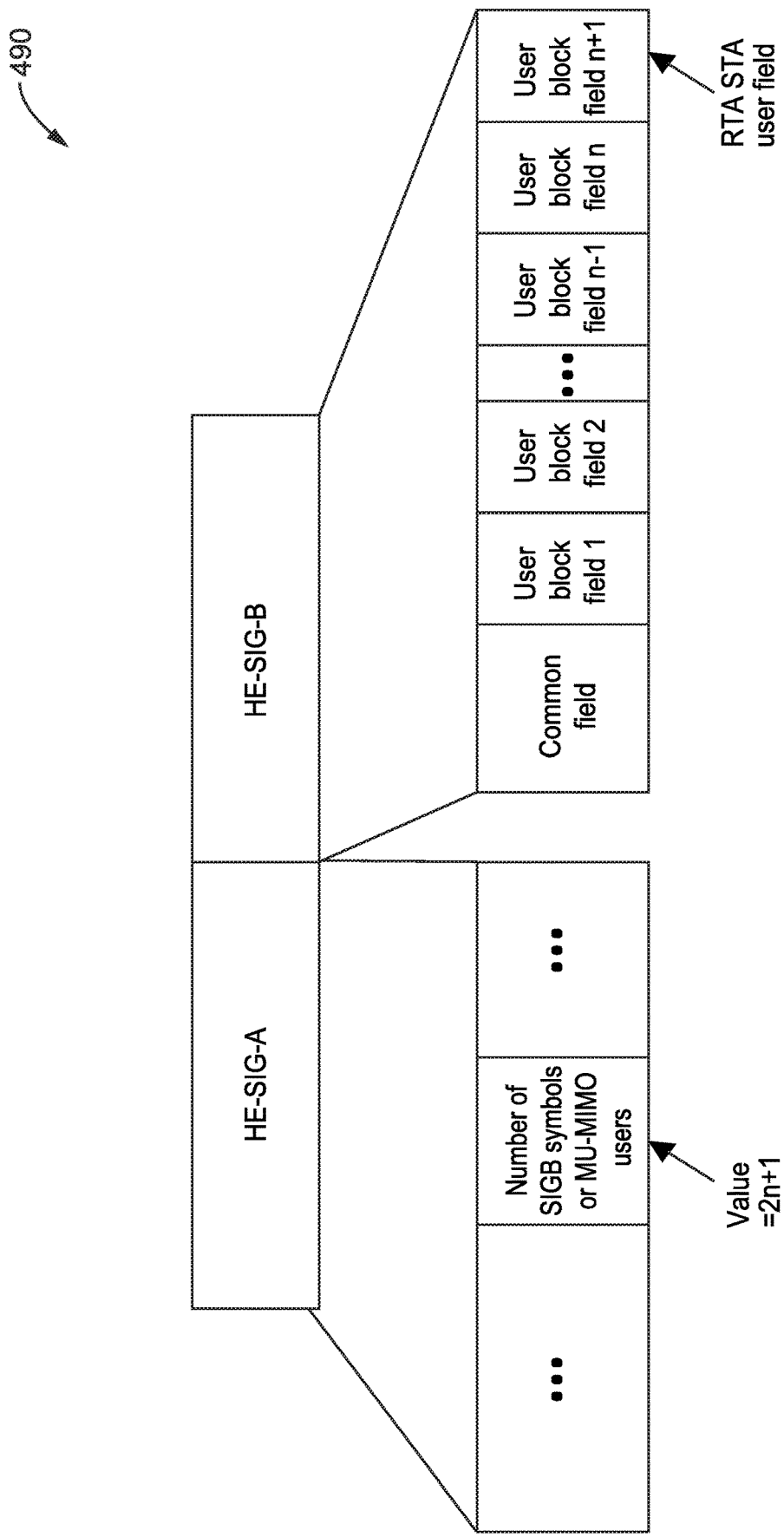

FIG. 39 and FIG. 40 illustrates an example embodiment 470, 490 illustrating the RTA user field before and after assigning the RTA STA to cascade another STA transmission. In FIG. 39 is shown the fields for HE-SIG-A and HE-SIG-B for the PPDU preamble before assigning the RTA to cascade any other assignments. The HE-SIG-A in the MU-MIMO mode has a field that indicates the number of MU-MIMO users or the number of symbols for the HE-SIG-B field, this is assigned in this example to 'n' where it is assumed that there will be '2n' users sharing the resources. According to this there should be 'n' block user fields where each contains 2 user field data.

In FIG. 40 the figure shows the case when an RTA STA is assigned to cascade a transmission at one of the RUs. The total number of MU-MIMO users or the number of symbols for the HE-SIG-B field is increased in this example to 2n+1 and a new user block is added to the HE-SIG-B user fields to carry the RTA STA data.

8.1.7. AP Flow Diagram

Figure 41:
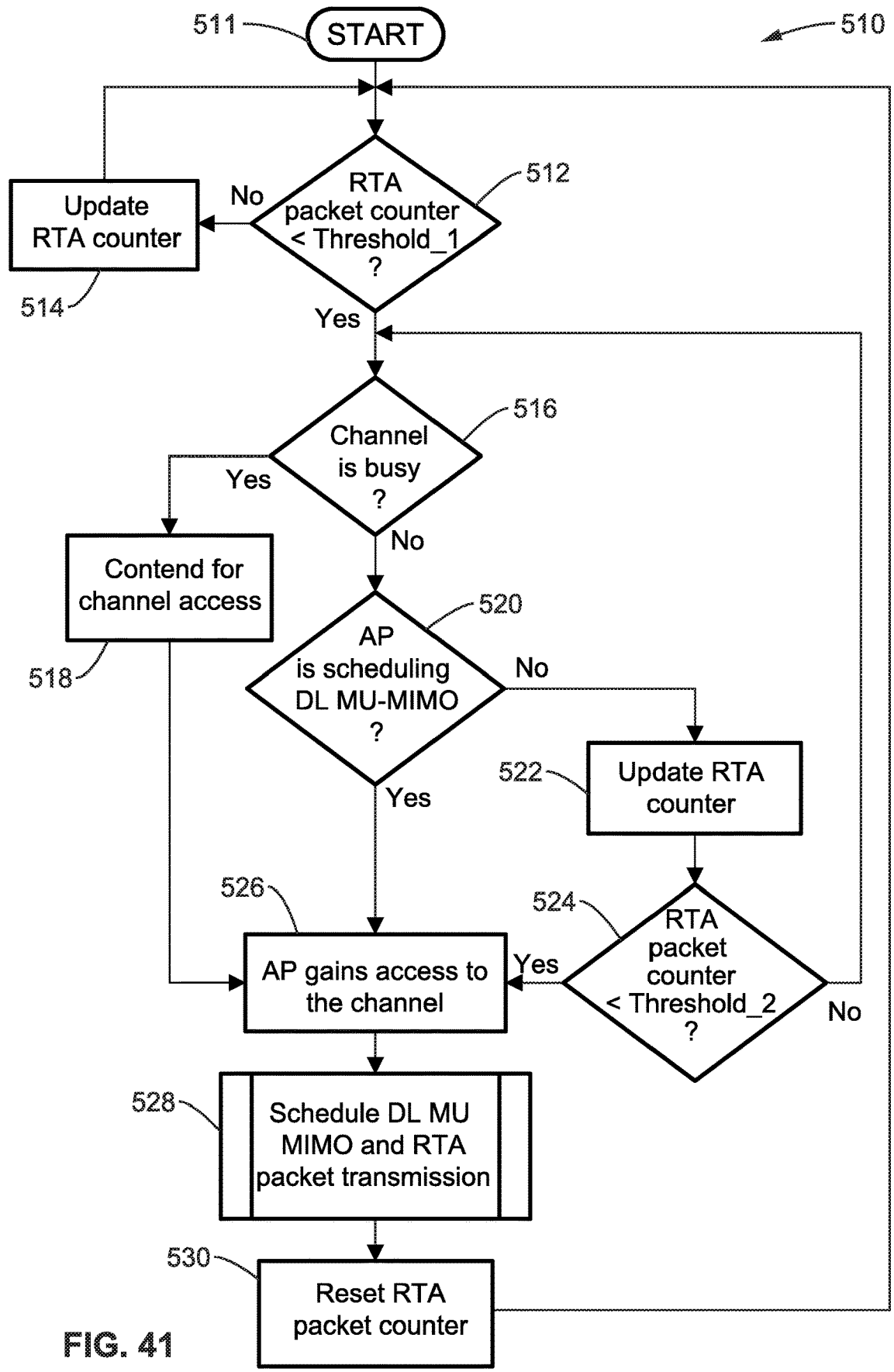
FIG. 41 is a flow diagram of AP DL OFDMA pre-contention and future scheduling of RTA data according to at least one embodiment of the present disclosure.

FIG. 41 illustrates an example embodiment 510 of AP DL OFDMA pre-contention and future scheduling of RTA data. The AP is assumed to be aware of the schedule of the RTA packet arrival and has an expectation of when the RTA packet should arrive. The AP initiates a timer where this time is a countdown to the expected arrival of the RTA packet. The AP needs to act before the arrival of the RTA packet and it should be appreciated that any implementation which yields an estimated time before RTA packet arrival can be utilized without departing from the teachings of the present invention.

Execution commences 511 and a check 512 is made on the RTA packet counter to determine if it has gone below the threshold. If the packet counter has not reached the threshold yet, the AP updates 514 the RTA counter and waits with execution returning to block 512. Once the RTA packet countdown timer is less than the specific threshold (threshold_1) then execution reaches block 516 with the AP starting to prepare for RTA packet transmission by first checking 516 whether the channel is occupied (busy). If the channel is busy the AP starts the process 518 to contend for and then gain access to the channel at block 526, after which it schedules 528 DL MU MIMO and RTA packet transmission in the future, after which it resets 530 the packet counter before execution returns to block 512.

If the channel is not found busy at block 516, then block 520 is reached with the AP checking if it has data to schedule for other STAs. If the AP has scheduled DL MU-MIMO/OFDMA transmission, then it reaches block 526 and the AP gains access to the channel, and schedules 528 DL MU MIMO and RTA packet transmission in the future, after which it resets 530 the counter before execution returning to block 512.

Otherwise, if the check at block 520 indicates that the AP does not have data for other STAs, then execution reaches block 522 with the RTA counter updated, and a check made at block 524 if the RTA packet counter has reached a second threshold, so that the AP can keep monitoring the channel until the countdown timer reaches threshold_2 and access the channel at that time. If the check 524 indicates packet counter is not less than Threshold_2 then execution returns to block 516, otherwise execution reaches block 526 and with the AP gaining channel access, scheduling 528 DL MU-MIMO/OFDMA transmission and schedule the RTA packet in the future, followed by resetting 530 the RTA packet counter before returning to block 512.

Figure 42:
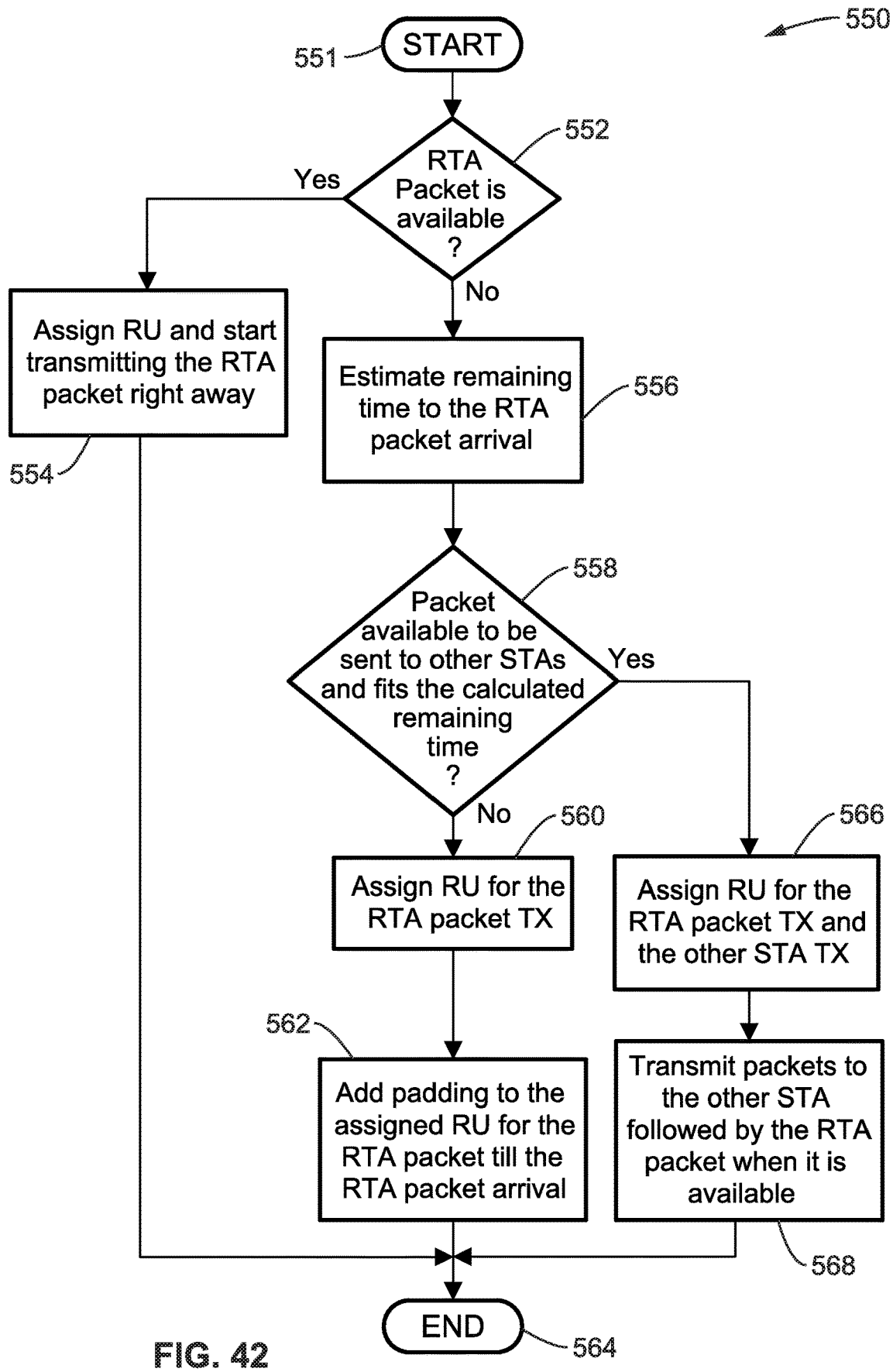
FIG. 42 is a flow diagram of scheduling the MU-MIMO or the delayed RTA packet transmission according to at least one embodiment of the present disclosure.

FIG. 42 illustrates an example embodiment 550 of scheduling the MU-MIMO or the delayed RTA packet transmission, including adding padding. The process starts 551, and a check 552 made if the RTA Packet is available in the MAC buffer. If the RTA packet is available, then block 554 is reached which assigns resource units (RU) and starts transmitting the DL packet right away, after which this procedure ends 564.

If the RTA packet is not yet available in the MAC buffer, then execution reaches block 556 where the AP with a knowledge of the estimated arrival time of the RTA packet estimates the time remaining before the RTA packet is to be available for TX and uses this time to schedule the RTA packet TX time. Then at block 558 a check is made to determine if packets are available to be sent to other STAs that fit within this estimated remaining time. If these conditions are met, then at block 566 the AP assigns an RU for the RTA packet and the other STA packet transmissions, and in block 568 transmits packets to the other STAs, followed by the RTA packet when it is available, before the process ends 564.

Otherwise, if the condition at block 558 is not satisfied, then at block 560 the AP assigns the RU for the RTA packet transmission, and adds 562 padding to be transmitted in the assigned RU until the time the RTA packet becomes available, and the process ends 564.

8.1.8. RTA STA Flow Diagram

Figure 43:
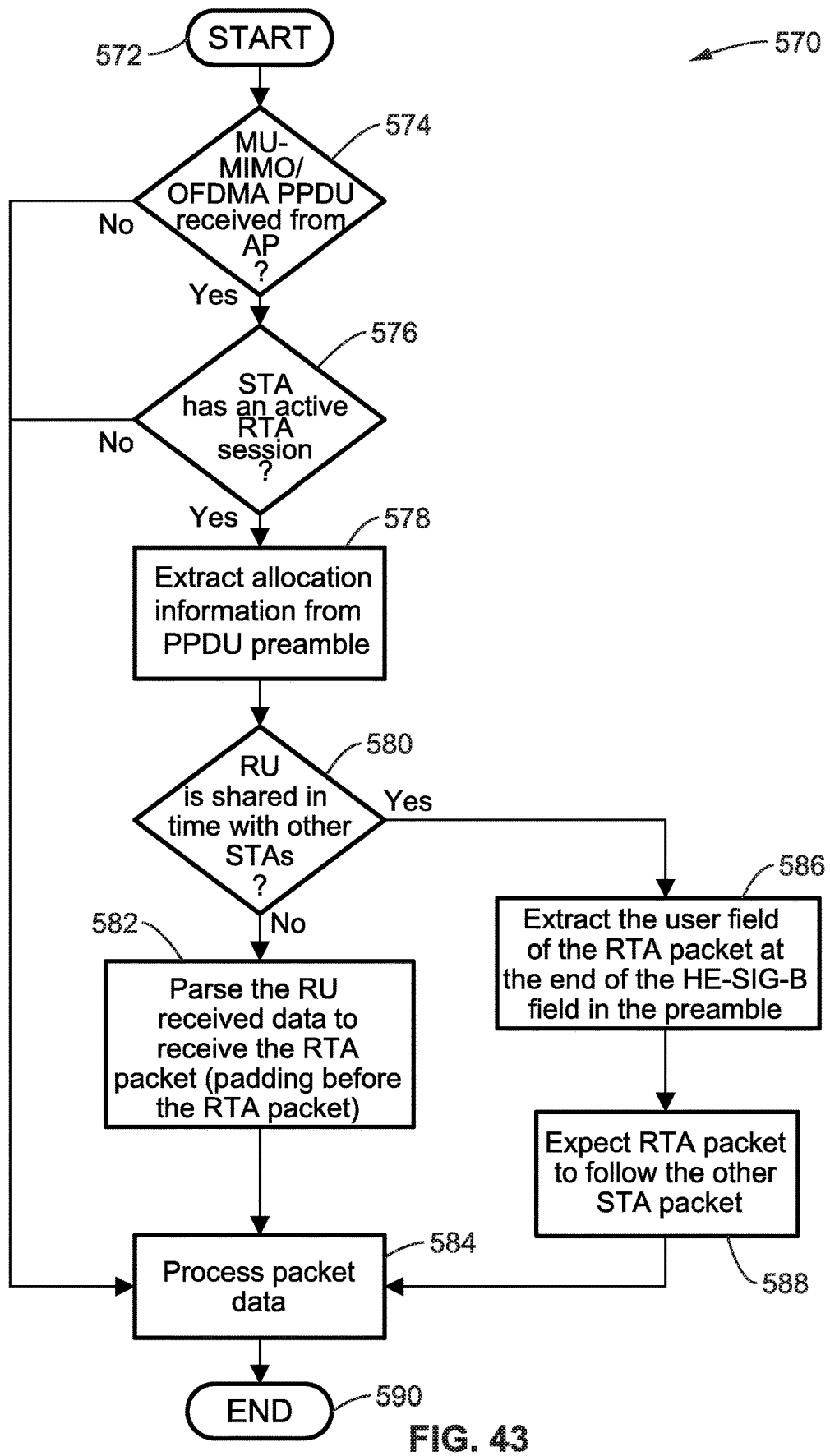
FIG. 43 is a flow diagram of a STA processing a packet received from an AP with future scheduling of RTA packets according to at least one embodiment of the present disclosure.

FIG. 43 illustrates an example embodiment 570 of a STA processing a packet received from an AP with future scheduling of RTA packets. The process starts 572 and a check 574 made to determine if the STA received a packet from the AP with MU-MIMO/OFDMA PPDU, followed by a check 576 if it has an active RTA session or expects/enable future packet scheduling. If either of these conditions are not met, then execution moves directly to block 584 to process packet data and end processing 590.

Otherwise, with both conditions of block 574 and 576 being met, then block 578 is reached which parses the preamble to extract the scheduling information from the PPDU preamble. A check 580 is made on time-sharing of the RU. If the check indicates the STA is sharing in time an RU with other STAs, execution reaches block 586 and user field information is extracted from the end of the HE-SIG-B field of the preamble for its scheduled transmission and it notes that the RTA transmission is expected to occur 588 on the identified RU after the first STA finishes its packet transmission. The receiver monitors the packet transmitted on the assigned RU. At the beginning of the OFDMA frame at the monitored RU, packets are not transmitted to the first receiver. After the packet to the first user has completed its transmission, then the packet to the RTA users are transmitted. Thus, the receiver monitors the RU and expects data reception on the RU, after which the packet data is processed 584 and the process ends 590.

Otherwise, if it is found at check 580 that no other STA is sharing the RU in time with the STA, then block 582 is reached with the STA parsing the received data on the assigned RU and determining what padding might be needed at the beginning of the packet in the form of a dummy packet sent to a dummy STA. The STA can read the MAC header of the padding or the other STA transmission and know the end of that packet and the start of its packet. After padding 582, the packet for the STA is transmitted 584 and the process ends 590.

8.1.9. User Field in HE-SIG-B 8.1.9.1. 802.11ax Defined User Field

The User fields follow the Common field of HE-SIG-B. The RU Allocation field in the Common field and the position of the User field in the User Specific field together identify the RU used to transmit data for a STA. The user field in 802.11ax is defined with 21 bits that indicate STA ID, spatial configuration, MCS and coding used in the RU assignment. Specifically the 11 bits B0-B10 of STA_ID indicate the STA ID where the user field is represented; the 4 bits B11-B14 of Spatial Configuration indicate the number of spatial streams for a STA in a MU-MIMO allocation; the 4 bits B15-B18 of MCS indicate the modulation and coding scheme; 1 bit B19 is reserved and set to 0; and one bit B20 of Coding indicates whether BCC or LDPC is used.

If the number of MU-MIMO users or the number of symbols for the HE-SIG-B field indicates the number of users being more than the number of users allocated by the RU allocation subfield in the common field of the HE-SIG-B part, then it is expected to have more fields to define RTA packet transmitted following one of the STA transmissions in one of the RUs assigned. In order to identify which RU is shared with the RTA STA, by way of example and not limitation, one of the following ways can be utilized.

8.1.9.2. Modifying User Field to Show Sharing Same RU

The first way of indicating that the RU is shared by another STA in time is through using the reserved bit, with the user field redefined as follows: 11 bits B0-B10 of STA_ID indicate the STA ID where the user field is represented; 4 bits B11-B14 of Spatial Configuration indicate the number of spatial streams for a STA in a MU-MIMO allocation; 4 bits B15-B18 of MCS indicating the modulation and coding scheme; 1 bit B19 indicating RU Sharing indicating if the RU is time-shared with another STA, indicating that another user field is expect that defines the other STA parameters; and one bit B20 of Coding indicates whether BCC or LDPC is used.

When the RU sharing subfield is set to 1, The RU associated with that user field is shared with another STA in time (time-sharing). This is done by transmitting the packet to the other STA after the end of the packet transmission to the STA with the STA_ID defined in this user field. The STA transmitting this field adds the user field of the STA sharing this RU after the end of all user fields originally scheduled to use the available RUs.

Figure 44:
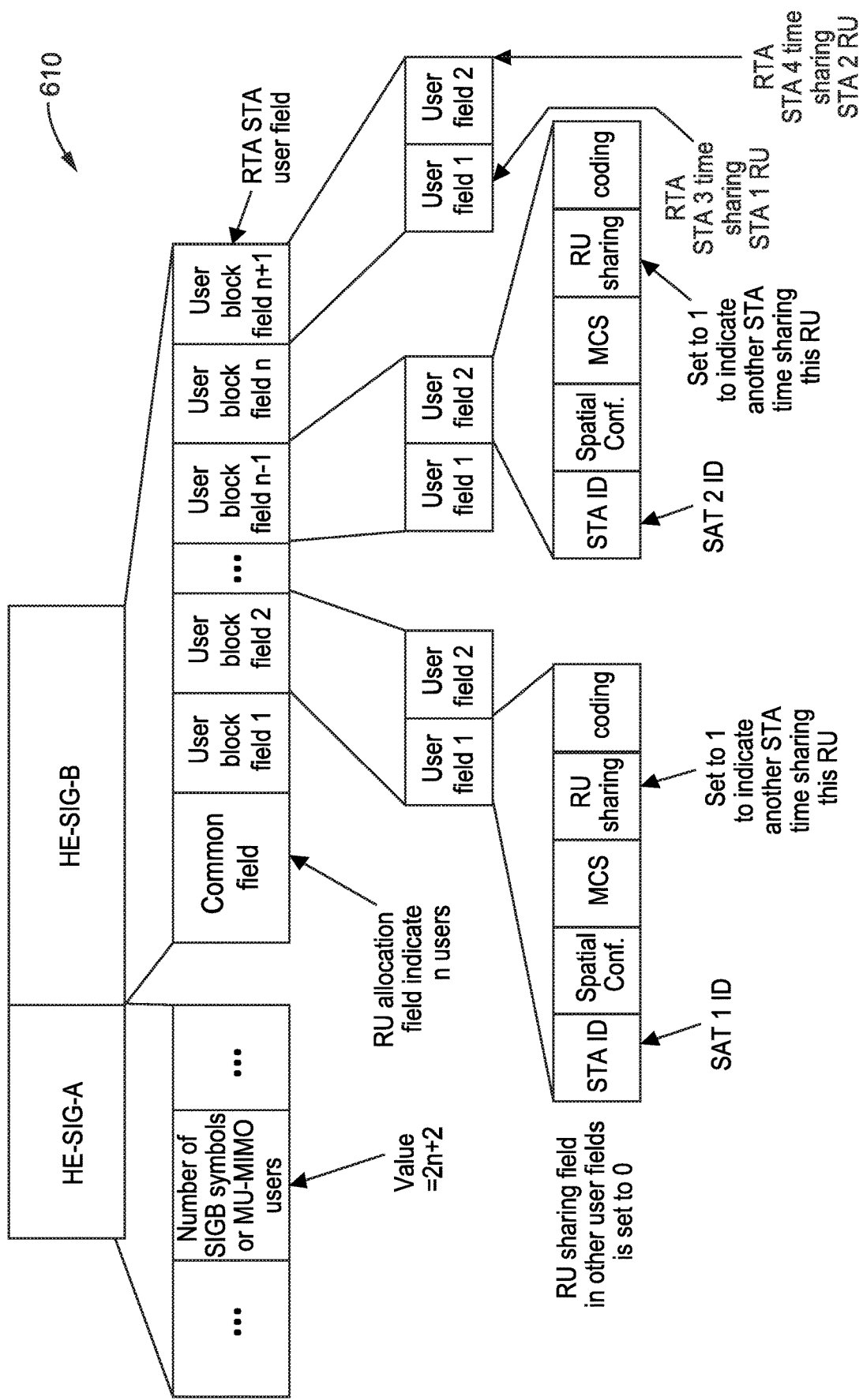
FIG. 44 is a data field diagram showing user fields when there are multiple RUs shared by other STAs according to at least one embodiment of the present disclosure.

FIG. 44 illustrates an example embodiment 610 of the case in which there are multiple RUs shared by other STAs, the order of the user fields is the same as the order of the extra STA sharing the RU user fields at the end of the user fields scheduled. STA 1 and STA 2 assigned RUs are determined by the Common allocation field and the order of their user fields in the user fields section of the HE-SIG-B part of the preamble. These RUs are indicated to be shared by STA 3 and STA 4 and the RU sharing field in the user fields of STA 1 and STA 2 is set to 1. The user fields of STA 3 and STA 4 location is at the end of the user field section and the order of them is such that STA 3 user field is coming first to refer to the first user field has RU sharing field set to 1 and STA 4 to the second user field with RU sharing set to 1.

8.1.9.2.2. Second STA Time Sharing the RU User Field 8.1.9.2.2.1. Example 1

One example of the user field can be defined if the second STA time sharing the RU needs to define its own PHY parameters (MCS, coding and number of spatial streaming). This can use the same fields as defined in 802.11ax, which is similar to that described in section 8.1.91., or modified fields.

8.1.9.2.2.2. Example 2

Another example where the second STA time sharing the RU does not need to define its own PHY parameters (MCS, coding and number of spatial streaming) and is sharing the same parameters with the first STA it is time sharing the RU with is as follows. In this case the user field is redefined as follows: 11 bits B0-B10 of STA_ID indicate the STA ID where the user field is represented; 8 bits B11-B19 of Time_to_Start_Second_STAT_Transmission indicates the time offset from the beginning of the packet reception where the second STA time sharing the RU is to be started; and 1 bit B20 being reserved.

The second STA time sharing the RU with the first STA copies the PHY parameters (MCS, coding and number of spatial streaming) from the first STA user field and the second STA time sharing the RU user field.

Since the second STA copies all the parameters from the first STA that it is time sharing the RU with, it can use all these bits in other fields. For example 8 bits here is used to indicate the time offset where the second transmission should start. The number of bits can vary depending on the resolution needed and the units can be any defined time units or predefined ticks.

In case the first transmission (TX) was padding, the STA ID of the first STA can be a dummy STA ID and the PHY data is intended to the second STA (the delayed transmission).

8.1.9.3. Sharing RU User Field Without Modifying 8.1.9.3.1. First STA Time-Sharing the RU User Field The first STA time sharing the RU user field need not change the RU user field and it remains as it is, such as similar to the defined one in 802.11ax. Since the format of the user field stays as it is this allows it to be used in case of MU-MIMO or non MU-MIMO PPDU format. The first STA time sharing the RU should not be interrupted by the STA using the RU after its transmission is ended and hence the user field is not affected.

8.1.9.3.2. Second STA Time Sharing the RU User Field

The second STA time sharing the RU user field information comes after the original STA user field is completed. The second STA time sharing the RU shares the PHY parameter with the first one (e.g., MCS, coding, number of spatial streams) in case MU-MIMO PPDU is used and non-MU-MIMO PHY parameters (e.g., number of space time streams, whether transmit beamforming is used or not, MCS, whether or not DCM is used and coding) in case non MU-MIMO PPDU is used.

The second STA time sharing the RU knows which user (STA) it is time sharing the RU with because it extracts this information from its user field. The second STA time sharing the RU user field refers to the first STA time sharing the RU with.

The format of the user field in this case can be like the following example. In this case the user field is redefined as follows: 11 bits B0-B10 of STA_ID indicate the STA ID where the user field is represented, the STA matching its ID with that STA ID uses the data in that user field; 4 bits B11-B14 of User_Field_Index_to_Copy_PHY_params_from is the index of the first STA time sharing the RU user field, while the second STA time sharing the RU will use the PHY parameters in the user field referred to by that index to extract available PHY parameters; 5 bits B15-B19 of Time_to_Start_Second_STA_Transmission indicates the time offset from the beginning of the packet reception where the second STA time sharing the RU is to be started.

In the above example only 5 bits are used to indicate the time offset where the second transmission should start. The number of bits can vary depending on the resolution needed and the unit can be in any time unit or in predefined ticks. In case the first TX was padding, the STA ID of the first STA can be a dummy STA ID and the PHY data is intended to the second STA (e.g., the delayed transmission).

8.2. UL Transmission

UL OFDMA/MU-MIMO is defined in 802.11ax using a trigger frame that can solicit the Buffer Status Report (BSR) of non-AP STAs and the TB PPDU from the STAs as well.

Figure 45:
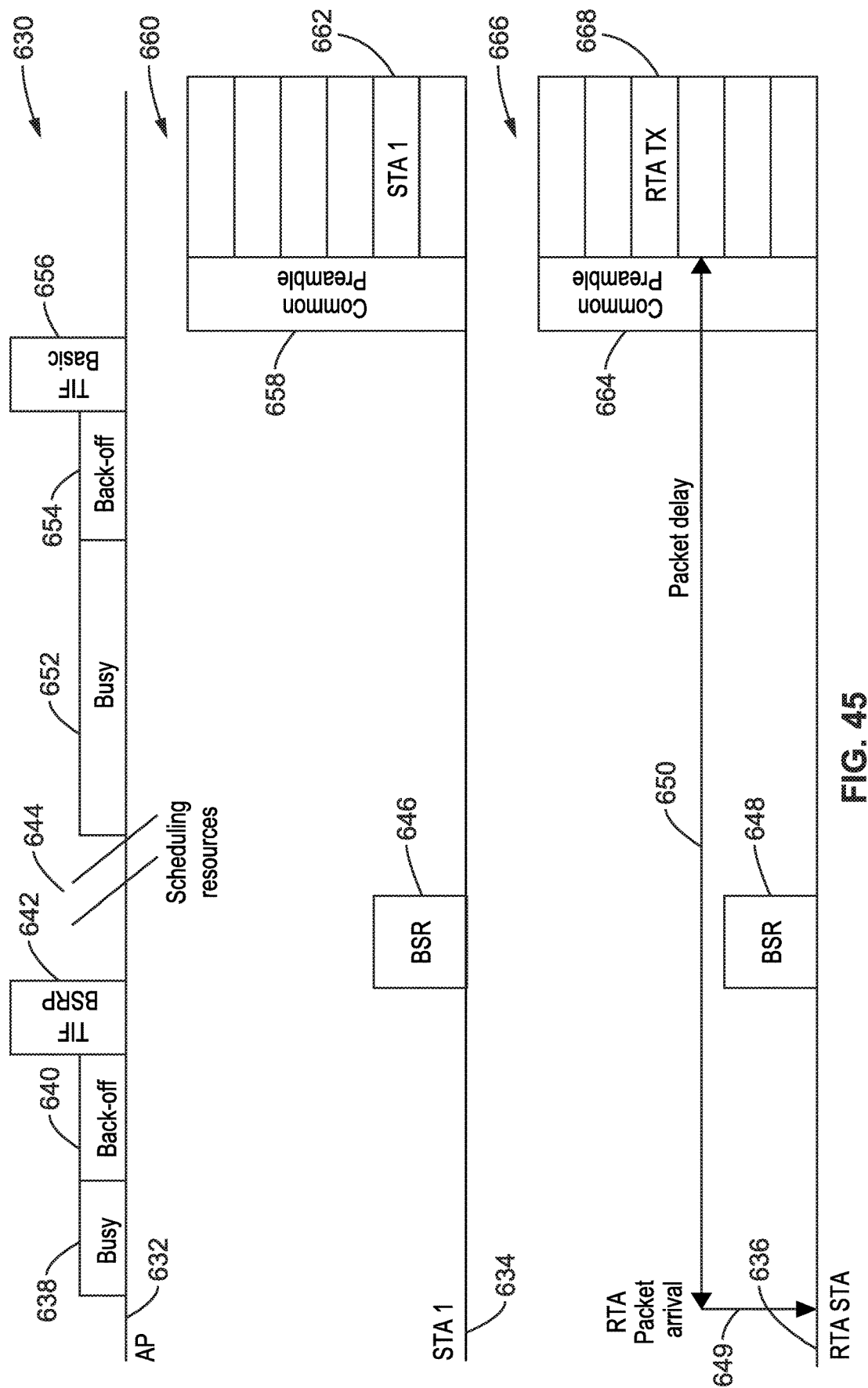
FIG. 45 is an RU transmission diagram exemplifying a UL OFDMA/MU-MIMO with an STA that is running an RTA as performed according to at least one embodiment of the present disclosure.

FIG. 45 illustrates an example embodiment 630, 660, 666 of a UL OFDMA/MU-MIMO with an STA that is running an RTA. The figure depicts communications of the AP 632, STA 1 634 and an RTA STA 636.

The AP finds the channel busy 638, once unoccupied it does a back-off 640 and gains channel access to send 642 a trigger frame BSRP to collect buffer status reports from STAs and schedule UL MU-MIMO transmission. Once the AP gains access to the channel, it sends this TIF BSRP to STAs in its BSS. All STAs receiving the TIF respond with a buffer status report 646, 648. The buffer status report indicates the amount of data the no-AP STA wants to send to the AP. At the RTA STA, if an RTA packet arrives 649 before the arrival of the TIF BSRP 642, the BSR reflects the RTA packets and is already reported to the AP. The AP collects the BSR from the no-AP STAs and uses this information to schedule resources 644 to the STAs. The AP, finding the channel busy 652, contends for channel access with back-off 654 then once it has scheduled the resources it sends a basic TIF 656 to the STAs where UL MU-MIMO is scheduled.

Once the no-AP STAs receive TIF 656, they start transmitting their packets on the scheduled resources indicated in the TIF. Each of these stations is shown generating a common preamble 658, 664 and RUs including for STA 1 662, and RTA TX 668. It is shown in the figure that the RTA packet is delayed 650 due to the time required for the STA to wait for the BSRP TIF and reporting its buffer status by replying to the TIF and the time to wait for the TIF to start the UL transmission on the allocated resources.

8.2.1. UL RTA Request

If the non-AP STA is generating the RTA packet periodically and it is expected to have it ready for transmission on a specific schedule, the non-AP STA according to the present disclosure can avoid the delay associated with waiting for the AP to trigger the BSR frame and inform the AP with the RTA packet schedule.

If the non-AP STA has an RTA session running, it is configured according to at least one embodiment of the present disclosure to inform the AP about the initiated RTA session and send the parameters associated with the running RTA session. The AP receiving this information can acknowledge the reception of the RTA stream initiation request and accept it or reject it.

If the AP accepts the RTA stream initiation request, it allocates resources to the non-AP STA on the expected time of the RTA arrival in the non-AP STA and the non-AP STA does not have to report the RTA packets in the BSR.

Figure 46A:
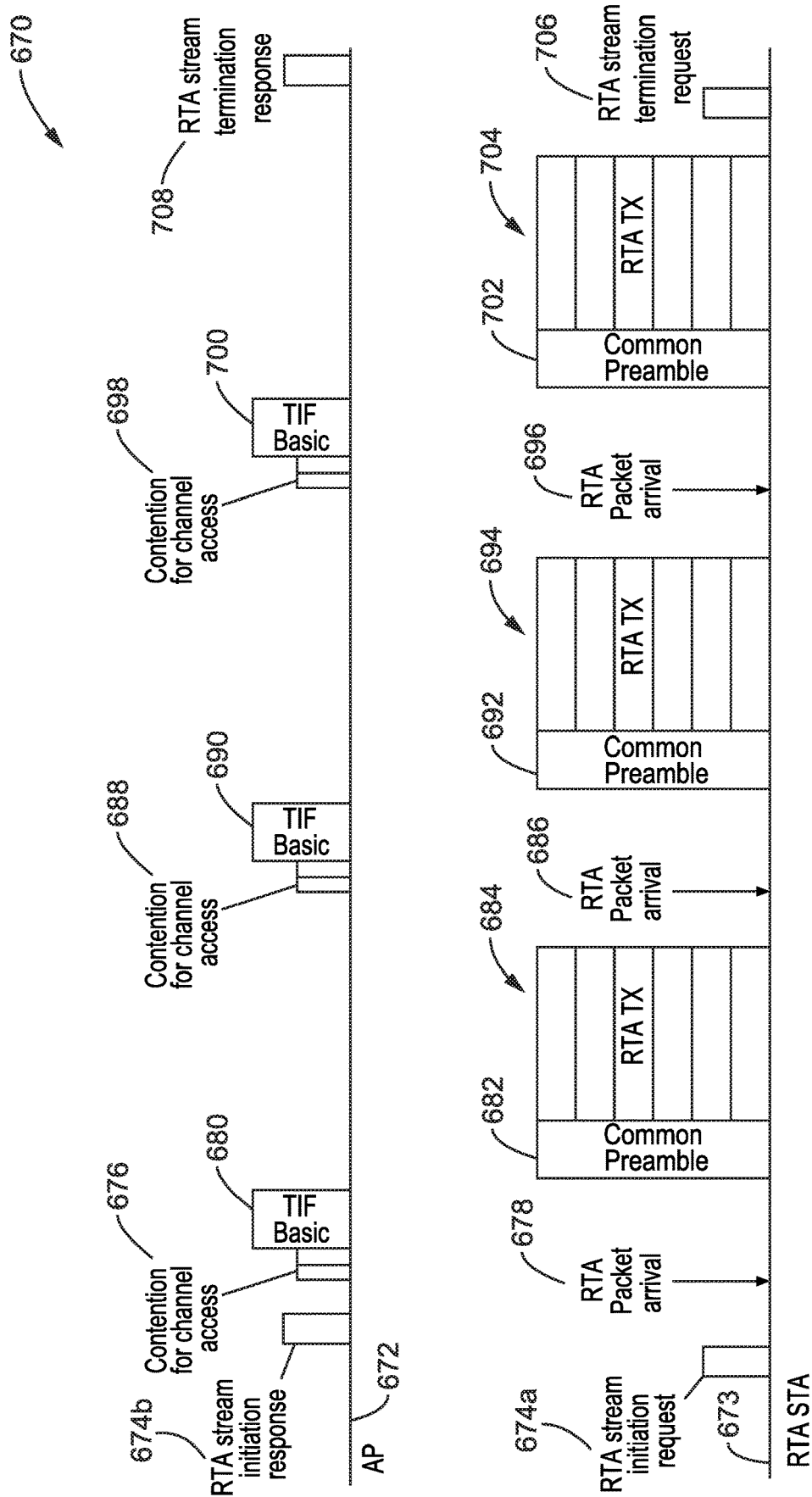
FIG. 46A and FIG. 46B are RU transmissions diagram of a UL RTA request as performed according to at least two embodiments of the present disclosure.

FIG. 46A illustrates an example embodiment 670 of a UL RTA request. The figure depicts communications at the AP 672 and the RTA STA 673 which sends an RTA stream initiation request frame 674*a* to the AP 672 to inform about the RTA session initiation and parameters, to which the AP responds with an RTA stream initiation response 674*b*. It will be seen that the RTA packet then arrives 678 at the RTA STA. The AP has obtained the RTA session parameters and can schedule resources for the non-AP STA and therefore after contending and obtaining 676 channel access it sends the TIF 680 to start the UL transmission at the expected time. The RTA STA receives TIF 680, and starts transmitting its packets on the scheduled resources indicated in the TIF and generates a common preamble 682 and RUs 684 including one for RTA TX. The communications continue in this manner with AP obtaining accesses 688, 698 sending TIFs 690, 700, and the RTA STA receiving RTA packet arrival 686, 696, and transmitting scheduled packets with preambles 692, 702 and blocks of RUs 694, 704. When the RTA session is finished the non-AP STA is seen sending an RTA stream termination request 706 and the AP responds with acknowledgement 708 by sending an RTA stream termination response.

Figure 46B:
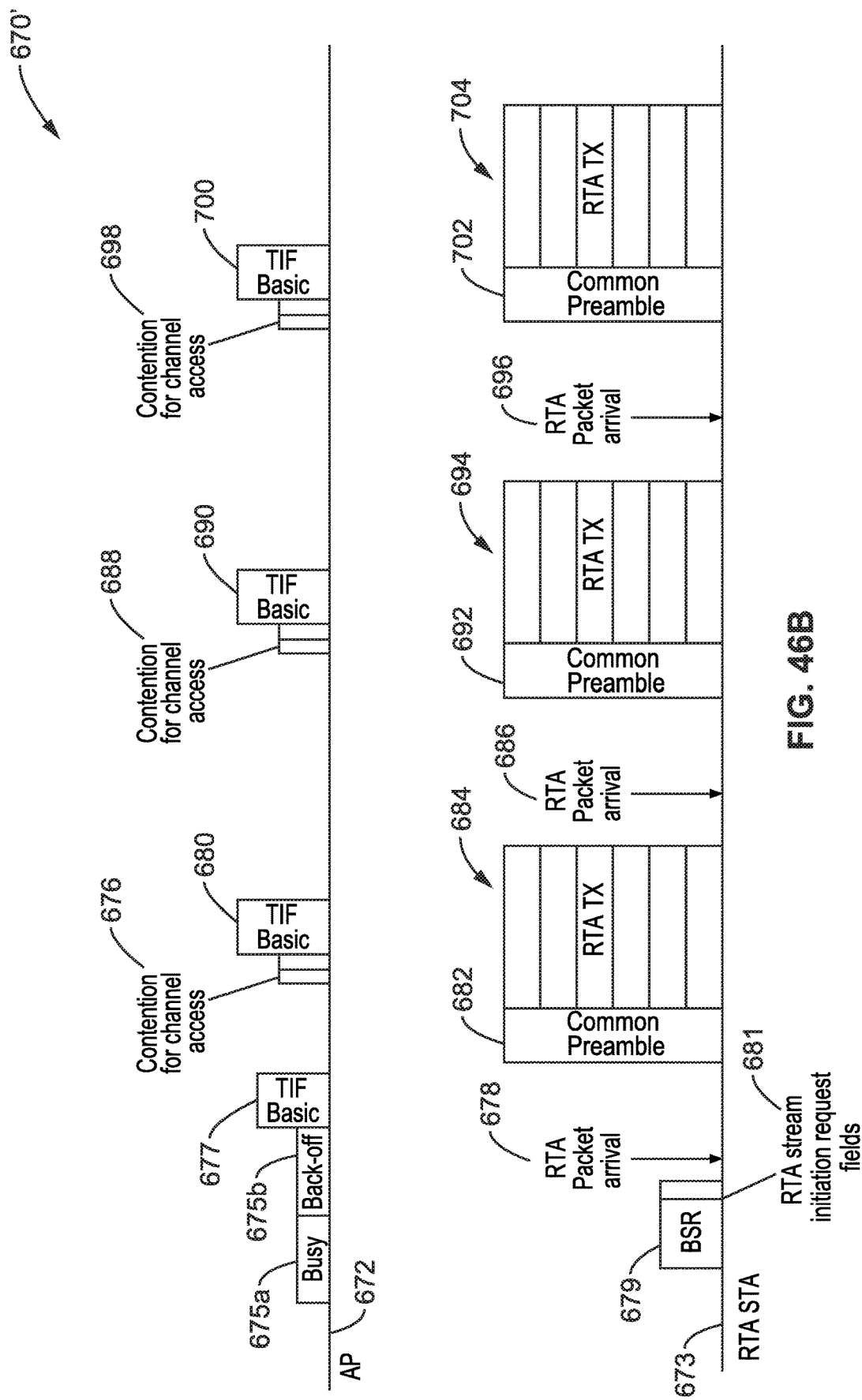

FIG. 46B illustrates an example embodiment 670', showing a variation of FIG. 46A, depicting another way of implementing the RTA session initiation request by adding RTA packet periodicity and generation information to the BSR 679 and send it only once. The AP extracts the information from the BSR and updates the RTA session details. In at least one embodiment this is performed by appending the information fields in the RTA stream initiation request 681 to the BSR 679 transmitted to the AP after receiving the BSRP 677, after the busy 675*a* and back-off 675*a*. The other portions of the figure are the same as seen in FIG. 46A.

8.2.2. UL RTA Traffic Queued Time Duration (RTQTD) Feedback

The AP receiving the RTA packet periodicity from the non-AP STA schedules resources and sends TIF on the estimated time where the RTA packet should be ready at the non-AP STA. However, this estimated time might not be sufficiently precise and might shift to earlier or later due to other delays in buffering or channel access and transmission. The non-AP STA can send the AP updates on the queued time duration of the RTA packets it is receiving. The AP uses this information to update the timing of its scheduling of UL transmissions by modifying the time of the basic TIF transmission to reduce the buffer time for the RTA packets or delay the TIF in case the RTA packets is usually delayed.

Figure 47:
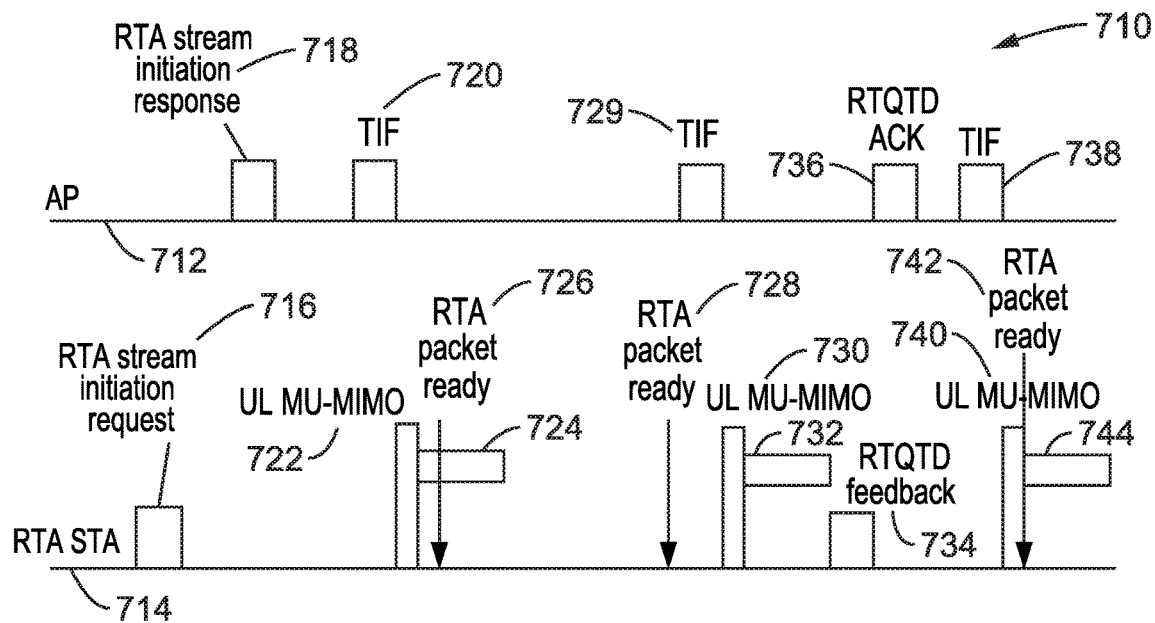
FIG. 47 is an RU transmission diagram of adjusting the scheduling time of the RTA packet through sending an RTQTD feedback message from the no-AP STA to the AP as performed according to at least one embodiment of the present disclosure.

FIG. 47 illustrates an example embodiment 710 of adjusting the scheduling time of the RTA packet through sending an RTQTD feedback message from the no-AP STA to the AP. Communication is seen between the AP 712 and non-AP 714 STA which is an RTA STA. An RTA stream initiation 716 is sent from the RTA STA to which the AP sends a response 718, and afterward a TIF 720 is sent from AP to RTA STA. The RTA STA performs a UL MU-MIMO 722 with RU 724, however, the RTA packet is not ready to be transmitted at the time the TIF is received since it is not yet received from the application layer, expected time is marked by 726 for the RTA packet to be ready to be sent. The STA might lose its opportunity to transmit this packet and waits for another TIF to transmit the RTA packet alone or alongside with other RTA packets 728 arrived before the new TIF 729. In order for the STA to synchronize the TIF frame transmission with the expected time the RTA packet is ready for transmission, the STA generates RTQTD feedback 734 which the AP ACKS 736, after which the AP sends TIF 738 at the proper time before the next RTA packet is ready for transmission, and the RTA STA performs a UL MU-MIMO 740 and RU 744 with RTA packet becoming ready 742 at the start of the RUs after the preamble.

8.2.3. Example of RTA Parameters Exchange

Figure 48:
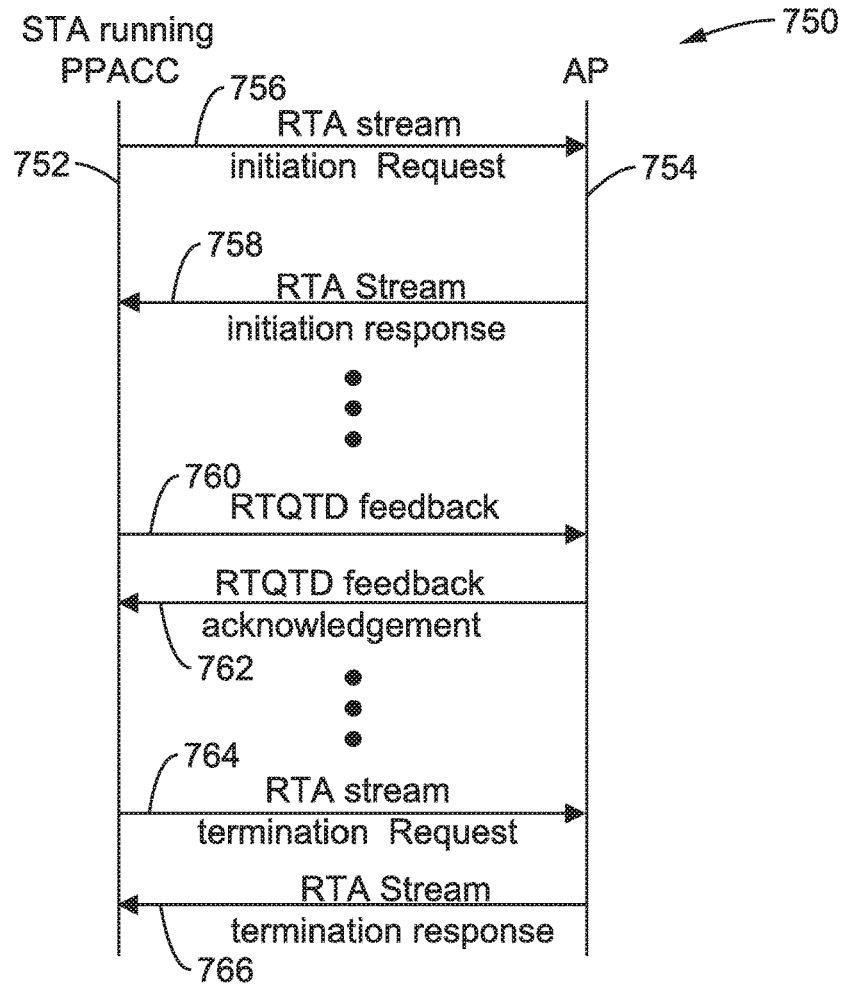
FIG. 48 is a communication sequence diagram of a non-AP STA exchanging frames with an AP STA as performed according to at least one embodiment of the present disclosure.

FIG. 48 illustrates an example embodiment 750 of a non-AP STA 752 exchanging frames with an AP STA 754 to inform the AP about the RTA session and continuously update the RTA session parameters.

When the APP layer informs the MAC layer of the non-AP STA about the initiation 756 of an RTA and the periodicity, timing information of the RTA packet delivery, the non-AP STA informs the AP about the initiation of the RTA session and forwards the timing parameters on RTA packet expected arrival time. The AP responds back with stream initiation response 758 to acknowledge the reception of the request and response to the request by accepting it or rejecting it.

If the non-AP STA received the stream initiation response with acceptance response, the non-AP STA can request to update the time where the AP is scheduling the UL transmission by sending the RTQTD feedback frame 760 to the AP. The AP responds to this frame by acknowledging 762 the reception of the frame. This exchange of frame can take place any time, and for multiple times, during the active RTA session.

When the non-AP STA RTA session is expired, the non-AP STA can send an RTA stream termination request 764 to the AP, to inform the AP that the RTA session is expired and the non-AP STA does not need to be automatically scheduled for RTA packet UL transmission. The AP responds to that frame with an RTA stream termination response 766 to acknowledge the reception of the termination request. It should be noted that the session can be terminated automatically if the stream initiation request includes the session expiration information.

8.2.4. UL RTA Scheduling

Figure 49:
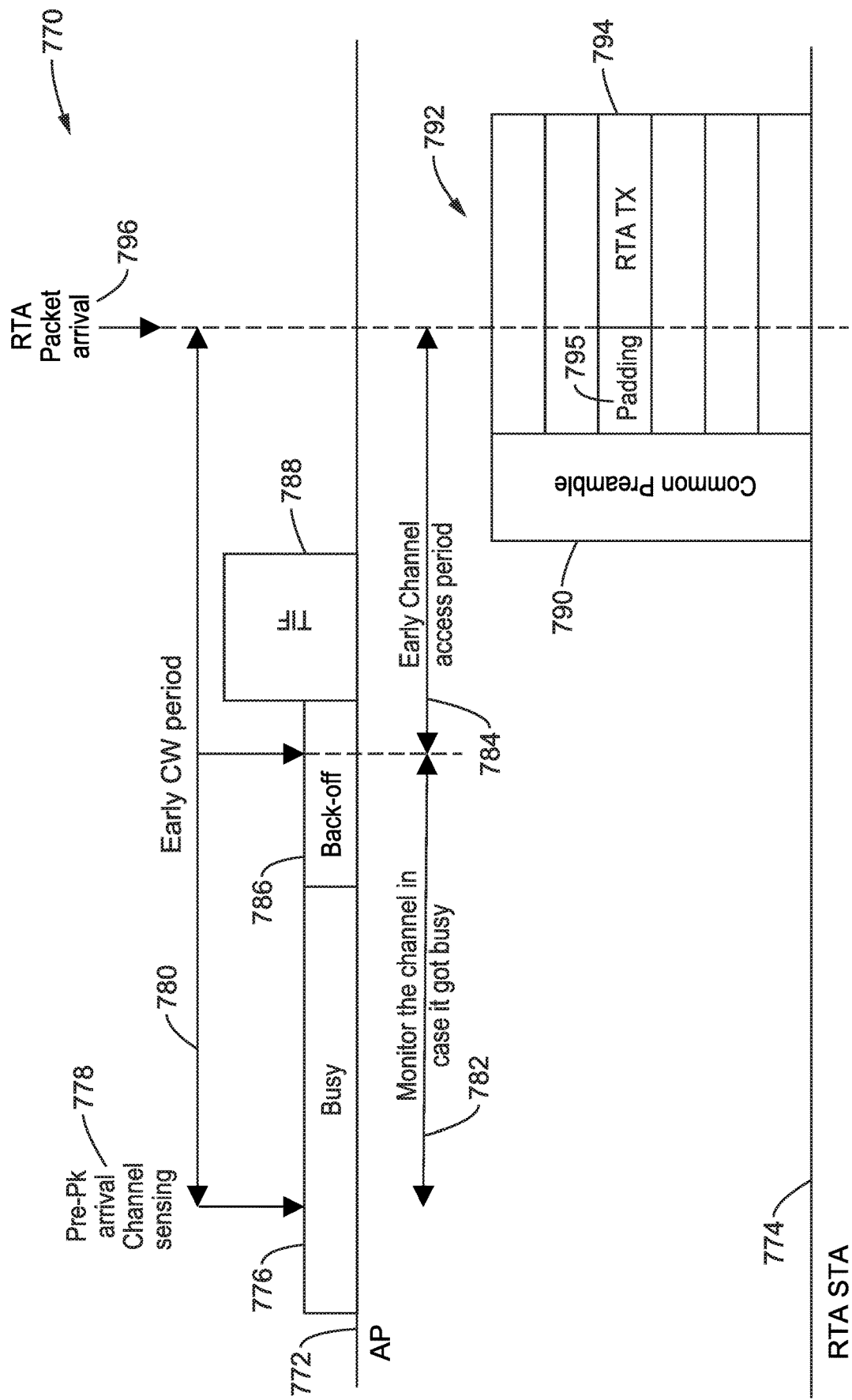
FIG. 49 is an RU transmission diagram of UL RTA scheduling as performed according to at least one embodiment of the present disclosure.

FIG. 49 illustrates an example embodiment 770 of UL RTA scheduling, depicting interaction between AP 772 and RTA STA 774. Once the STA establishes an RTA session it informs the AP about the RTA session parameters. If the AP accepted the RTA session initiation, it starts running a timer for the next RTA packet expected arrival time at the no-AP STA.

The figure shows the channel being busy 776 at a pre-packet arrival channel sensing time 778 during an early CW period 780 while the channel is being monitored 782. The AP STA contends for channel access, with back-off 786 even before the expected RTA packet arrival at the non-AP STA, which is to avoid someone gaining access of the channel just prior to the expected packet arrival and delaying the TIF transmission. An early channel access period starts 784, and the AP gains channel access and sends a TIF 788. In response to the TIF, the RTA STA starts a UL RTA transmission with preamble 790 and RUs 792 including RTA TX 794. It will be noted that since the RTA packet does not arrive until after preamble 790, padding 795 is sent until RTA packet arrival 796 upon which RTA TX 794 commences.

Figure 50:
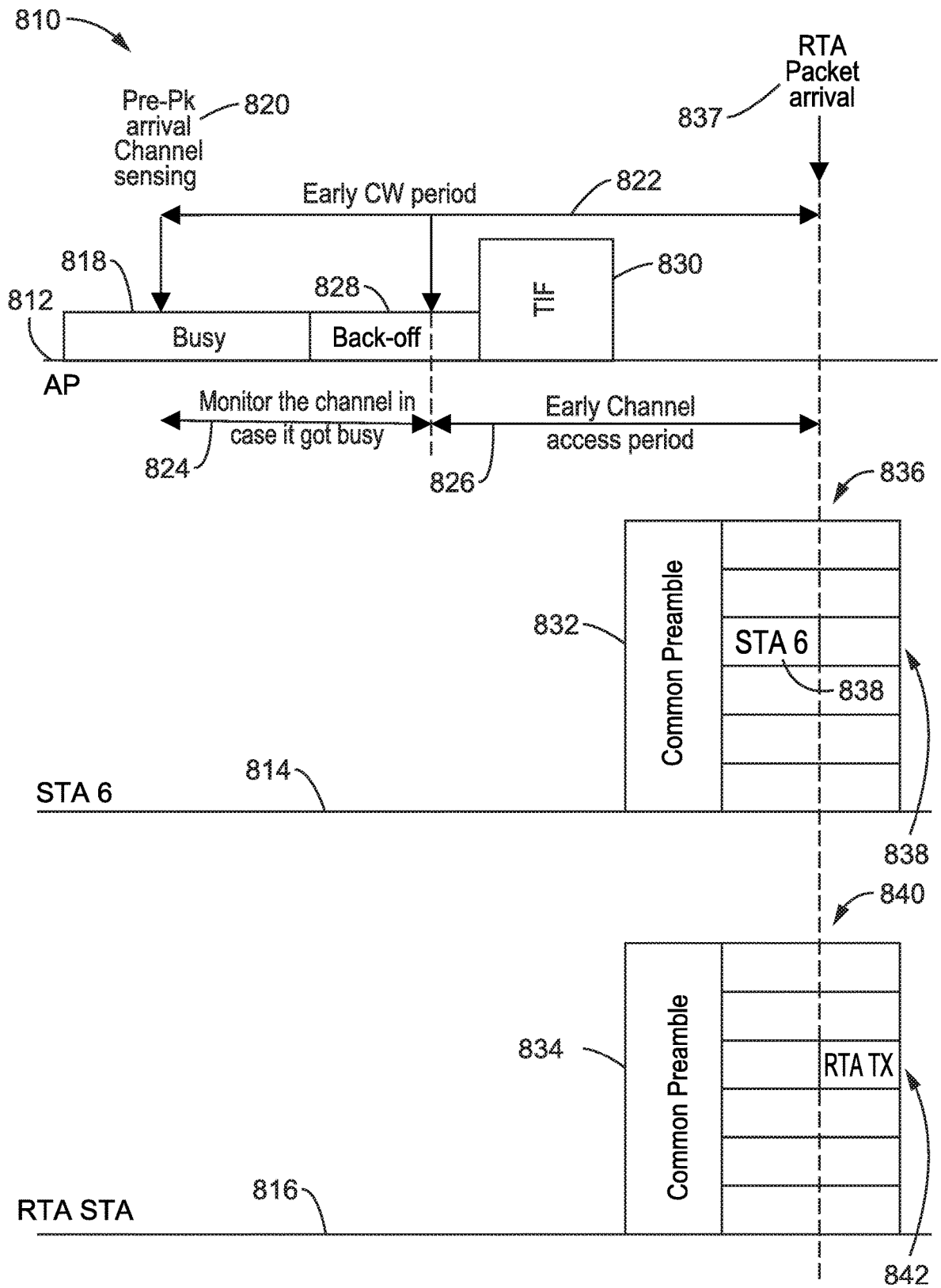
FIG. 50 is an RU transmission diagram of UL RTA scheduling with two STAs sharing an RU as performed according to at least one embodiment of the present disclosure.

FIG. 50 also depicts 810 UL RTA scheduling, but depicts interactions between AP 812, STA 6 814 and RTA STA 816. The figure shows the channel being busy 818 at a pre-packet arrival channel sensing time 820 during an early CW period 822 while the channel is being monitored 824. The AP STA contends for channel access, with back-off 828 even before the expected RTA packet arrival at the non-AP STA, which is to avoid someone gaining access of the channel just prior to the expected packet arrival and delaying the TIF transmission. An early channel access period starts 826, and the AP gains channel access and sends a TIF 830. In response to the TIF, STA 6 starts a transmission with preamble 832 and the RUs 836 have RU 838 for STA 6. The RTA STA starts a UL RTA transmission with preamble 834 and RUs 840 including RTA TX 842 which time shares the same RU as STA 6 and starts the RTA transmission after RTA packet arrival 837.

The AP calculates the time required to send the TIF, the frame spacing before the UP transmission and the transmission delays for the common preamble and other associated processing delay. The AP is configured to time the TIF transmission such that the non-AP UL transmission will occur at, or slightly after, RTA packet arrival in the non-AP STA. During the period before expected packet arrival at the non-AP STA, during the early contention window period, if the channel is busy the AP should start contention. If the channel is free during that time, the AP continues monitoring the status of the channel.

The size of the early contention window period is preferably related to the collected statistics, where the statistics are showing that the channel is more occupied (more STA, more time the channel is occupied, higher channel access delay or higher back-off timer interruption ratio).

The early contention window period length can be manually set to a fixed value or can be dynamically adjusted according to the channel statistics. If the AP finds that the channel is free until the early channel access period it accesses the channel directly without waiting for the expected time of the RTA packet arrival. This period is assumed to be small and it is to guarantee that no other STA will gain channel access and thus delay RTA packet transmission.

If the AP gained the channel earlier than the expected time of RTA packet arrival minus the time needed for the TIF transmission and the frame spacing to the UL transmission. The AP can schedule other STAs to transmit at that unoccupied time or schedule padding information to be sent. The non-AP STA running the RTA session is responsible to send this padding information in case it is scheduled.

8.2.5. AP Flow Chart

Figure 51A:
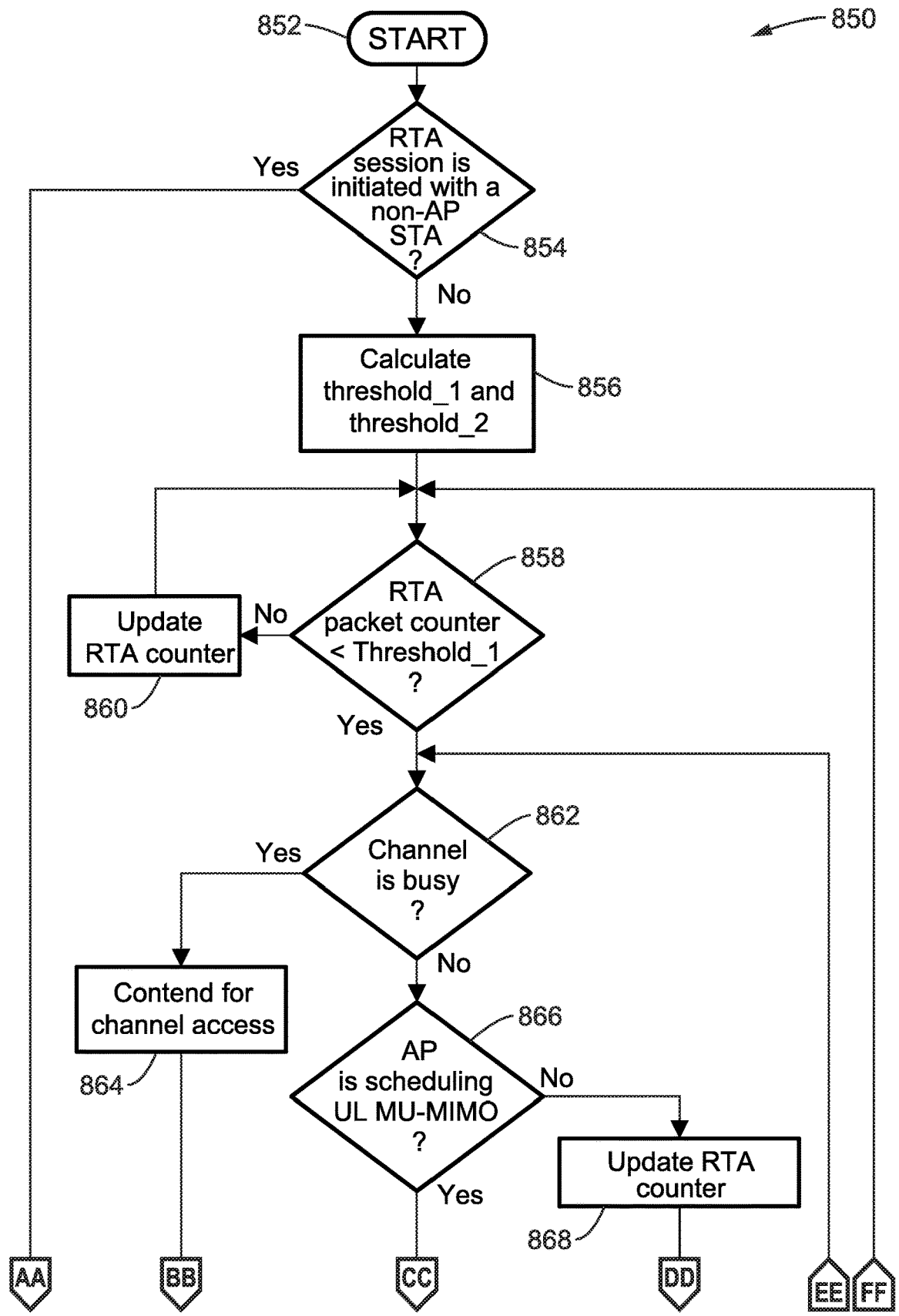
FIG. 51A and FIG. 51B is a flow diagram of an AP scheduling an UL RTA packet transmission using MU-MIMO techniques according to at least one embodiment of the present disclosure.
Figure 51B:
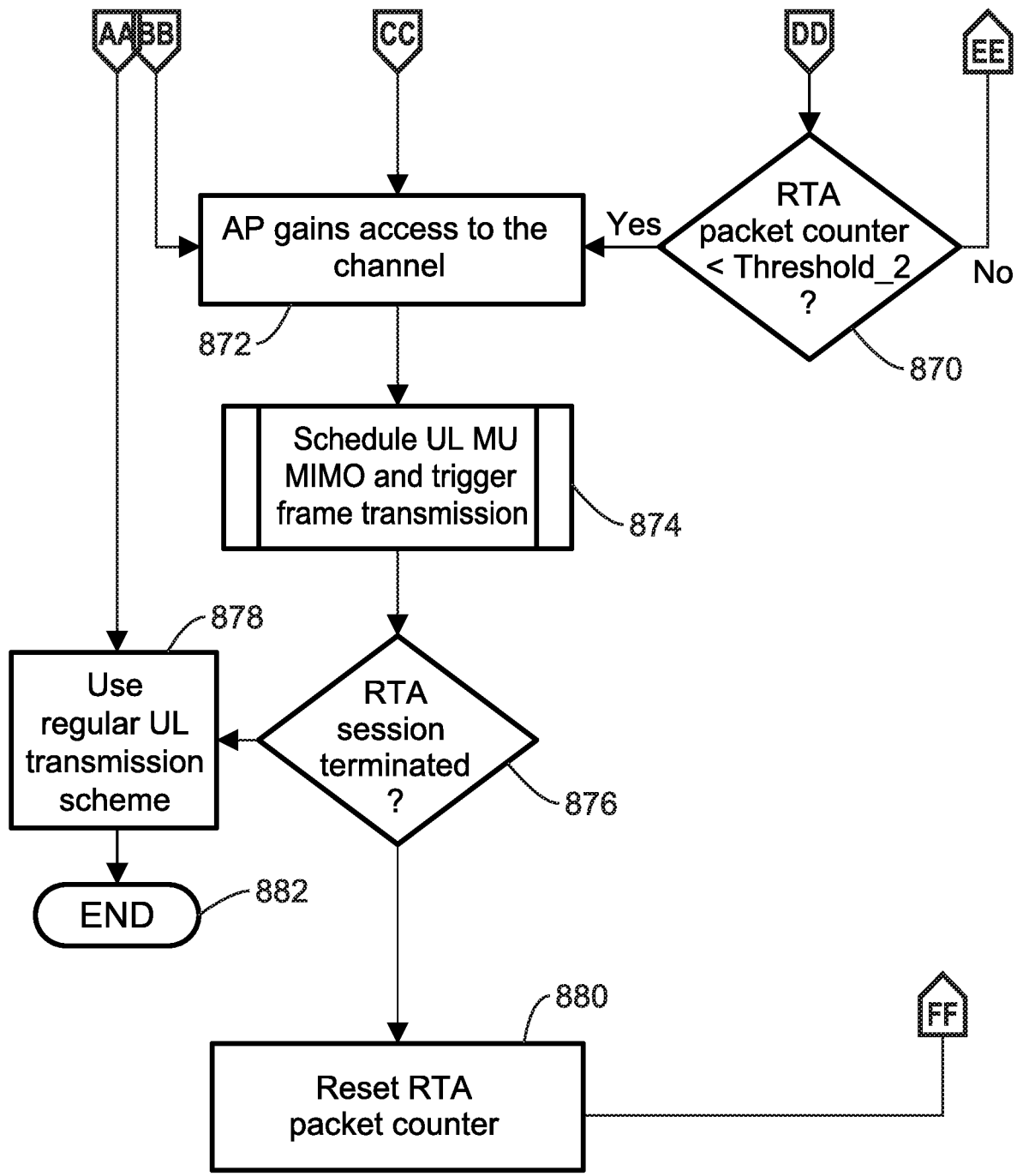

FIG. 51A and FIG. 51B illustrates an example embodiment 850 of an AP scheduling an UL RTA packet transmission using MU-MIMO techniques. The process starts 852 with a check 854 being made if an RTA session is initiated with a non-AP STA. If this is a non-AP STA then execution moves to block 878 in FIG. 51B which uses a regular UL transmission scheme and ends 882.

Otherwise, if this is an AP, then the AP uses collected statistics and the feedback from the non-AP STA (RTA STA) RTQTD to calculate 856 channel access thresholds threshold_1 and threshold_2. The AP is aware of the schedule of the RTA packet arrival in the non-AP STA and has an expectation of when the RTA packet should arrive to the non-AP STA queue.

This is conveyed to the AP at the RTA stream initiation message. The AP initiates a timer where this time value is a countdown to the expected arrival of the RTA packet at the non-AP STA buffer. The AP needs to act before the arrival of the RTA packet and any implementation to give the estimated time before the RTA packet arrival should be valid.

Moving from block 856, then a check is made 858 on whether the RTA packet counter is below Threshold_1. If it is not below the threshold, then execution moves to block 860 to update the RTA counter before returning to check 858. Otherwise, if the packet counter is less than Threshold_1, then the AP starts preparing for the trigger frame and check 862 is performed to determine if the channel is busy. After the countdown time reaches threshold_1, if the channel is busy then block 864 is reached with the AP contending for channel access, and then reaches block 872 in FIG. 51B at which time the AP gains channel access.

If the check 862 determines that the channel is not busy a check is made 866 if the AP has data to schedule for other UL STAs transmission. If there are transmissions to schedule, then block 872 is reached in FIG. 51B with the AP gaining channel access and scheduling 874 UL MU-MIMO/OFDMA transmission and schedules the UL RTA packet in the future time in that allocation and transmits the trigger frame with this allocation information.

If the check at block 866 found that the AP does not have data for other UL STAs transmissions, then AP can update 868 the RTA counter, and continues monitoring the channel, and reaches check 870 in FIG. 51B. If the RTA is not below Threshold_2 then execution returns to the check on channel busy at block 862. Otherwise, when it is found at check 870 that the countdown timer has reached Threshold_2 then block 872 is reached with the AP accessing the channel at that time.

The AP then schedules 874 UL MU-MIMO/OFDMA transmission, schedules the RTA packet in the future time in that allocation and transmits the trigger frame with these allocation information. A check is made 876 if the RTA session has expired. If it has expired, then execution moves to block 878 with using a regular UL transmission mechanism (scheme). Otherwise, once the trigger frame is transmitted and the RTA session is not terminated, then the AP resets 880 the timer and execution moves back to check 858 on whether the RTA packet counter is less than Threshold_1, starting the countdown to the next UL RTA packet.

Figure 52:
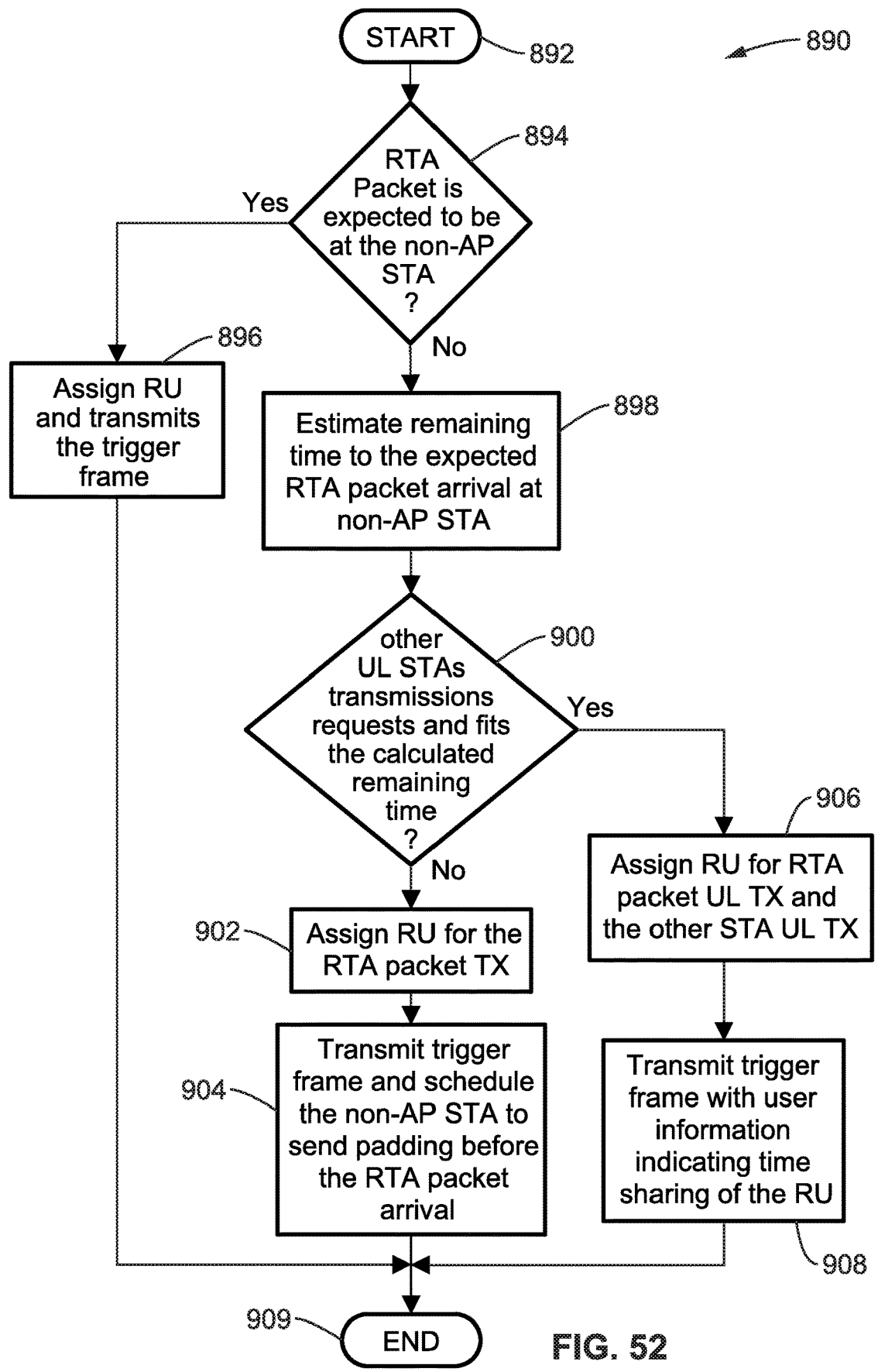
FIG. 52 is a flow diagram of scheduling the UL-MIMO or the delayed UL RTA packet transmission according to at least one embodiment of the present disclosure.

FIG. 52 illustrates an example embodiment 890 of scheduling the UL-MIMO or the delayed UL RTA packet transmission. The process starts 892, then a check if made 894 to determine if the RTA packet is estimated to be available in the MAC buffer of the non-AP STA. If check 894 is satisfied, then execution reaches block 896 with the AP assigning resources (RU) to the RTA packet and transmitting the trigger frame to start the UL transmission, before ending 909 the process.

However, if the RTA packet is estimated to not yet be available in the MAC buffer of the non-AP STA, then execution moves from check 894 to block 898 with the AP estimating the remaining time to the expected RTA packet arrival at the non-AP STA, based on knowledge of the estimating arrival time of the RTA packet estimate and the time left for the RTA packet to be available for TX at the non-AP STA and use this time to schedule the UL RTA packet TX time in future time over an RU.

The AP then checks 900 if there are other UL packets to be transmitted by other STAs and fits the time left until the arrival of the RTA packet. If such condition is satisfied, then block 906 is reached with the AP scheduling the other UL STA packet transmission before the RTA packet on the same RU, and transmitting 908 the trigger frame with user information indicating time sharing of the RU before ending the process.

If the condition is not satisfied at check 900, then at block 902 the AP assigns RU for the RTA packet transmission and at block 904 transmits the trigger frame and schedules the non-AP STA to send padding before the RTA scheduled transmission, before the process ends 909.

8.2.6. Non-AP STA (RTA STA) Flow Diagram

Figure 53A:
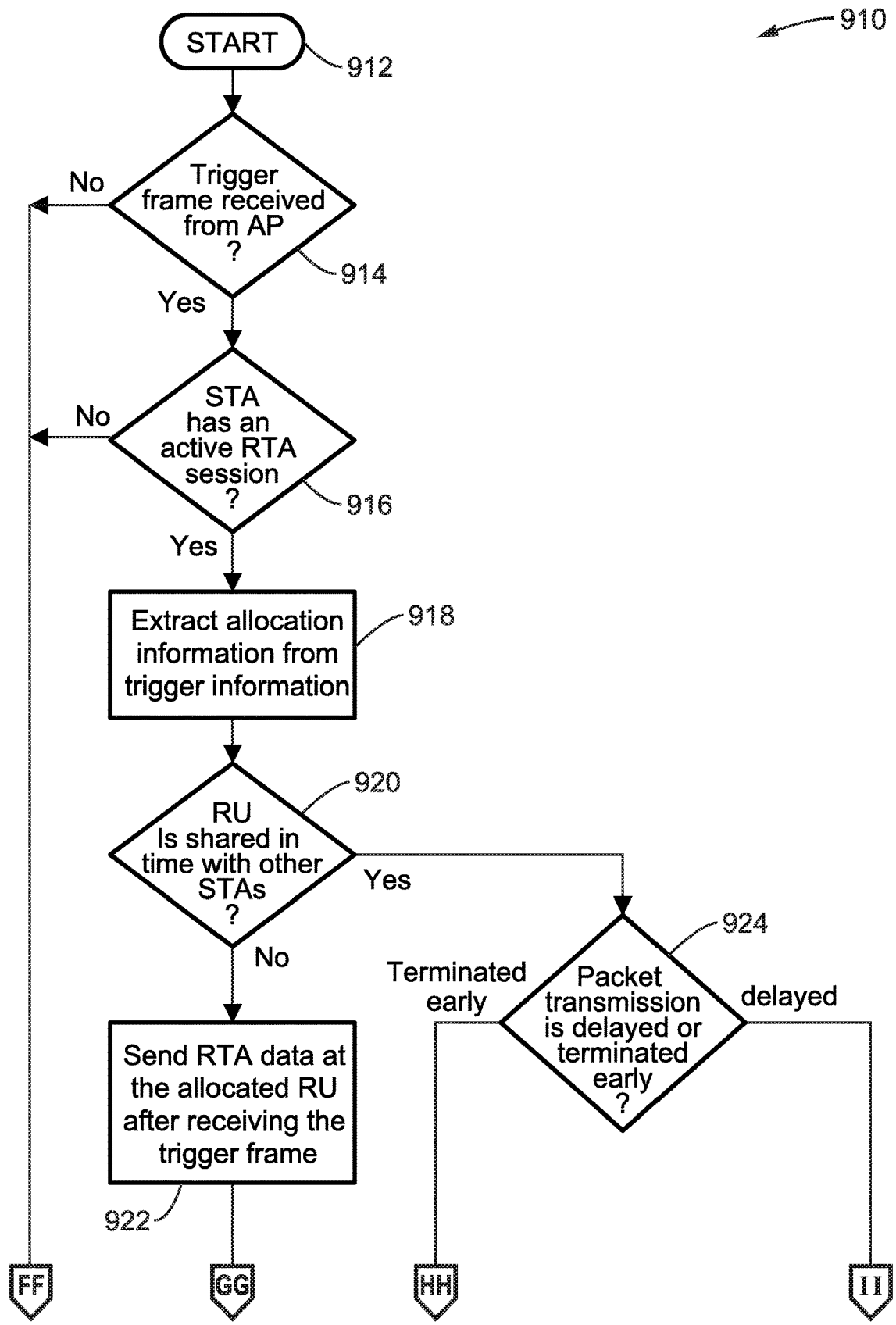
FIG. 53A and FIG. 53B is a flow diagram of a STA processing a basic trigger frame received from an AP with UL scheduling and future scheduling of RTA packets according to at least one embodiment of the present disclosure.
Figure 53B:
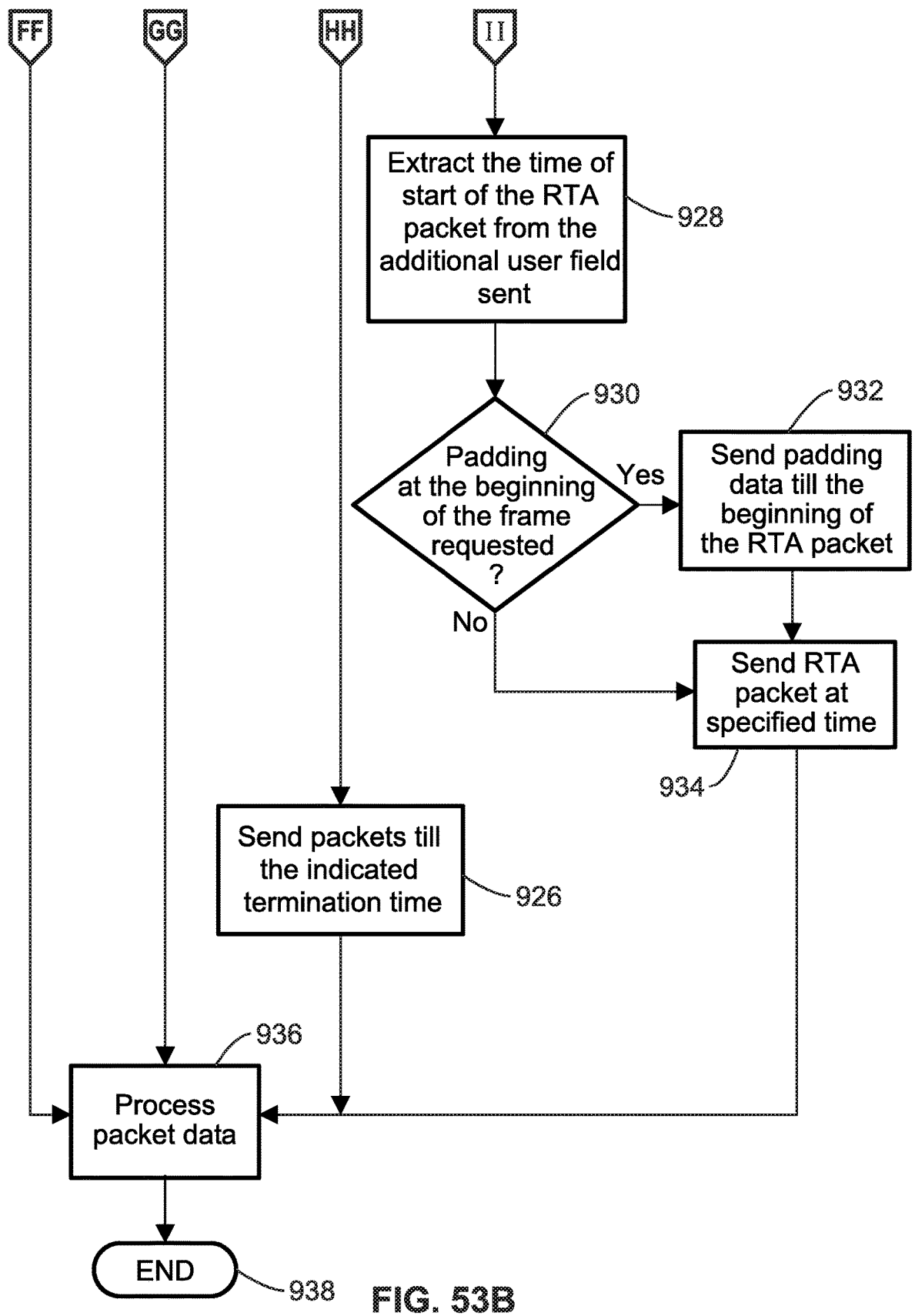

FIG. 53A and FIG. 53B illustrate an example embodiment 910 of a STA processing a basic trigger frame received from an AP with UL scheduling and future scheduling of RTA packets. Processing starts 912, and a check made 914 to determine if the RTA STA received a trigger frame indicating scheduled UL MU-MIMO transmission from the AP. If the condition is not satisfied, then execution moves to block 936 in FIG. 53B which processes the packet data before the process ends 938.

Otherwise, if the condition at block 914 is met and a trigger frame is received from the AP, then a check 916 is made if it has an active RTA session or expects/enable future packet scheduling. If the condition is not satisfied, execution again moves to block 936 in FIG. 53B. Otherwise, with the condition being met, execution reaches block 918 with the STA extracting allocation information from the trigger information, thus the STA parses the trigger frame to extract scheduling information.

A check is made 920 to determine if the RU is to be time-shared with other STAs. If the condition is not met, and the STA is not time-sharing an RU with other STAs for UL transmission, then the non-AP STA immediately transmits 922 its UL packet on the allocated resources, and execution reaches block 936 in FIG. 53B and the process ends 938.

Otherwise, if the RU is being shared as determined at block 920, then execution reaches check 924 to determine if the packet transmission is terminated early or delayed. If it is found that packet transmission is terminated early, then block 926 of FIG. 53B is reached which sends packets until the indicated termination time, then processes 936 packet data and ends 938.

If however, the packet transmission is delayed, then block 928 of FIG. 53B is reached which extracts the user field information of the trigger frame for its scheduled transmission. It will be noted that the second user field should carry the time where the STA should start transmitting the RTA packet. After extracting this information, check 930 determines if padding is requested at the beginning of the frame. If the condition is met, then padding data is sent 932 until the beginning of the RTA packet, before reaching block 934. Otherwise, if padding is not requested, then execution moves directly to block 934 which sends the RTA packet of the specified time before reaching block 936 which processes the packet data and ends 938 the process.

8.2.7. Trigger Frame Format

Figure 54:
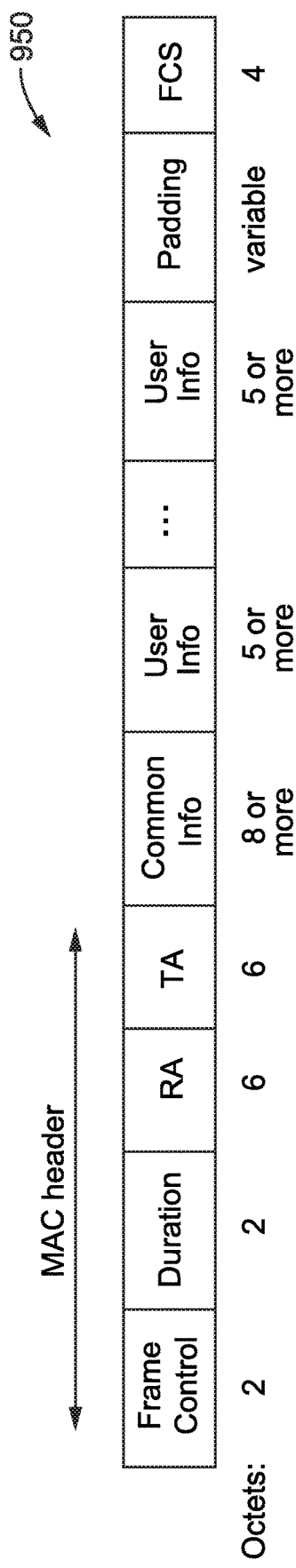
FIG. 54 is a data field diagram of a trigger frame for allocating resources for UL MU-MIMO/OFDMA transmission according to at least one embodiment of the present disclosure.

FIG. 54 illustrates an example embodiment 950 of a trigger frame for allocating resources for UL MU-MIMO/OFDMA transmission. It carries information required by the responding STAs to send the HE TB PPDU and their UL data. The frame contains the frame control information, the duration of the frame, the receiver and transmitter information. It also contains common information for all users to transmit the HE TB PPDU and specific information to each user.

Figure 55:
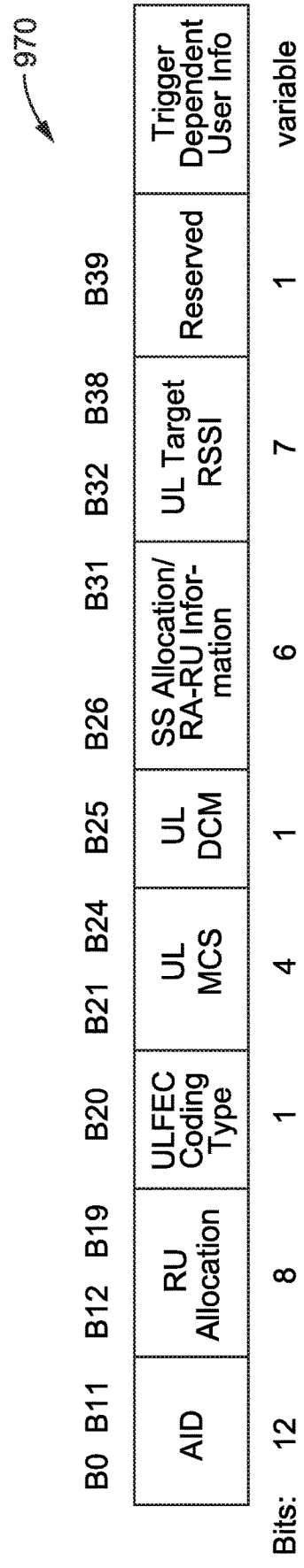
FIG. 55 is a data field diagram of user information fields as contained in the trigger frame format of FIG. 54, according to at least one embodiment of the present disclosure.

FIG. 55 illustrates user information fields 970 as was contained in the trigger frame format of FIG. 54. This user field is defined in 802.11ax and contains the STA AID, the RU allocation for the STA, UL parameters which may include FEC coding type, MCS, DCM, spatial streams allocation and the targeted RSSI, or similar.

In order to signal the cascaded scheduling of RTA or the scheduling of padding information at the beginning of the UL scheduled frame, the reserved bit B39 in the user field can be used in the trigger frame of FIG. 54. The AP sets B39 to one if STA associated to this user field where the AID of the STA matches the AID field in the user field is delaying its transmission in the UL frame scheduled. The non-AP STA whose user field is matching its AID still processes the date and extracts all the PHY parameters needed for transmission. The non-AP STA after seeing the B39 is set to one, shall expect to have another user field associated to it, having the same AID of the non-AP STA, and containing the timing information of the UL transmission (e.g., the delay to the preamble or when to finish the UL transmission) also whether the STA should transmit a dummy packet before the RTA packet transmission. The user field also contains a variable number of bits containing trigger dependent user information.

Figure 56A:
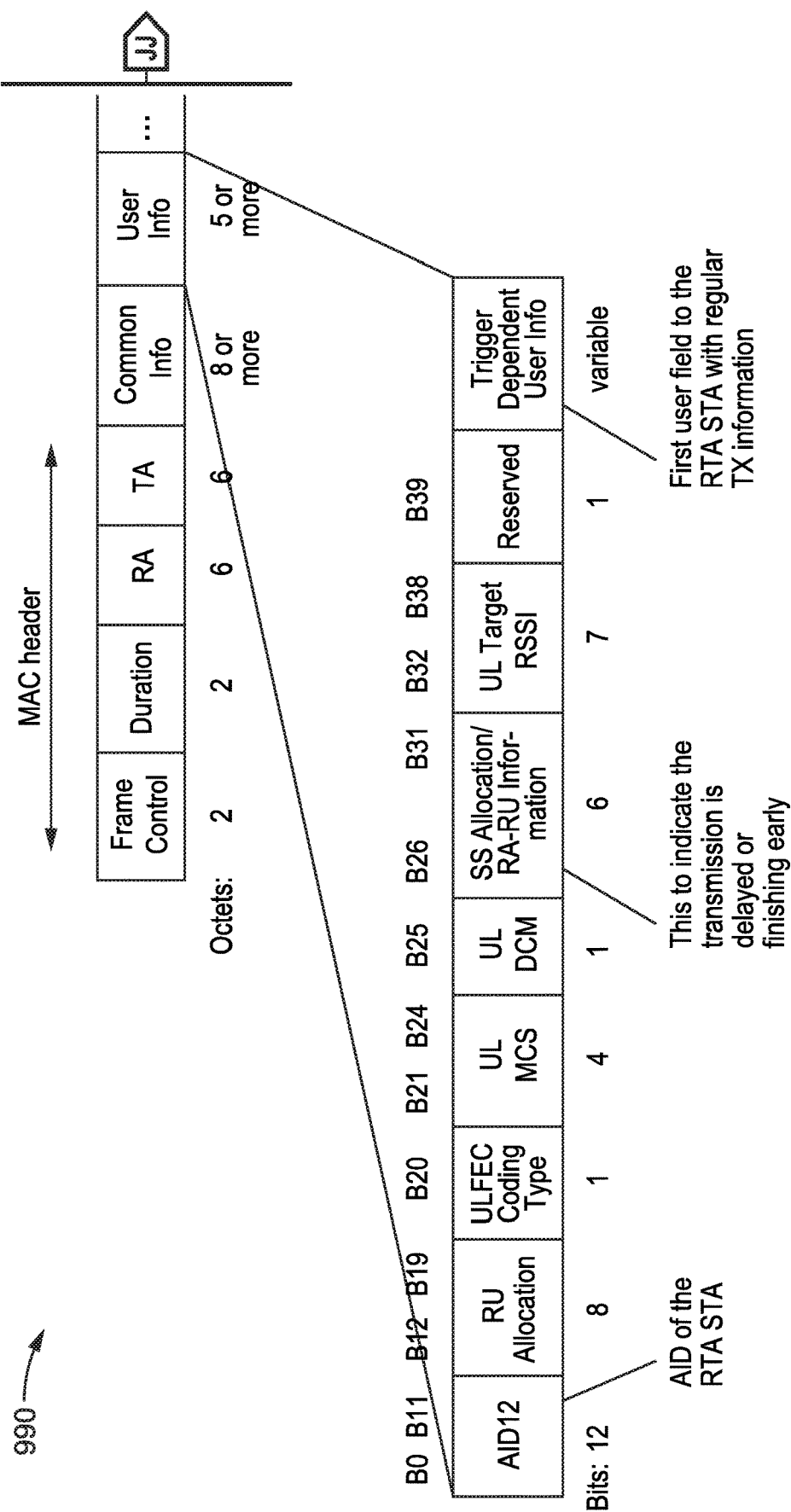
FIG. 56A and FIG. 56B is a data field diagram of the trigger frame to be sent in case of cascaded transmission of multiple STAs or in case of one STA transmission is delayed and that STA is required to send padding information according to at least one embodiment of the present disclosure.
Figure 56B:
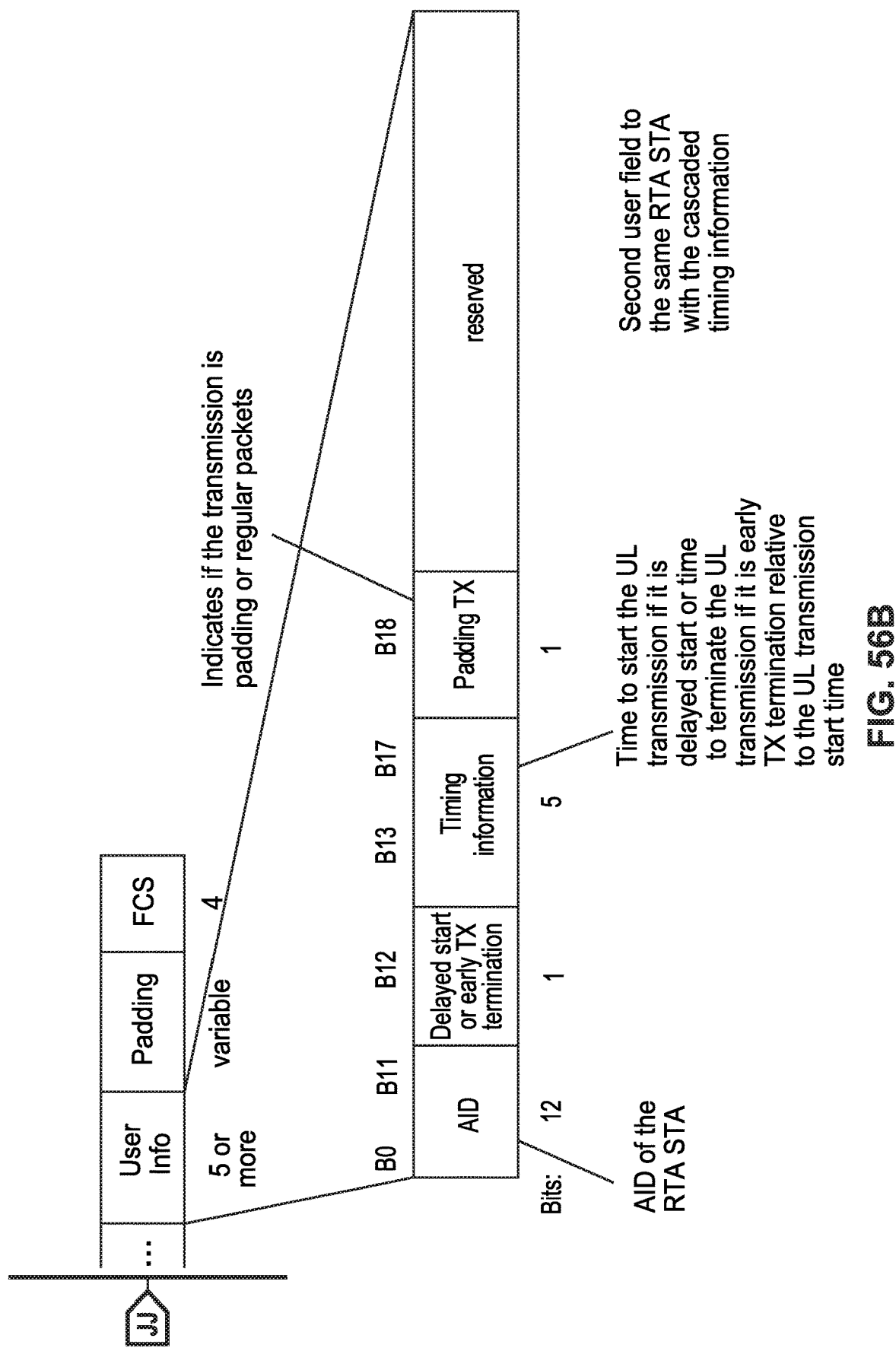

FIG. 56A and FIG. 56B illustrate an example embodiment 990 of the trigger frame to be sent in case of cascaded transmission of multiple STAs or in case of one STA transmission is delayed and that STA is required to send padding information, wherein the figures depicts multiple user information fields. The SS Allocation/RA-RU information of the first user field indicates the transmission is delayed or finishing early, and the trigger dependent user information in that user field is to the RTA STA with regular TX information.

8.2.7.1. For Non-AP STA with Delayed Start

The trigger frame of FIG. 56A and FIG. 56B contains two user fields for the non-AP STA. The first user field contains the AID of the RTA STA and has the cascaded TX bit set to 1. The second user field of FIG. 56B contains the AID of the RTA STA and has a different format than the regular user field. The second user field indicates that the transmission is delayed by setting the delayed TX or early TX termination field to 1. The second user field of Timing Information indicates the time when the non-AP STA starts the UL transmission relative to the UL TX start time. By way of example and not limitation 5 bits have been allocated for timing information, although the number of bits can be set differently according to the defined resolution and time units used. A padding TX subfield is shown indicating if the transmission is either padding or regular packets. The remainder of the user field in the second user field transmission is reserved.

8.2.7.2. For Non-AP STA with Early Tx Termination

The trigger frame contains two user fields for the non-AP STA. The first user field contains the AID of the RTA STA and has the cascaded TX bit set to 1. The second user field contains the AID of the RTA STA and has a different format than the regular user field. The second user field indicates that the transmission is terminated early by setting the delayed TX or early TX termination field to zero (0). The second user field indicates the time when the non-AP STA terminate the UL transmission relative to the UL TX start time in the timing information. In this example we allocated 5 bits for the timing information. The number of bits can be different according to the defined resolution and time unit used. If the non-AP STA is to send padding information, the padding TX field is set to 1 otherwise it is set to zero (0). The remainder of the user field in the second user field transmission is reserved.

9. Frame Format
9.1. PPACC Request

Figure 57:
FIG. 57 is a data field diagram of a PPACC request frame as sent by a non-AP STA to the AP STA according to at least one embodiment of the present disclosure.

FIG. 57 illustrates an example embodiment 1030 of the PPACC request frame, which is sent by a non-AP STA to the AP STA it is associated to in its BSS to request to use the Pre-Packet Arrival Channel Access procedure. The non-AP STA is expecting a response from the AP STA to accept or reject the request. The fields are as follows. A frame Control field contains all the necessary information to identify the frame. A PPACC Request field is set to a first state (e.g., 1) to indicate that the non-AP STA is requesting a PPACC procedure enablement. The AP STA should compare this to the network setting and approve or reject this request. An ECW Length field indicates the requested ECW period length (time for example) to be used by the non-AP during the PPACC procedure. The AP STA should compare this to the network setting and approve or reject this value. An ECAW Length field indicates the requested WCAW period length (time for example) to be used by the non-AP during the PPACC procedure. The AP STA should compare this to the network setting and approve or reject this value. A PPACC length field indicates the period the PPACC is requested to be active in the non-AP STA. The STA, if this request is approved, will be running the PPACC for this period length (time or number of beacon intervals), with a value of zero indicating an unlimited time period.

9.2. PPACC Response

Figure 58:
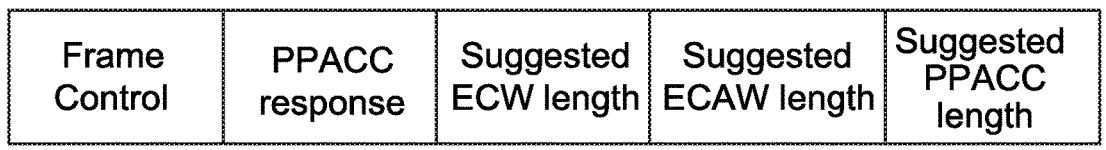
FIG. 58 is a data field diagram of a PPACC response field as sent by an AP STA to the non-AP STA according to at least one embodiment of the present disclosure.

FIG. 58 illustrates an example embodiment 1050 of the PPACC response field. This frame is sent by an AP STA to the non-AP STA in its BSS in response to a request to use the Pre-Packet Arrival Channel Access procedure. The non-AP STA is expecting the response from the AP STA to accept or reject the request. The fields are as follows. A Frame Control field contains all the necessary information to identify the frame. A PPACC Response field is set to a first state (e.g., 1) to indicate that the non-AP STA is accepting the PPACC request for the PPACC procedure enablement otherwise it is rejected. The STA receiving this response will enable the PPACC procedure if the response is such that the request is accepted. If the response indicates rejection, the non-AP STA can resend this request with other parameters. A Suggested ECW Length field only exists if the PPACC Response is set to a second state (e.g., 0). This indicates the suggested ECW period length to be used by the non-AP during the PPACC procedure in case the request is rejected and the AP is still willing to enable the PPACC procedure for the non-AP STA. The AP sets this field to 0 if it is not willing to enable the PPACC procedure for the non-AP STA.

A Suggested ECAW Length field only exists if the PPACC Response is set to 0. This indicates the suggested ECAW period length to be used by the non-AP during the PPACC procedure in case the request is rejected and the AP is still willing to enable the PPACC procedure for the non-AP STA. The AP sets this field to 0 if it is not willing to enable the PPACC procedure for the non-AP STA.

A Suggested PPACC length field only exists if the PPACC Response is set to 0. This indicates the suggested PPACC length to be used by the non-AP during the PPACC procedure in case the request is rejected and the AP still willing to enable the PPACC procedure for the non-AP STA. The AP sets this field to 0 if it is not willing to enable the PPACC procedure for the non-AP STA.

9.3. ECA Period Request

Figure 59:
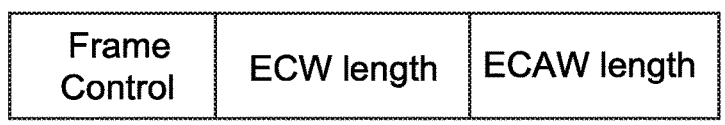
FIG. 59 is a data field diagram of an ECA period request as sent by a non-AP STA to the AP STA according to at least one embodiment of the present disclosure.

FIG. 59 illustrates an example embodiment 1070 of an ECA period request. This frame is sent by a non-AP STA to the AP STA it is associated to in its BSS to request to update the parameters of the Pre-Packet Arrival Channel Access procedure. The non-AP STA is expecting a response from the AP STA to accept or reject the request. The fields are as follows. A Frame Control field contains all the necessary information to identify the frame. An ECW Length field indicates the requested updated ECW period length (time for example) to be used by the non-AP during the PPACC procedure. The AP STA should compare this to the network setting and approve or reject this value. An ECAW Length field indicates the requested WCAW period length (time for example) to be used by the non-AP during the PPACC procedure. The AP STA should compare this to the network setting and approve or reject this value.

9.4. ECA Period Response

Figure 60:
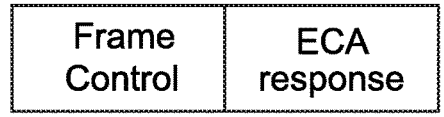
FIG. 60 is a data field diagram of an ECA period response frame as sent by an AP STA to the non-AP STA according to at least one embodiment of the present disclosure.

FIG. 60 illustrates an example embodiment 1090 of an ECA period response frame. This frame is sent by an AP STA to the non-AP STA in its BSS in response to a request to update the parameters of the Pre-Packet Arrival Channel Access procedure. The non-AP STA is expecting the response from the AP STA to accept or reject the request. The fields are as follows. A Frame Control field contains all the necessary information to identify the frame. An ECA Response field is set to a first state (e.g., 1) to indicate that the non-AP STA is accepting the ECA request for the PPACC procedure enablement otherwise it is rejected. The STA receiving this response will update the ECA parameters of the PPACC procedure if the response is such that the request is accepted.

9.5. RTA Stream Initiation Request

Figure 61:
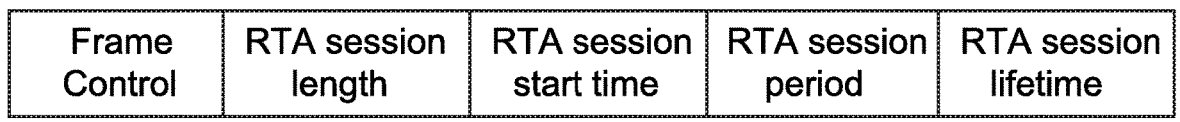
FIG. 61 is a data field diagram of an RTA stream initiation request as sent by a STA to its associated AP according to at least one embodiment of the present disclosure.

FIG. 61 illustrates an example embodiment 1110 of an RTA stream initiation request. This frame is send by a STA to its associated AP to request initiation of an RTA session at a specific time, for some time with a specific periodicity. The fields are as follows. A Frame Control field contains all the necessary information to identify the frame. An RTA Session length field indicates the period to be scheduled for the STA by the AP to perform UL transmission. If the request is accepted the AP receiving the request should allocate and schedule resources for the STA for this amount of time for UL transmission. An RTA session start time field indicates the time the RTA session is expected to start. This represents the time the STA is expecting to have a packet ready for transmission. The time can be relative to the time of transmission of this packet or exact time when the AP and STA are synchronized. The AP uses this value as a time to start the allocation of the resources for the STA transmission for the UL scheduling. An RTA session period field indicates the periodicity of the RTA packet transmission from the STA to the AP. Every RTA session period the STA is expected to have RTA data ready to be transmitted. The AP uses this information to schedule one RTA channel access at each of these periods. The expected time of the RTA transmissions should be after RTA session start time with multiple RTA session periods. An RTA Session lifetime field indicates the amount of time the RTA session is on. This represents the time the STA is expected to send RTA packets to the AP every RTA session period. The time can be relative to the time of transmission of this packet or an exact time when the AP and STA are synchronized. The AP shall stop scheduling RTA packet transmission after that time.

9.6. RTA Stream Initiation Response

Figure 62:
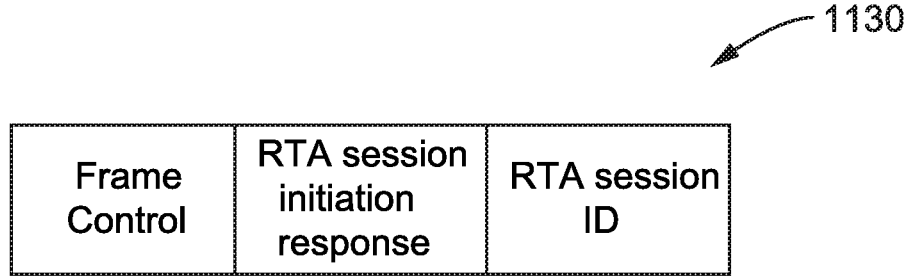
FIG. 62 is a data field diagram of an RTA stream initiation response as sent by an AP to its associated STA according to at least one embodiment of the present disclosure.

FIG. 62 illustrates an example embodiment 1130 of an RTA stream initiation response. This frame is sent by an AP to its associated STA as a response to a request to initiate an RTA session at a specific time, or for some time with a specific periodicity. The fields are as follows. A Frame Control field contains all the necessary information to identify the frame. An RTA Session initiation response field indicates the response to the RTA stream initiation request. If set to a first state (e.g., one), the AP indicates that it accepted the RTA session request and assigned a session ID to it. If set to a second state (e.g., zero), the AP indicates that it rejected the request. The STA should expect the scheduling of the RTA transmissions if the initiation request is accepted and receive the session ID. An RTA session ID field indicates the RTA session ID assigned by the AP to the STA. The STA uses this session ID to refer to this RTA session in future.

9.7. RTQTD Feedback

Figure 63:
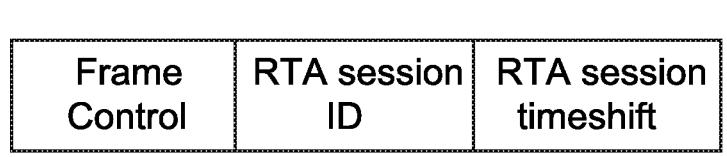
FIG. 63 is a data field diagram of an RTQTD feedback field as sent by the STA to its associated AP according to at least one embodiment of the present disclosure.

FIG. 63 illustrates an example embodiment 1150 of an RTQTD feedback field. This frame is sent by the STA to its associated AP to update the expected time of the RTA transmission. The STA can transmit this frame at any time after the session is initiated. The fields are as follows. A Frame Control field contains all the necessary information to identify the frame. An RTA session ID field indicates the RTA session ID assigned by the AP to the STA. The STA uses this session ID to refer to this RTA session in the future. An RTA session time shift field indicates the time the new RTA transmission is expected to start. This represents the time the STA is expecting to have a packet ready for transmission. The time can be relative to the time of transmission of this packet or exact time when the AP and STA are synchronized. The AP uses this value to update the allocation of resources for the STA transmission for the UL scheduling.

9.8. RTQTD Feedback Acknowledgement

Figure 64:
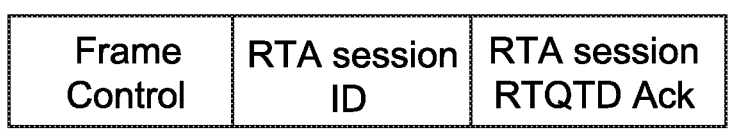
FIG. 64 is a data field diagram of an RTQTD feedback acknowledgement as sent by the STA to its associated AP to update the expected time of the RTA transmission according to at least one embodiment of the present disclosure.

FIG. 64 illustrates an example embodiment 1170 of an RTQTD feedback acknowledgement. This frame is sent by the STA to its associated AP to update the expected time of the RTA transmission. The STA can transmit this frame at any time after the session is initiated. The fields are as follows. A Frame Control field contains all the necessary information to identify the frame. An RTA session ID field indicates the RTA session ID assigned by the AP to the STA. The STA uses this session ID to refer to this RTA session in the future. An RTA session RTQTD ACK field indicates an acknowledgement of the reception of the RTQTD update request. If set to a first state (e.g., 1), the AP is acknowledging updating the RTA packet transmission time to the time difference sent in the request. The STA shall expect the allocation in the requested time. If set to a second state (e.g., 0), the AP could not update the RTA transmission time and the STA can try later or keep using the current allocations.

10. Summary

According to the present disclosure an AP scheduling MU-MIMO transmissions for UL or DL for RTA packets allocates resources to the packet transmission before the RTA packet arrival and might gain access to the channel even before the expected RTA packet arrival. Toward accomplishing this the AP does the following. (a) The AP is made aware of the RTA packet expected arrival time and periodicity at the AP in case of DL MU-MIMO transmission or at the non-AP STA in case of UL MU MIMO transmission. (b) The AP may contend for channel access before the expected time of arrival of the RTA packet in the DL or the UL direction and can schedule cascaded transmissions on the same resources of another STA and the RTA STA for the UL or DL transmission by either of the following: (i) if the AP gained access to the channel after, or at the time of, arrival of the RTA packet then the RTA packet transmission is immediately scheduled on the allocated resources; or (ii) if the AP gained access to the channel before the expected time of arrival of the RTA packet then the AP can schedule cascaded transmission on the same resources of another STA and the RTA STA for the UL or DL transmission.

In at least one embodiment, if the AP gains access to the channel before the expected time of arrival of the RTA packet, the AP can schedule cascaded transmissions on the same resources of another STA and the RTA STA for the UL or DL transmission.

In at least one embodiment for DL MIMO, if the AP gains access to the channel before the arrival of the RTA packet, the AP can schedule the DL RTA packet in the future and send a dummy packet that operates like padding until RTA packet arrival.

In at least one embodiment for DL MIMO, if the AP gains access to the channel before the arrival of the RTA packet, the AP can schedule the DL RTA packet in the future and schedule another DL transmission on the same RU time sharing the resources till the arrival of the RTA packet.

In at least one embodiment the AP informs the STA that the transmission is delayed in the allocated resources by modifying the preamble of the DL MU-MIMO frame. The non-AP STA can parse the resources and expect the RTA packet after the padding (dummy packet) is has been transmitted.

In at least one embodiment the AP informs the RTA STA that the transmission is delayed in the allocated resources by modifying the preamble of the DL MU-MIMO frame. The non-AP STA can parse the resources and expect the RTA packet after the other STA transmission has been performed.

In at least one embodiment the AP can modify the preamble user field to the non-AP STA to indicate that the RU is time-shared with other STAs. This is performed by the following steps. (a) Setting a bit in the user field to indicate that the RU is shared and sending another user field to indicate the information of the other STA or padding, or (b) by defining a new user field and sending the time relative to the start of the DL transmission where the delayed DL transmission is starting, in doing this both transmission time sharing resources share PHY parameters.

In at least one embodiment for a UL transmission, the non-AP STA sends an RTA stream initiation request to the AP to inform it about the RTA session and the RTA session parameters. The AP responds with acknowledgement and acceptance or rejection to the RTA stream session request, which saves the delay of sending a BSR every time a packet is available for transmission in UL direction.

In at least one embodiment for a UL transmission, the AP allocates resources to the UL RTA and sends a trigger frame to the non-AP STA. The AP can send the allocation information before the arrival of the RTA packet.

In at least one embodiment the AP can schedule the non-AP STA to delay its UL transmission after receiving the RTA packet by sending two user fields to the non-AP STA in the trigger frame, with the first user field to indicate the PHY parameters and the second user field indicates the delayed start of the UL transmission.

In at least one embodiment the non-AP STA can be requested to send padding data (dummy packet) at a time when it is not transmitting its packets.

In at least one embodiment the AP can schedule other STAs to transmit at a time when the delayed STA is not transmitting its UL data. This is accomplished by informing that STA that it is time sharing the resources and sending two user fields to the non-AP STA in the trigger frame, a first user field indicated in the PHY parameters and the second user field indicated in the termination of the UL transmission.

In at least one embodiment for UL transmission, the non-AP STA can send queuing buffer status for RTA packets to the AP to update its estimate for the RTA packet scheduling time.

11. General Scope of Embodiments

The enhancements described in the presented technology can be readily implemented within various wireless communication station circuits. It should also be appreciated that wireless communication stations are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in the diagrams for the sake of simplicity of illustration, as one of ordinary skill in the art recognizes the use of computer devices for carrying out steps involved with operating wireless communication stations. The presented technology is non-limiting with regard to memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. An apparatus for wireless communication in a network, the apparatus comprising: (a) a wireless communication circuit configured as a station for wirelessly communicating with at least one other wireless local area network (WLAN) station in its reception area, and operating as either an access point (AP) or a non-AP; (b) a processor coupled to said wireless communication circuit within a station configured for operating on the WLAN; (c) a non-transitory memory storing instructions executable by the processor; and (d) wherein said instructions, when executed by the processor, perform steps comprising: (d)(i) operating said wireless communication circuit as a WLAN station configured to support communicating real-time application (RTA) packets that are sensitive to communication delays as well as non-real time packets; (d)(ii) distinguishing real-time application (RTA) packets from non-real-time application (non-RTA) packets by prior negotiation, or packet header information, or a combination of prior negotiation and packet header information; (d)(iii) obtaining information on RTA packet arrival time and periodicity when operating as an AP performing DL MU-MIMO transmission, or when operating as a non-AP station performing UL MU MIMO transmission; (d)(iv) wherein said station operating as an access point (AP) scheduling multiple-user (MU) multiple-input-multiple-output (MIMO) transmissions for uplink (UL) or downlink (DL) for RTA packets performs allocating resources to packet transmission before RTA packet arrival; and (d)(v) contending for channel access before the expected time of arrival of the RTA packet in the DL or UL direction when operating as an AP station, and (A) immediately scheduling RTA packet transmission on the allocated resources (RU) when the AP gains access to the channel after or at the time of arrival of the RTA packet; or (B) scheduling cascaded transmission on the same allocated resources (RU) of another station and an RTA station for an UL or DL transmission when the AP gains access to the channel before the expected time of arrival of the RTA packet.

2. An apparatus for wireless communication in a network, the apparatus comprising: (a) a wireless communication circuit configured as a station for wirelessly communicating with at least one other wireless local area network (WLAN) station in its reception area, and operating as either an access point (AP) or a non-AP; (b) a processor coupled to said wireless communication circuit within a station configured for operating on the WLAN; (c) a non-transitory memory storing instructions executable by the processor; and (d) wherein said instructions, when executed by the processor, perform steps comprising: (d)(i) operating said wireless communication circuit as a WLAN station configured to support communicating real-time application (RTA) packets that are sensitive to communication delays as well as non-real time packets; (d)(ii) distinguishing real-time application (RTA) packets from non-real-time application (non-RTA) packets by prior negotiation, or packet header information, or a combination of prior negotiation and packet header information; (d)(iii) obtaining information on RTA packet arrival time and periodicity when operating as an AP performing DL MU-MIMO transmission, or when operating as a non-AP station performing UL MU MIMO transmission; (d)(iv) wherein said station operating as an access point (AP) scheduling multiple-user (MU) multiple-input-multiple-output (MIMO) transmissions for uplink (UL) or downlink (DL) for RTA packets performs allocating resources to packet transmission before RTA packet arrival, and when operating as an AP for a DL MIMO schedules a future DL RTA packet and sends a dummy packet that operates as padding until arrival of the DL RTA packet, when the AP gains access to the channel before the arrival of the RTA packet; and (d)(v) contending for channel access before the expected time of arrival of the RTA packet in the DL or UL direction when operating as an AP station, and (A) immediately scheduling RTA packet transmission on the allocated resources (RU) when the AP gains access to the channel after or at the time of arrival of the RTA packet; or (B) scheduling cascaded transmission on the same allocated resources (RU) of another station and an RTA station for an UL or DL transmission when the AP gains access to the channel before the expected time of arrival of the RTA packet.

3. A method of performing wireless communication in a network, comprising: (a) operating a wireless communication circuit as a WLAN station configured as a station for wirelessly communicating with at least one other wireless local area network (WLAN) station in its reception area, and operating as either an access point (AP) or a non-AP to support communicating real-time application (RTA) packets that are sensitive to communication delays as well as non-real time packets; (b) distinguishing real-time application (RTA) packets from non-real-time application (non-RTA) packets by prior negotiation, or packet header information, or a combination of prior negotiation and packet header information; (c) obtaining information on RTA packet arrival time and periodicity when operating as an AP performing DL MU-MIMO transmission, or when operating as a non-AP station performing UL MU MIMO transmission; (d) wherein said station operating as an access point (AP) scheduling multiple-user (MU) multiple-input-multiple-output (MIMO) transmissions for uplink (UL) or downlink (DL) for RTA packets performs allocating resources to packet transmission before RTA packet arrival; and (e) contending for channel access before the expected time of arrival of the RTA packet in the DL or UL direction when operating as an AP station, and (A) immediately scheduling RTA packet transmission on the allocated resources (RU) when the AP gains access to the channel after or at the time of arrival of the RTA packet; or (B) scheduling cascaded transmission on the same allocated resources (RU) of another station and an RTA station for an UL or DL transmission when the AP gains access to the channel before the expected time of arrival of the RTA packet.

4. A system and method for wireless communication comprising: (a) an AP scheduling MU-MIMO transmission for UL or DL for RTA packets for allocating resources to the packet transmissions before RTA packet arrival to gain access to the channel even before the expected RTA packet arrival; (b) determining RTA packet expected arrival time and periodicity at the AP in case of DL MU-MIMO transmission or at the non-AP STA in case of UL MU MIMO transmission; (c) contending for the channel as an AP before the expected time of arrival of the RTA packet in the DL or the UL direction; (d) immediate scheduling of RTA packet transmission on the allocated resources if the AP gained access to the channel after or at the time of arrival of the RTA packet; (e) scheduling cascaded transmissions on the same resources of another STA and the RTA STA for the UL or DL transmission by an AP, if the AP gained access to the channel before the expected time of arrival of the RTA packet; (f) scheduling the DL RTA packet by the AP for the future and sending a dummy packet that works like padding till the RTA packet arrival, performed in the case of DL MIMO, if the AP gained access to the channel before the arrival of the RTA packet; (g) AP scheduling of the DL RTA packet in the future and scheduling another DL transmission on the same RU time sharing the resources until the arrival of the RTA packet, which is performed in case of DL MIMO, if the AP gained access to the channel before the arrival of the RTA packet.

5. The system, apparatus or method of any preceding embodiment, wherein said instructions, when executed by the processor operating as an AP for a DL MIMO, perform steps comprising scheduling a future DL RTA packet and sending a dummy packet that operates as padding until arrival of the DL RTA packet, when the AP gains access to the channel before the arrival of the RTA packet.

6. The system, apparatus or method of any preceding embodiment, wherein said instructions, when executed by the processor operating as an AP for a DL MIMO, further performs steps comprising informing a non-AP station that transmission in the allocated resources (RU) is delayed by modifying a preamble of a DL MU-MIMO frame to allow the non-AP STA to parse the resources so that it expect the DL RTA packet after the padding or dummy packet has been transmitted.

7. The system, apparatus or method of any preceding embodiment, when executed by the processor operating as an AP for a DL MIMO, further performs steps comprising informing a non-AP station that transmission in the allocated resources (RU) is delayed by modifying a preamble of a DL MU-MIMO frame to allow the non-AP STA to parse the resources so that it expect the DL RTA packet after the other station transmission is completed.

8. The system, apparatus or method of any preceding embodiment, when executed by the processor operating as an AP for a DL MIMO, perform steps comprising scheduling a future DL RTA packet on a resource allocation (RU) and scheduling another DL transmission to time-share the resource allocation (RU) until the arrival of the DL RTA packet.

9. The system, apparatus or method of any preceding embodiment, wherein said instructions, when executed by the processor operating as an AP for a DL MIMO, perform steps further comprising modifying a preamble of a user field sent to a non-AP station to indicate that the allocated resources (RU) is time-shared with other stations, in response to either (i) setting a bit in the user field to indicate that the allocated resources (RU) are shared and sending another user field to indicate the information of another station or for padding of the transmission, or (ii) defining a new user field and sending a time value relative to the start of the DL MIMO transmission at which the delayed DL MIMO transmission is to start, while both transmission time sharing resources share PHY parameters.

10. The system, apparatus or method of any preceding embodiment, wherein said instructions, when executed by the processor operating as a non-AP station with an uplink (UL) transmission performs steps comprising sending an RTA stream session request to the AP to inform it about the RTA session and parameters for the RTA session, for which an AP responds with acknowledgement and acceptance, or rejection, of the RTA stream session request, to eliminate delay involved with sending a Buffer Status Report (BSR) every time a packet is available for transmission in the uplink (UL) direction.

11. The system, apparatus or method of any preceding embodiment, wherein said instructions, when executed by the processor operating as an AP station with an uplink (UL) transmission performs steps comprising allocating resources (RU) for an UL RTA packet transmission and sending a trigger frame to a non-AP STA.

12. The system, apparatus or method of any preceding embodiment, wherein said instructions, when executed by the processor operating as an AP station with an uplink (UL) transmission performs steps comprising allocating resource (RU) prior to arrival of the RTA packet.

13. The system, apparatus or method of any preceding embodiment, wherein said instructions, when executed by the processor operating as an AP station with an uplink (UL) transmission performs steps comprising scheduling a non-AP STA to delay its UL transmission after receiving the RTA packet by sending two user fields to the non-AP station in a trigger frame, a first one indicate the PHY parameters and the second one indicating a delayed start of the UL transmission.

14. The system, apparatus or method of any preceding embodiment, wherein said instructions, when executed by the processor operating as an AP station with an uplink (UL) transmission performs steps comprising requesting that the non-AP STA send padding data, or dummy packet, when it is not transmitting packets in the allocated resources (RU).

15. The system, apparatus or method of any preceding embodiment, wherein said instructions, when executed by the processor operating as an AP station with an uplink (UL) transmission performs steps comprising scheduling other stations to transmit in a time where a station transmission of its UL data has been delayed.

16. The system, apparatus or method of any preceding embodiment, wherein said instructions, when executed by the processor operating performing scheduling of other stations by steps comprising informing another station that it is time sharing the allocated resources (RU) and sending two user fields to the other station in the trigger frame, a first user field indicating PHY parameters and a second user field indicating termination of the uplink (UL) transmission.

17. The system, apparatus or method of any preceding embodiment, wherein said instructions, when executed by the processor operating as a non-AP station with an uplink (UL) transmission performs steps comprising sending queuing buffer status for RTA packets to the AP to update its estimate for RTA packet scheduling time.

18. The system, apparatus or method of any preceding embodiment, wherein the AP informs the STA that the transmission is delayed in the allocated resources by modifying the preamble of the DL MU-MIMO frame. The non-AP STA can parse the resources and expect the RTA packet after the padding (dummy packet) is done transmission 19. The system, apparatus or method of any preceding embodiment, wherein the AP inform the RTA STA that the transmission is delayed in the allocated resources by modifying the preamble of the DL MU-MIMO frame, while the non-AP STA can parse the resources and expect the RTA packet after the other STA transmission is done.

20. The system, apparatus or method of any preceding embodiment, wherein the AP can modify the preamble user field to the non-AP STA to indicate that the RU is time-shared with other STAs. This is done by: (a) setting a bit in the user field to indicate that the RU is shared and sending another user field to indicate the information of the other STA or padding, or (b) defining a new user field and sending the time relative to the start of the DL transmission where the delayed DL transmission is starting. To do this both transmission time sharing resources should share the PHY parameters.

21. The system, apparatus or method of any preceding embodiment, wherein in a case of UL transmission, the non-AP STA sends an RTA stream initiation request to the AP to inform it about the RTA session and the RTA session parameters. The AP responds with acknowledgement and acceptance or rejection to the RTA stream session request. This saves the delay of sending the BSR every time a packet is available for transmission in UL direction.

22. The system, apparatus or method of any preceding embodiment, wherein in a case of UL transmission, the AP allocates resources to the UL RTA and send a trigger frame to the no-AP STA. The AP can send the allocation before the arrival of the RTA packet 23. The system, apparatus or method of any preceding embodiment, wherein the AP can schedule the non-AP STA to delay its UL transmission after receiving the RTA packet by sending two user fields to the non-AP STA in the trigger frame once indicate the PHY parameters and the other indicates the delayed start of the UL transmission.

24. The system, apparatus or method of any preceding embodiment, wherein the non-AP STA can be requested to send padding data (dummy packet) at the time it is not transmitting its packets.

25. The system, apparatus or method of any preceding embodiment, wherein the AP can schedule other STA to transmit in the time where the delayed STA is not transmitting its UL data. This is done by informing that STA that it is time sharing the resources and sending two user fields to the non-AP STA in the trigger frame once indicate the PHY parameters and the other indicates the termination of the UL transmission 26. The system, apparatus or method of any preceding embodiment, wherein for a case of UL transmission, the non-AP STA can send queuing buffer status for RTA packets to the AP to update its estimate for the RTA packet scheduling time.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

Phrasing constructs, such as "A, B and/or C", within the present disclosure describe where either A, B, or C can be present, or any combination of items A, B and C. Phrasing constructs indicating, such as "at least one of" followed by listing group of elements, indicates that at least one of these group elements is present, which includes any possible combination of these listed elements as applicable.

References in this specification referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication in a network, the apparatus comprising:
   (a) a wireless communication circuit configured as a station for wirelessly communicating with at least one other wireless local area network (WLAN) station in its reception area, and operating as either an access point (AP) or a non-AP;
   (b) a processor coupled to said wireless communication circuit within a station configured for operating on the WLAN;
   (c) a non-transitory memory storing instructions executable by the processor; and
   (d) wherein said instructions, when executed by the processor, perform steps comprising:
      (i) operating said wireless communication circuit as a WLAN station configured to support communicating real-time application (RTA) packets that are sensitive to communication delays as well as non-real time packets;
      (ii) distinguishing real-time application (RTA) packets from non-real-time application (non-RTA) packets by prior negotiation, or packet header information, or a combination of prior negotiation and packet header information;
      (iii) obtaining information on RTA packet arrival time and periodicity when operating as an AP performing DL MU-MIMO transmission, or when operating as a non-AP station performing UL MU MIMO transmission;

(iv) wherein said station operating as an access point (AP) scheduling multiple-user (MU) multiple-input-multiple-output (MIMO) transmissions for uplink (UL) or downlink (DL) for RTA packets performs allocating resources to packet transmission before RTA packet arrival;

(v) contending for channel access before the expected time of arrival of the RTA packet in the DL or UL direction when operating as an AP station, and (A) immediately scheduling RTA packet transmission on the allocated resources (RU) when the AP gains access to the channel after or at the time of arrival of the RTA packet; or (B) scheduling cascaded transmission on the same allocated resources (RU) of another station and an RTA station for an UL or DL transmission when the AP gains access to the channel before the expected time of arrival of the RTA packet; and (vi) scheduling is performed when said station is operating as an AP for a DL MIMO, wherein a future DL RTA packet is scheduled on a resource allocation (RU) and scheduling another DL transmission to time-share the resource allocation (RU) until the arrival of the DL RTA packet, and modifying a preamble of a user field sent to a non-AP station to indicate that the allocated resources (RU) are time-shared with other stations, in response to either: (A) setting a bit in the user field to indicate that the allocated resources (RU) are shared and sending another user field to indicate the information of another station or for padding of the transmission, or (B) defining a new user field and sending a time value relative to the start of the DL MIMO transmission at which the delayed DL MIMO transmission is to start, while both transmission time sharing resources share PHY parameters.

2. The apparatus recited in claim 1, wherein said instructions, when executed by the processor operating as an AP for a DL MIMO, perform steps comprising scheduling a future DL RTA packet and sending a dummy packet that operates as padding until arrival of the DL RTA packet, when the AP gains access to the channel before the arrival of the RTA packet.

3. The apparatus recited in claim 2, wherein said instructions, when executed by the processor operating as an AP for a DL MIMO, further performs steps comprising informing a non-AP station that transmission in the allocated resources (RU) is delayed by modifying a preamble of a DL MU-MIMO frame to allow the non-AP STA to parse the resources so that it expect the DL RTA packet after the padding or dummy packet has been transmitted.

4. The apparatus recited in claim 2, wherein said instructions, when executed by the processor operating as an AP for a DL MIMO, further performs steps comprising informing a non-AP station that transmission in the allocated resources (RU) is delayed by modifying a preamble of a DL MU-MIMO frame to allow the non-AP STA to parse the resources so that it expect the DL RTA packet after the other station transmission is completed.

5. The apparatus recited in claim 1, wherein said instructions, when executed by the processor operating as a non-AP station with an uplink (UL) transmission performs steps comprising sending an RTA stream session request to the AP to inform it about the RTA session and parameters for the RTA session, for which an AP responds with acknowledgement and acceptance, or rejection, of the RTA stream session request, to eliminate delay involved with sending a Buffer Status Report (BSR) every time a packet is available for transmission in the uplink (UL) direction.

6. The apparatus recited in claim 1, wherein said instructions, when executed by the processor operating as an AP station with an uplink (UL) transmission performs steps comprising allocating resources (RU) for an UL RTA packet transmission and sending a trigger frame to a non-AP STA.

7. The apparatus recited in claim 6, wherein said instructions, when executed by the processor operating as an AP station with an uplink (UL) transmission performs steps comprising allocating resource (RU) prior to arrival of the RTA packet.

8. The apparatus recited in claim 6, wherein said instructions, when executed by the processor operating as an AP station with an uplink (UL) transmission performs steps comprising scheduling a non-AP STA to delay its UL transmission after receiving the RTA packet by sending two user fields to the non-AP station in a trigger frame, a first one indicate the PHY parameters and the second one indicating a delayed start of the UL transmission.

9. The apparatus recited in claim 8, wherein said instructions, when executed by the processor operating as an AP station with an uplink (UL) transmission performs steps comprising requesting that the non-AP STA send padding data, or dummy packet, when it is not transmitting packets in the allocated resources (RU).

10. The apparatus recited in claim 6, wherein said instructions, when executed by the processor operating as an AP station with an uplink (UL) transmission performs steps comprising scheduling other stations to transmit in a time where a station transmission of its UL data has been delayed.

11. The apparatus recited in claim 6, wherein said instructions, when executed by the processor operating performing scheduling of other stations by steps comprising informing another station that it is time sharing the allocated resources (RU) and sending two user fields to the other station in the trigger frame, a first user field indicating PHY parameters and a second user field indicating termination of the uplink (UL) transmission.

12. The apparatus recited in claim 1, wherein said instructions, when executed by the processor operating as a non-AP station with an uplink (UL) transmission performs steps comprising sending queuing buffer status for RTA packets to the AP to update its estimate for RTA packet scheduling time.

13. An apparatus for wireless communication in a network, the apparatus comprising:
(a) a wireless communication circuit configured as a station for wirelessly communicating with at least one other wireless local area network (WLAN) station in its reception area, and operating as either an access point (AP) or a non-AP;
(b) a processor coupled to said wireless communication circuit within a station configured for operating on the WLAN;
(c) a non-transitory memory storing instructions executable by the processor; and
(d) wherein said instructions, when executed by the processor, perform steps comprising:
  (i) operating said wireless communication circuit as a WLAN station configured to support communicating real-time application (RTA) packets that are sensitive to communication delays as well as non-real time packets;
  (ii) distinguishing real-time application (RTA) packets from non-real-time application (non-RTA) packets by prior negotiation, or packet header information, or a combination of prior negotiation and packet header information;

(iii) obtaining information on RTA packet arrival time and periodicity when operating as an AP performing DL MU-MIMO transmission, or when operating as a non-AP station performing UL MU MIMO transmission;

(iv) wherein said station operating as an access point (AP) scheduling multiple-user (MU) multiple-input-multiple-output (MIMO) transmissions for uplink (UL) or downlink (DL) for RTA packets performs allocating resources to packet transmission before RTA packet arrival, and when operating as an AP for a DL MIMO schedules a future DL RTA packet and sends a dummy packet that operates as padding until arrival of the DL RTA packet, when the AP gains access to the channel before the arrival of the RTA packet;

(v) contending for channel access before the expected time of arrival of the RTA packet in the DL or UL direction when operating as an AP station, and (A) immediately scheduling RTA packet transmission on the allocated resources (RU) when the AP gains access to the channel after or at the time of arrival of the RTA packet; or (B) scheduling cascaded transmission on the same allocated resources (RU) of another station and an RTA station for an UL or DL transmission when the AP gains access to the channel before the expected time of arrival of the RTA packet; and (vi) wherein said station operating as a non-AP station with an uplink (UL) transmission performs steps comprising sending queuing buffer status for RTA packets to the AP to update its estimate for RTA packet scheduling time.

14. The apparatus recited in claim 13, wherein said instructions, when executed by the processor operating as an AP for a DL MIMO, perform steps comprising scheduling a future DL RTA packet on a resource allocation (RU) and scheduling another DL transmission to time-share the resource allocation (RU) until the arrival of the DL RTA packet.

15. The apparatus recited in claim 13, wherein said instructions, when executed by the processor operating as a non-AP station with an uplink (UL) transmission performs steps comprising sending an RTA stream session request to the AP to inform it about the RTA session and parameters for the RTA session, for which an AP responds with acknowledgement and acceptance, or rejection, of the RTA stream session request, to eliminate delay involved with sending a Buffer Status Report (BSR) every time a packet is available for transmission in the uplink (UL) direction.

16. The apparatus recited in claim 13, wherein said instructions, when executed by the processor operating as an AP station with an uplink (UL) transmission performs steps comprising allocating resources (RU) for an UL RTA packet transmission and sending a trigger frame to a non-AP STA.

17. A method of performing wireless communication in a network, comprising:

(a) operating a wireless communication circuit as a WLAN station configured as a station for wirelessly communicating with at least one other wireless local area network (WLAN) station in its reception area, and operating as either an access point (AP) or a non-AP to support communicating real-time application (RTA) packets that are sensitive to communication delays as well as non-real time packets;

(b) distinguishing real-time application (RTA) packets from non-real-time application (non-RTA) packets by prior negotiation, or packet header information, or a combination of prior negotiation and packet header information;

(c) obtaining information on RTA packet arrival time and periodicity when operating as an AP performing DL MU-MIMO transmission, or when operating as a non-AP station performing UL MU MIMO transmission;

(d) wherein said station operating as an access point (AP) scheduling multiple-user (MU) multiple-input-multiple-output (MIMO) transmissions for uplink (UL) or downlink (DL) for RTA packets performs allocating resources to packet transmission before RTA packet arrival;

(e) contending for channel access before the expected time of arrival of the RTA packet in the DL or UL direction when operating as an AP station, and (A) immediately scheduling RTA packet transmission on the allocated resources (RU) when the AP gains access to the channel after or at the time of arrival of the RTA packet; or (B) scheduling cascaded transmission on the same allocated resources (RU) of another station and an RTA station for an UL or DL transmission when the AP gains access to the channel before the expected time of arrival of the RTA packet; and (f) sending queuing buffer status for RTA packets to the AP, when operating as a non-AP station with an uplink (UL) transmission, to update its estimate for RTA packet scheduling time.

18. An apparatus for wireless communication in a network, the apparatus comprising:

(a) a wireless communication circuit configured as a station for wirelessly communicating with at least one other wireless local area network (WLAN) station in its reception area, and operating as either an access point (AP) or a non-AP;

(b) a processor coupled to said wireless communication circuit within a station configured for operating on the WLAN;

(c) a non-transitory memory storing instructions executable by the processor; and (d) wherein said instructions, when executed by the processor, perform steps comprising:

(i) operating said wireless communication circuit as a WLAN station configured to support communicating real-time application (RTA) packets that are sensitive to communication delays as well as non-real time packets;

(ii) distinguishing real-time application (RTA) packets from non-real-time application (non-RTA) packets by prior negotiation, or packet header information, or a combination of prior negotiation and packet header information;

(iii) obtaining information on RTA packet arrival time and periodicity when operating as an AP performing DL MU-MIMO transmission, or when operating as a non-AP station performing UL MU MIMO transmission;

(iv) wherein said station operating as an access point (AP) scheduling multiple-user (MU) multiple-input-multiple-output (MIMO) transmissions for uplink (UL) or downlink (DL) for RTA packets performs allocating resources to packet transmission before RTA packet arrival;

(v) contending for channel access before the expected time of arrival of the RTA packet in the DL or UL direction when operating as an AP station, and (A) immediately scheduling RTA packet transmission on the allocated resources (RU) when the AP gains access to the channel after or at the time of arrival of the RTA packet; or (B) scheduling cascaded transmission on the same allocated resources (RU) of another station and an RTA station for an UL or DL transmission when the AP gains access to the channel before the expected time of arrival of the RTA packet; and (vi) sending queuing buffer status for RTA packets to the AP, when operating as a non-AP station with an uplink (UL) transmission, to update its estimate for RTA packet scheduling time.

19. The apparatus recited in claim 18, wherein said instructions, when executed by the processor operating as an AP for a DL MIMO, perform steps comprising scheduling a future DL RTA packet and sending a dummy packet that operates as padding until arrival of the DL RTA packet, when the AP gains access to the channel before the arrival of the RTA packet.

20. The apparatus recited in claim 18, wherein said instructions, when executed by the processor operating as an AP for a DL MIMO, further performs steps comprising informing a non-AP station that transmission in the allocated resources (RU) is delayed by modifying a preamble of a DL MU-MIMO frame to allow the non-AP STA to parse the resources so that it expect the DL RTA packet after the padding or dummy packet has been transmitted.

21. The apparatus recited in claim 19, wherein said instructions, when executed by the processor operating as an AP for a DL MIMO, further performs steps comprising informing a non-AP station that transmission in the allocated resources (RU) is delayed by modifying a preamble of a DL MU-MIMO frame to allow the non-AP STA to parse the resources so that it expect the DL RTA packet after the other station transmission is completed.

22. The apparatus recited in claim 18, wherein said instructions, when executed by the processor operating as an AP for a DL MIMO, perform steps comprising scheduling a future DL RTA packet on a resource allocation (RU) and scheduling another DL transmission to time-share the resource allocation (RU) until the arrival of the DL RTA packet.

23. The apparatus recited in claim 22, wherein said instructions, when executed by the processor operating as an AP for a DL MIMO, perform steps further comprising modifying a preamble of a user field sent to a non-AP station to indicate that the allocated resources (RU) is time-shared with other stations, in response to either (i) setting a bit in the user field to indicate that the allocated resources (RU) are shared and sending another user field to indicate the information of another station or for padding of the transmission, or (ii) defining a new user field and sending a time value relative to the start of the DL MIMO transmission at which the delayed DL MIMO transmission is to start, while both transmission time sharing resources share PHY parameters.

24. The apparatus recited in claim 18, wherein said instructions, when executed by the processor operating as a non-AP station with an uplink (UL) transmission performs steps comprising sending an RTA stream session request to the AP to inform it about the RTA session and parameters for the RTA session, for which an AP responds with acknowledgement and acceptance, or rejection, of the RTA stream session request, to eliminate delay involved with sending a Buffer Status Report (BSR) every time a packet is available for transmission in the uplink (UL) direction.

25. The apparatus recited in claim 18, wherein said instructions, when executed by the processor operating as an AP station with an uplink (UL) transmission performs steps comprising allocating resources (RU) for an UL RTA packet transmission and sending a trigger frame to a non-AP STA.

26. The apparatus recited in claim 25, wherein said instructions, when executed by the processor operating as an AP station with an uplink (UL) transmission performs steps comprising allocating resource (RU) prior to arrival of the RTA packet.

27. The apparatus recited in claim 25, wherein said instructions, when executed by the processor operating as an AP station with an uplink (UL) transmission performs steps comprising scheduling a non-AP STA to delay its UL transmission after receiving the RTA packet by sending two user fields to the non-AP station in a trigger frame, a first one indicate the PHY parameters and the second one indicating a delayed start of the UL transmission.

28. The apparatus recited in claim 27, wherein said instructions, when executed by the processor operating as an AP station with an uplink (UL) transmission performs steps comprising requesting that the non-AP STA send padding data, or dummy packet, when it is not transmitting packets in the allocated resources (RU).

29. The apparatus recited in claim 25, wherein said instructions, when executed by the processor operating as an AP station with an uplink (UL) transmission performs steps comprising scheduling other stations to transmit in a time where a station transmission of its UL data has been delayed.

30. The apparatus recited in claim 25, wherein said instructions, when executed by the processor operating performing scheduling of other stations by steps comprising informing another station that it is time sharing the allocated resources (RU) and sending two user fields to the other station in the trigger frame, a first user field indicating PHY parameters and a second user field indicating termination of the uplink (UL) transmission.

* * * * *